United States Patent
Martin

(10) Patent No.: US 10,608,509 B2
(45) Date of Patent: Mar. 31, 2020

(54) ROTATABLE ELECTRIC MACHINES

(71) Applicant: Roul Delroy Martin, Calgary (CA)

(72) Inventor: Roul Delroy Martin, Calgary (CA)

( * ) Notice: Subject to any disclaimer, the term of this patent is extended or adjusted under 35 U.S.C. 154(b) by 683 days.

(21) Appl. No.: 15/294,870

(22) Filed: Oct. 17, 2016

(65) Prior Publication Data

US 2018/0109166 A1    Apr. 19, 2018

(51) Int. Cl.
| | | |
|---|---|---|
| *H02K 11/21* | (2016.01) | |
| *H02K 11/33* | (2016.01) | |
| *H02K 29/03* | (2006.01) | |
| *H02P 6/10* | (2006.01) | |
| *H02K 16/00* | (2006.01) | |
| *H02P 1/00* | (2006.01) | |
| *H02K 51/00* | (2006.01) | |
| *H02K 21/24* | (2006.01) | |
| *H02J 7/00* | (2006.01) | |
| *H02K 7/00* | (2006.01) | |
| *H02K 11/00* | (2016.01) | |

(Continued)

(52) U.S. Cl.
CPC ............ *H02K 11/21* (2016.01); *H02J 7/0068* (2013.01); *H02K 7/003* (2013.01); *H02K 11/0094* (2013.01); *H02K 11/33* (2016.01); *H02K 16/00* (2013.01); *H02K 21/24* (2013.01); *H02K 51/00* (2013.01); *H02P 1/00* (2013.01); *H02K 29/03* (2013.01); *H02P 6/10* (2013.01); *Y02E 10/725* (2013.01)

(58) Field of Classification Search
CPC ........ H02K 11/21; H02K 11/33; H02K 16/00; H02K 21/24; H02K 51/00; H02K 29/03
See application file for complete search history.

(56) References Cited

U.S. PATENT DOCUMENTS

| | | |
|---|---|---|
| 4,358,693 A | 11/1982 | Palmer et al. |
| 4,500,821 A | 2/1985 | Bitting et al. |

(Continued)

FOREIGN PATENT DOCUMENTS

| | | |
|---|---|---|
| CA | 1191543 | 8/1985 |
| CN | 203406758 | 1/2014 |

(Continued)

OTHER PUBLICATIONS

International Searching Authority, The International Search Report and the Written Opinion of the International Searching Authority, or the Declaration, International Application No. PCT/CA2017/051227, Filed Oct. 16, 2017, 9 pages, Receiving Office—Canadian Intellectual Property Office.

(Continued)

*Primary Examiner* — Edgardo San Martin
(74) *Attorney, Agent, or Firm* — Orin Del Vecchio

(57) ABSTRACT

An apparatus includes a rotatable common shaft configured to be rotatable about a longitudinal shaft axis extending along the rotatable common shaft. Rotatable electric machines are arranged on the rotatable common shaft. This is done in such a way that disk assemblies of the rotatable electric machines and the rotatable common shaft are concurrently rotatable. The rotatable electric machines are arranged on the rotatable common shaft in such a way that the net cogging force, which is generated by the rotatable electric machines, and which is imparted to the rotatable common shaft, is reduced.

19 Claims, 32 Drawing Sheets

(51) Int. Cl.
*H02K 11/20* (2016.01)
*H02K 11/30* (2016.01)

(56) References Cited

U.S. PATENT DOCUMENTS

| | | | |
|---|---|---|---|
| 5,179,307 A | 1/1993 | Porter | |
| 5,731,649 A | 3/1998 | Caamano | |
| 5,982,070 A | 11/1999 | Caamano | |
| 5,982,074 A | 11/1999 | Smith et al. | |
| 6,392,370 B1 | 5/2002 | Bedin | |
| 6,707,208 B2* | 3/2004 | Durham | H02K 21/042 |
| | | | 310/156.35 |
| 7,432,623 B2 | 10/2008 | Ritz et al. | |
| 7,898,135 B2 | 3/2011 | Flynn | |
| 7,906,920 B2 | 3/2011 | Imagawa | |
| 8,106,563 B2* | 1/2012 | Ritchey | H02K 16/00 |
| | | | 310/112 |
| 9,071,117 B2* | 6/2015 | Woolmer | H02K 21/24 |
| 9,219,395 B2* | 12/2015 | Powell | H02K 7/1823 |
| 9,318,938 B2* | 4/2016 | Carpenter | H02K 1/182 |
| 9,496,776 B2* | 11/2016 | Woolmer | H02K 1/30 |
| 9,502,951 B2* | 11/2016 | Rozinsky | H02K 1/02 |
| 9,584,056 B2* | 2/2017 | Ritchey | H02K 16/00 |
| 2008/0224550 A1 | 9/2008 | Hyun et al. | |
| 2011/0109185 A1 | 5/2011 | Sullivan et al. | |
| 2011/0156522 A1 | 6/2011 | Babcock et al. | |
| 2014/0167708 A1 | 6/2014 | Ritchey | |
| 2015/0244228 A1 | 8/2015 | Beaulieu et al. | |

FOREIGN PATENT DOCUMENTS

| | | |
|---|---|---|
| JP | 2009118706 | 5/2009 |
| WO | 1999013558 | 3/1999 |

OTHER PUBLICATIONS

Muller Power Inc. "Electrical Generation Technology" retrieved from http://www.mullerpower.com/Research/Research.php Jun. 28, 2016.

\* cited by examiner

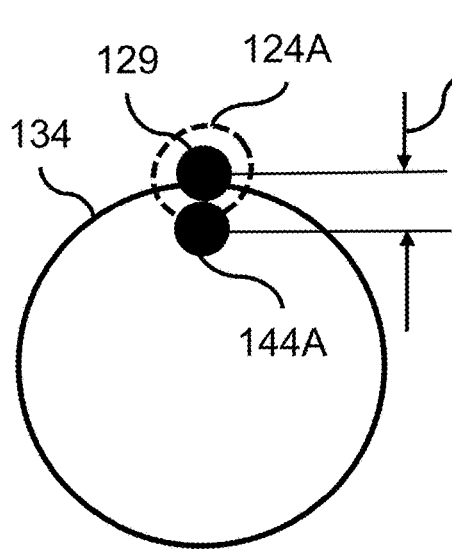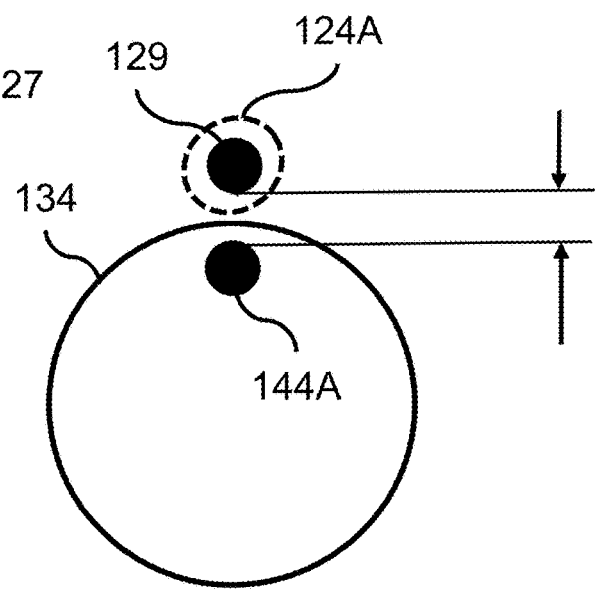
FIG. 13  FIG. 14
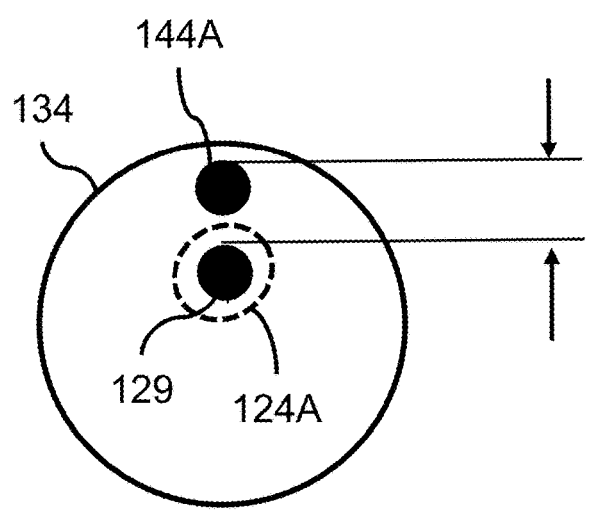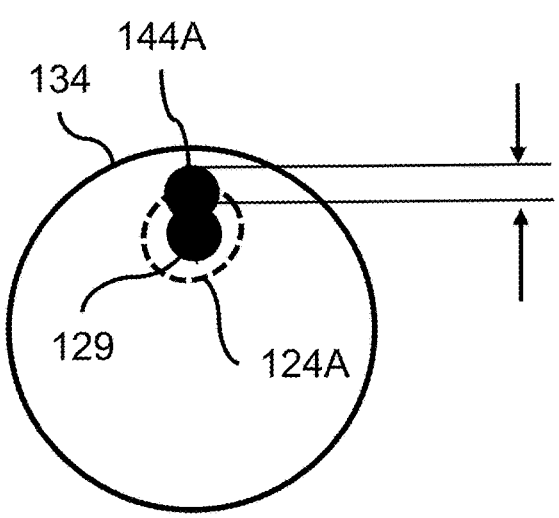
FIG. 15  FIG. 16

CP-A motor interface module 316A (PART A)

CP-A motor interface module 316A (PART A)

CP-A motor interface module 316A (PART A)

CP-A motor interface module 316A (PART A)

CP-A motor interface module 316A (PART A)

CP-A Generator interface module 414A

US 10,608,509 B2

ROTATABLE ELECTRIC MACHINES

TECHNICAL FIELD

This document relates to the technical field of (and is not limited to) rotatable electric machines arranged on a rotatable common shaft in such a way that the net cogging force, which is generated by the rotatable electric machines, and which is imparted to the rotatable common shaft, is reduced (and method therefor).

BACKGROUND

Cogging torque of rotatable electric machines (such as, electrical motors or generators) is the torque due to the interaction between the permanent magnets of the rotor and the electromagnets of the stator of the rotatable electric machines (also called permanent magnet machines). Cogging torque is also known as detent or no-current torque.

SUMMARY

It will be appreciated that there exists a need to mitigate (at least in part) at least one problem associated with the existing electric rotating machines, such as electrical motors and electrical generators (also called the existing technology). After much study of the known systems and methods with experimentation, an understanding of the problem and its solution has been identified and is articulated as follows:

The cogging torque is position dependent and its periodicity per revolution depends on the number of magnetic poles and the number of teeth on the stator. Cogging torque is an undesirable component for the operation of such a motor. It is especially prominent at lower speeds, with the symptom of jerkiness. Cogging torque results in torque as well as speed ripple; however, at high speed, the moment of inertia of the rotor filters out the effect of the cogging torque.

The problem associated with known (conventional) rotating electric machines, such as electrical motors, typically have efficiencies in the range of about 75 percent to about 80 percent (%). Conventional motors and generators typically require more mechanical energy to overcome the cogging forces in order to initiate and sustain rotation.

To mitigate, at least in part, at least one problem associated with the existing technology (that is, the existing rotatable electric machines), there is provided (in accordance with a first major aspect) an apparatus. The apparatus includes (and is not limited to) a rotatable common shaft configured to be rotatable about a longitudinal shaft axis extending along the rotatable common shaft. The apparatus also includes rotatable electric machines (at least two or more rotatable electric machines) are arranged on the rotatable common shaft. This is done in such a way that the disk assemblies of the rotatable electric machines and the rotatable common shaft are concurrently rotatable. The rotatable electric machines are arranged on the rotatable common shaft. This is done in such a way that a net cogging force, which is generated by the rotatable electric machines, and which is imparted to the rotatable common shaft, is reduced.

To mitigate, at least in part, at least one problem associated with the existing technology (that is, the existing rotatable electric machines), there is provided (in accordance with a second major aspect) a method. The method includes (and is not limited to) arranging rotatable electric machines on a rotatable common shaft configured to be rotatable about a longitudinal shaft axis extending along the rotatable common shaft. This is done in such a way that disk assemblies of the rotatable electric machines and the rotatable common shaft are concurrently rotatable, and a net cogging force, which is generated by the rotatable electric machines, and which is imparted to the rotatable common shaft, is reduced.

To mitigate, at least in part, at least one problem associated with the existing technology (that is, the existing rotatable electric machines), there is provided (in accordance with a second major aspect) an apparatus. The apparatus includes a rotatable common shaft configured to be rotatable about a longitudinal shaft axis extending along the rotatable common shaft. Rotatable electric machines are arranged at spaced-apart positions along the rotatable common shaft. The rotatable electric machines each have a respective rotatable disk assembly that is circumferentially shifted relative to the other rotatable disk assemblies about the longitudinal shaft axis. This is done in such a way that disk assemblies of the rotatable electric machines and the rotatable common shaft are concurrently rotatable, and a net cogging force, which is generated by the rotatable electric machines, and which is imparted to the rotatable common shaft, is reduced.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify key features or essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 13, 14, 15 and 16 depict side views of embodiments of a first magnet assembly and a first stationary coil pair usable for any one of the first rotatable electric machine, the second rotatable electric machine, and the third rotatable electric machine of the apparatus of FIG. 1;

Figure 1:
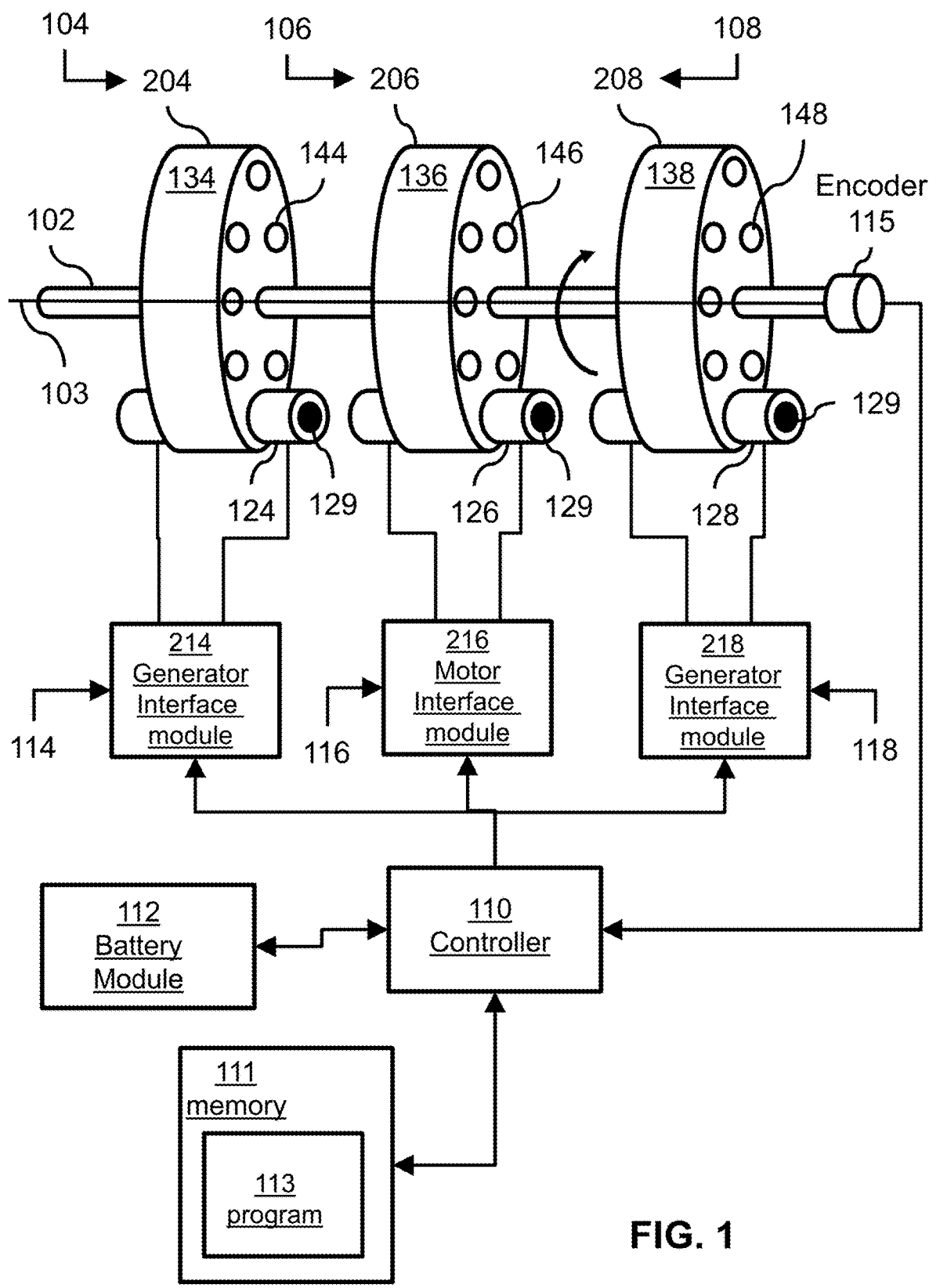
FIG. 1 depicts a partial perspective schematic view of an embodiment of an apparatus including a controller.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 102 rotatable common shaft
103 longitudinal shaft axis
104 first rotatable electric machine
106 second rotatable electric machine
108 third rotatable electric machine
110 controller
111 memory assembly
112 battery module
113 program
114 first electric-machine interface module
115 angular encoder
116 second electric-machine interface module
118 third electric-machine interface module
124 first stationary electromagnetic coil pair collection
124A first stationary coil pair, or stationary coil pair (of the first stationary electromagnetic coil pair collection 124)
124B second stationary coil pair (of the first stationary electromagnetic coil pair collection 124)
124C third stationary coil pair (of the first stationary electromagnetic coil pair collection 124)
124D fourth stationary coil pair (of the first stationary electromagnetic coil pair collection 124)
124E fifth stationary coil pair (of the first stationary electromagnetic coil pair collection 124)
125 electrical terminals
126 second stationary electromagnetic coil pair collection
126A first stationary coil pair, or stationary coil pair (of the second stationary electromagnetic coil pair collection 126)
126B second stationary coil pair (of the second stationary electromagnetic coil pair collection 126)
126C third stationary coil pair (of the second stationary electromagnetic coil pair collection 126)
126D fourth stationary coil pair (of the second stationary electromagnetic coil pair collection 126)
126E fifth stationary coil pair (of the second stationary electromagnetic coil pair collection 126)
127 coaxial offset
128 third stationary electromagnetic coil pair collection
128A first stationary coil pair, or stationary coil pair (of the third stationary electromagnetic coil pair collection 128)
128B second stationary coil pair (of the third stationary electromagnetic coil pair collection 128)
128C third stationary coil pair (of the third stationary electromagnetic coil pair collection 128)
128D fourth stationary coil pair (of the third stationary electromagnetic coil pair collection 128)
128E fifth stationary coil pair (of the third stationary electromagnetic coil pair collection 128)
129 electromagnetic core
131 predetermined mechanical lagging angle
133 predetermined leading mechanical angle
134 first disk assembly
136 second disk assembly
138 third disk assembly
141 stationary housing
144 first magnet collection
144A first magnet assembly (of the first magnet collection 144)
144B second magnet assembly (of the first magnet collection 144)
144C third magnet assembly (of the first magnet collection 144)
144D fourth magnet assembly (of the first magnet collection 144)
144E fifth magnet assembly (of the first magnet collection 144)
144F sixth magnet assembly (of the first magnet collection 144)
146 second magnet collection
146A first magnet assembly (of the second magnet collection 146)
146B second magnet assembly (of the second magnet collection 146)
146C third magnet assembly (of the second magnet collection 146)
146D fourth magnet assembly (of the second magnet collection 146)
146E fifth magnet assembly (of the second magnet collection 146)
146F sixth magnet assembly (of the second magnet collection 146)
148 third magnet collection
148A first magnet assembly (of the third magnet collection 148)
148B second magnet assembly (of the third magnet collection 148)
148C third magnet assembly (of the third magnet collection 148)
148D fourth magnet assembly (of the third magnet collection 148)
148E fifth magnet assembly (of the third magnet collection 148)
148F sixth magnet assembly (of the third magnet collection 148)
204 first electric generator assembly
206 electric motor assembly
208 second electric generator assembly
214 first generator interface module
216 electric motor interface module
218 second generator interface module
316A CP-A motor interface module, or motor interface module
316B CP-B motor interface module
316C CP-C motor interface module 316D CP-D motor interface module
316E CP-E motor interface module
317 DC/DC converter module
400 battery charging switching module
414A CP-A first generator interface module, or generator interface module
414B CP-B first generator interface module
414C CP-C first generator interface module
414D CP-D first generator interface module
414E CP-E first generator interface module
415 load module
501 first motor operation mode
502 second motor operation mode
503 third motor operation mode
504 fourth motor operation mode
505 fifth motor operation mode
511 sixth motor operation mode
512 seventh motor operation mode
513 eighth motor operation mode
514 ninth motor operation mode
515 tenth motor operation mode
601 first generator operation mode
602 second generator operation mode
603 third generator operation mode
604 fourth generator operation mode
611 fifth generator operation mode
612 sixth generator operation mode
613 seventh generator operation mode
614 eighth generator operation mode
900 net cogging force
902 operation

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope may be defined by the claims (in which the claims may be amended during patent examination after filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a partial perspective schematic view of an embodiment of an apparatus including a controller 110.

In accordance with an embodiment, the apparatus includes (and is not limited to) a synergistic combination of a rotatable common shaft 102, a first rotatable electric machine 104, a second rotatable electric machine 106, a third rotatable electric machine 108, and the controller 110.

The rotatable common shaft 102 is mounted to a support (known and not depicted, such as a bearing assembly) configured to support rotational movement of the rotatable common shaft 102.

It will be appreciated that the bearing assembly may include a mechanical bearing assembly (and any equivalent thereof) and/or a magnetic bearing assembly (and any equivalent thereof). It will also be appreciated that an external mechanical impulse (generated by a starter assembly) may be required to initiate rotation of the rotatable common shaft 102.

The starter assembly consists of a rotatable electromechanical component (a commercially available product similar to that used to start the engine of a conventional motor vehicle) that, when or once activated with an electrical pulse, causes a rotatable electromechanical component to mechanically couple onto the rotatable common shaft 102 thereby initiating the rotation of the rotatable common shaft 102. The starter assembly is so configured to mechanically disengage the rotatable electromechanical component from the rotatable common shaft 102 at a predetermined speed of rotation. After the starter assembly is disengaged from the rotatable common shaft 102, the rotation of the rotatable common shaft 102 is maintained and controlled using the controller 110 and the first electric-machine interface module 114, the second electric-machine interface module 116 and the third electric-machine interface module 118.

The first disk assembly 134 of the first rotatable electric machine 104 is affixed to the rotatable common shaft 102. This is done in such a way that the first disk assembly 134 and the rotatable common shaft 102 are rotatable together. For simplifying the view of the apparatus, the entirety of the first rotatable electric machine 104 is not fully depicted in FIG. 1. The first rotatable electric machine 104 includes a combination of coil pairs (also called windings or coil windings, and any equivalent thereof) and magnets (permanent magnets) of the first disk assembly 134, in which the coil pairs and the magnets, in use, magnetically interact with each other. The first rotatable electric machine 104 includes a first disk assembly 134 that is affixed to the rotatable common shaft 102. The magnets are affixed to the first disk assembly 134. The coil pairs are spaced apart from the first disk assembly 134, and are stationary (not movable) relative to the first disk assembly 134. This is done in such a way that the first disk assembly 134, in use, moves (rotates) the magnets past (beyond) from between each of the coil pairs of the first stationary electromagnetic coil pair collection 124. To simplify the view of the apparatus, one of the coil pairs of the first stationary electromagnetic coil pair collection 124 of the first rotatable electric machine 104 is depicted in FIG. 1.

The second disk assembly 136 of the second rotatable electric machine 106 is affixed to the rotatable common shaft 102. This is done in such a way that the second disk assembly 136 and the rotatable common shaft 102 are rotatable together. For simplifying the view of the apparatus, the entirety of the second rotatable electric machine 106 is not fully depicted in FIG. 1. The second rotatable electric machine 106 includes a combination of coil pairs and magnets (permanent magnets) of the second disk assembly 136, in which the coil pairs and the magnets, in use, magnetically interact with each other. The second rotatable electric machine 106 includes a second disk assembly 136 that is affixed to the rotatable common shaft 102. The magnets are affixed to the second disk assembly 136. The coil pairs are spaced apart from the second disk assembly 136, and are stationary (not movable) relative to the second disk assembly 136. This is done in such a way that the second disk assembly 136, in use, moves (rotates) the magnets between each of the coil pairs of the second stationary electromagnetic coil pair collection 126 (along a circular path). To simplify the view of the apparatus, one of the coil pairs of the second stationary electromagnetic coil pair collection 126 of the second rotatable electric machine 106 is depicted in FIG. 1.

The third disk assembly 138 of the third rotatable electric machine 108 is affixed to the rotatable common shaft 102. This is done in such a way that the third disk assembly 138 and the rotatable common shaft 102 are rotatable together. For simplifying the view of the apparatus, the entirety of the third rotatable electric machine 108 is not fully depicted in FIG. 1. The third rotatable electric machine 108 includes a combination of coil pairs and magnets (permanent magnets) of the third disk assembly 138, in which the coil pairs and the magnets, in use, magnetically interact with each other. The third rotatable electric machine 108 includes a third disk assembly 138 that is affixed to the rotatable common shaft 102. The magnets are affixed to the third disk assembly 138. The coil pairs are spaced apart from the third disk assembly 138, and are stationary (not movable) relative to the third disk assembly 138. This is done in such a way that the third disk assembly 138, in use, moves (rotates) the magnets between each of the coil pairs of the third stationary electromagnetic coil pair collection 128 (along a circular path). To simplify the view of the apparatus, one of the third stationary electromagnetic coil pair collection 128 of the third rotatable electric machine 108 is depicted in FIG. 1.

The controller 110 is configured to interface with (electrically connect with) the first rotatable electric machine 104, the second rotatable electric machine 106, and the third rotatable electric machine 108.

In accordance with an embodiment, the controller 110 may be called a computer system having a processor. The controller 110 is configured to interface with a memory assembly 111 that is configured to tangibly receive and store a program 113. The program 113 is read by the controller 110, and the controller 110 is configured to execute tasks in response to reading the program 113. In accordance with an alternative embodiment, the controller 110 includes application-specific integrated circuits (ASIC) configured to operate or execute specific operations. The ASIC includes an integrated circuit (IC) customized (configured) for a particular use or for a general-purpose use.

Preferably, the controller 110 is configured to interface with (electrically connect with) the coil pairs of the first rotatable electric machine 104, the second rotatable electric machine 106, and the third rotatable electric machine 108 (via an interface module or interface circuit). The controller 110 is configured to control, in use, the precisely timed activation of the coil pairs of the first rotatable electric machine 104, the second rotatable electric machine 106 and the third rotatable electric machine 108 to ensure optimum (A) torque at the rotatable common shaft 102, and (B) power generation associated with the first rotatable electric machine 104 and the third rotatable electric machine 108.

Figure 9:
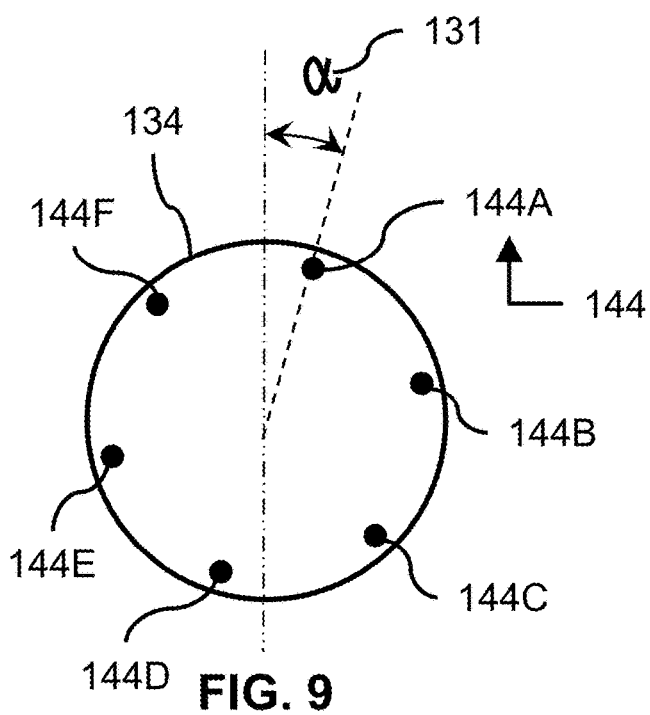
FIGS. 9, 10 and 11 depict side views of embodiments of a first magnet collection, a second magnet collection, and a third magnet collection respectively usable for the first rotatable electric machine, the second rotatable electric machine, and the third rotatable electric machine of the apparatus of FIG. 1.
Figure 10:
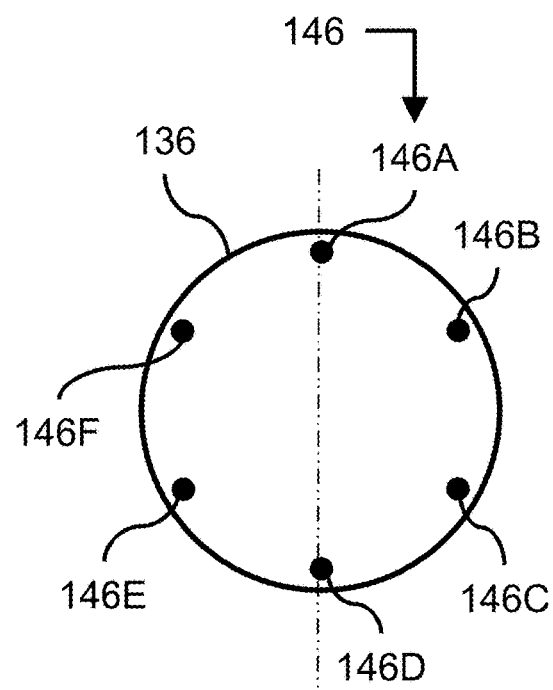
Figure 11:
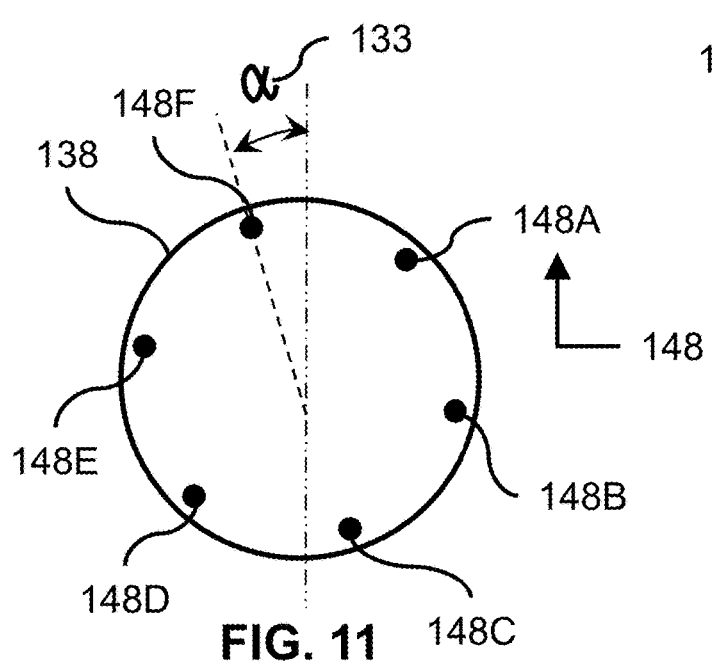

The disk assemblies of the first rotatable electric machine 104, the second rotatable electric machine 106 and the third rotatable electric machine 108 are mechanically shifted in accordance with FIGS. 9, 10 and 11, which results in a reduction of the net cogging force (torque) seen (experienced) at the rotatable common shaft 102. For the case where the first rotatable electric machine 104 and the third rotatable electric machine 108 are not utilized, the net cogging force created or generated by the second rotatable electric machine 106 (operating or rotating on its own) is greater than zero (and may not be smooth). It will be appreciated that the first rotatable electric machine 104, the second rotatable electric machine 106 and the third rotatable electric machine 108 all experience a cogging torque as they rotate. However, the algebraic sum (the net cogging torque), which is transmitted to the rotatable common shaft 102, is reduced (or preferably eliminated).

Generally, the cogging torque opposes the electromechanical force generated by a rotating electric machine at least 50 percent of the time (that is, 50 percent of each rotation cycle of an electric rotating machine).

It will be appreciated that the use of two or more of the rotatable disk assemblies mounted to the rotatable common shaft 102, in use, may reduce or cancel the cogging torque (cogging force).

It will be appreciated that the first rotatable electric machine 104, the second rotatable electric machine 106 and the third rotatable electric machine 108, by virtue of their relative mechanical arrangement (a relative angular displacement that exists between the disk assemblies of the rotatable electric machines, as depicted, for instance, in FIGS. 9, 10 and 11), cooperate (work together) in such a way that the net cogging force is reduced (preferably eliminated if possible), so that the net cogging torque that is transmitted to (and received by) the rotatable common shaft 102 is reduced (preferably eliminated).

It will be appreciated that the embodiment as depicted in FIG. 1 includes three rotatable disk assemblies (the first disk assembly 134, the second disk assembly 136, and the third disk assembly 138), and that other embodiments may utilize more than three disks (such as, six disks, etc.).

In accordance with a preferred embodiment, the apparatus is adapted such that the first rotatable electric machine 104 includes the first disk assembly 134 affixed to the rotatable common shaft 102. The second rotatable electric machine 106 includes the second disk assembly 136 affixed to the rotatable common shaft 102. The third rotatable electric machine 108 includes the third disk assembly 138 affixed to the rotatable common shaft 102. The first disk assembly 134, the second disk assembly 136, and the third disk assembly 138 are spaced apart from each other.

In accordance with a preferred embodiment, the apparatus is adapted such that the first disk assembly 134 includes a first magnet collection 144 (a collection of spaced-apart permanent magnets). The second disk assembly 136 includes a second magnet collection 146 (a collection of spaced-apart permanent magnets). The third disk assembly 138 includes a third magnet collection 148 (a collection of spaced-apart permanent magnets).

In accordance with a preferred embodiment, the apparatus is adapted such that the first rotatable electric machine 104 includes a first stationary electromagnetic coil pair collection 124 (a collection of spaced-apart coil pairs). The second rotatable electric machine 106 includes a second stationary electromagnetic coil pair collection 126 (a collection of spaced-apart coil pairs). The third rotatable electric machine 108 includes a third stationary electromagnetic coil pair collection 128 (a collection of spaced-apart coil pairs).

In accordance with a preferred embodiment, the apparatus is adapted such that the controller 110 is configured to interface with the first rotatable electric machine 104 via a first electric-machine interface module 114. The first electric-machine interface module 114 is configured to electrically connect with the first stationary electromagnetic coil pair collection 124. The controller 110 is configured to interface with the second rotatable electric machine 106 via a second electric-machine interface module 116. The second electric-machine interface module 116 is configured to electrically connect with the second stationary electromagnetic coil pair collection 126. The controller 110 is configured to interface with the third rotatable electric machine 108 via a third electric-machine interface module 118. The third electric-machine interface module 118 is configured to electrically connect with the third stationary electromagnetic coil pair collection 128.

In accordance with a preferred embodiment, the apparatus is adapted such that the first rotatable electric machine 104 includes a first electric generator assembly 204. The second rotatable electric machine 106 includes an electric motor assembly 206. The third rotatable electric machine 108 includes a second electric generator assembly 208. The electric motor assembly 206 is positioned between the first electric generator assembly 204 and the second electric generator assembly 208. It will be appreciated that this arrangement of the embodiment is arbitrary, and does not provide an advantage over any other arrangement of the embodiment.

In accordance with a preferred embodiment, the apparatus is adapted such that the first electric-machine interface module 114 includes a first generator interface module 214 configured to electrically interface with the first electric generator assembly 204. The second electric-machine interface module 116 includes an electric motor interface module 216 configured to electrically interface with the electric motor assembly 206. The third electric-machine interface module 118 includes a second generator interface module 218 configured to electrically interface with the second electric generator assembly 208.

In accordance with a preferred embodiment, the apparatus is adapted such that the first electric-machine interface module 114 is electrically connected to each of the coil pairs (also called electromagnets) of the first rotatable electric machine 104, such as the first stationary electromagnetic coil pair collection 124 of the first rotatable electric machine 104. It will be appreciated that a single coil pair is depicted for the first stationary electromagnetic coil pair collection 124 for the sake of clarifying the view of the embodiment as depicted in FIG. 1. For the preferred embodiments, a plurality of coil pairs are depicted in other figures, and the plurality of coil pairs for the first rotatable electric machine 104 (or for the first electric generator assembly 204) are evenly, or geometrically and equally spaced, around or about the first disk assembly 134. Preferably, the stationary coil pairs or windings of the first stationary electromagnetic coil pair collection 124 include electromagnetic coil pairs each having respective electromagnetic cores mounted therein. More preferably, for the case where the first electric-machine interface module 114 includes the first generator interface module 214, the first generator interface module 214 is electrically connected to each of the coil pairs (also called the first electric generator coil pairs) of the first electric generator assembly 204.

In accordance with a preferred embodiment, the apparatus is adapted such that the second electric-machine interface module 116 is electrically connected to each of the coil pairs (also called electromagnets) of the second rotatable electric machine 106, such as the second stationary electromagnetic coil pair collection 126 of the second rotatable electric machine 106. It will be appreciated that a single coil pair (also called electromagnets) is depicted for the second stationary electromagnetic coil pair collection 126 for the sake of clarifying the view of the embodiment as depicted in FIG. 1. For the preferred embodiments, a plurality of coil pairs are depicted in other figures, and the plurality of coil pairs for the second rotatable electric machine 106 (or for the electric motor assembly 206) are evenly, or geometrically and equally spaced, around or about the second disk assembly 136. Preferably, the stationary coil pairs (also called electromagnets or windings) of the second stationary electromagnetic coil pair collection 126 include electromagnetic coil pairs each having respective electromagnetic cores mounted therein. More preferably, for the case where the second electric-machine interface module 116 includes the electric motor interface module 216, the electric motor interface module 216 is electrically connected to each of the coil pairs (also called electromagnets or electric motor coil pairs) of the electric motor assembly 206.

In accordance with a preferred embodiment, the apparatus is adapted such that the third electric-machine interface module 118 is electrically connected to each of the coil pairs (also called electromagnets) of the third rotatable electric machine 108, such as a third stationary electromagnetic coil pair collection 128 of the third rotatable electric machine 108. It will be appreciated that a single coil pair is depicted for the third stationary electromagnetic coil pair collection 128 for the sake of clarifying the view of the embodiment as depicted in FIG. 1. For the preferred embodiments, a plurality of coil pairs is depicted in other figures, and the plurality of coil pairs for the third rotatable electric machine 108 (or for the second electric generator assembly 208) are evenly, or geometrically and equally spaced, around or about the third disk assembly 138. Preferably, the stationary coil pairs or windings of the third stationary electromagnetic coil pair collection 128 include electromagnetic coil pairs each having respective electromagnetic cores mounted therein. More preferably, for the case where the third electric-machine interface module 118 includes the second generator interface module 218, the second generator interface module 218 is electrically connected to each of the coil pairs (also called the second electric generator coil pairs) of the second electric generator assembly 208.

Preferably, each of the first stationary electromagnetic coil pair collection 124, the second stationary electromagnetic coil pair collection 126 and the third stationary electromagnetic coil pair collection 128 includes an electromagnetic core 129. Preferably, the electromagnetic core 129 has a relatively high magnetic permeability, low magnetic hysteresis loss and low eddy-current loss. More preferably, the magnetic hysteresis BH (the magnetic flux density versus the magnetic field strength) curve of the electromagnetic core 129 has low coercivity and high remnant flux density. Coercivity is the resistance of a magnetic material to changes in magnetization, equivalent to the field intensity necessary to demagnetize the fully magnetized material.

Preferably, the diameter of the electromagnetic core 129 (of the first stationary electromagnetic coil pair collection 124, the second stationary electromagnetic coil pair collection 126 and the third stationary electromagnetic coil pair collection 128) is (respectively) about (approximately) the same diameter as the permanent magnets of the first magnet collection 144, the permanent magnets of the second magnet collection 146 and the permanent magnets of the third magnet collection 148. It will be appreciated that the size, geometry and magnetic strength of the permanent magnets of the first magnet collection 144, the second magnet collection 146 and the third magnet collection 148 should, preferably, be the same.

In accordance with a preferred embodiment, the apparatus is adapted such that a battery module 112 is electrically interfaced with the controller 110. The controller 110 is configured to interface with, and control operation of, the battery module 112. The battery module 112 is configured to provide electrical energy to the first electric-machine interface module 114, the second electric-machine interface module 116 and the third electric-machine interface module 118 (when needed). The battery module 112 is configured to electrically connect with the rotatable electric machines (104, 106, 108) in such a way that the battery module, in use, interacts with coil pairs of the rotatable electric machines (104, 106, 108). The controller 110 is configured to interface with, and control operation of, the battery module in such a way that: (A) the battery module 112, in use, provides electrical power to the rotatable electric machines (104, 106, 108) in such a way that any electrical power that is provided to the rotatable electric machines (104, 106, 108), in use, urges rotation of the rotatable electric machines (104, 106, 108), and (B) the battery module 112, in use, receives electrical power from the stored energy in the rotatable electric machines (104, 106, 108) in such a way that the electrical power that is provided by the stored energy in the rotatable electric machines (104, 106, 108), in use, charges the battery module 112 as needed.

In accordance with a preferred embodiment, the apparatus further includes an angular encoder 115 configured to be coupled to the rotatable common shaft 102, and interfaced or electrically connected (directly or indirectly) to the controller 110. The angular encoder 115 is configured to provide, in use, an angular position (angular displacement) of the rotatable common shaft 102 to the controller 110.

In accordance with a preferred embodiment, the controller 110 is interfaced with a memory assembly 111. A program 113 is tangibly stored in the memory assembly 111. The program 113 includes coded instructions (programmed coded instructions) that are configured to be readable by (and executable by) the controller 110. The instructions, in use, urge the controller 110 to perform predetermined operations. The memory assembly 111 is a device configured to store the program 113 having coded instructions that are readable by and executable by the controller 110. The controller 110 is configured to read the coded instructions (from the memory assembly 111), and execute the instructions that urge the controller 110 to read, for instance, the encoder position (angular displacement of the rotatable common shaft 102) from the angular encoder 115 (that is operatively connected to the controller 110), and then write the encoder position to the memory assembly 111. For instance, the controller 110 is configured to read coded instructions that instruct the controller 110 to (A) read the voltage sensor assembly Vcon1 (depicted in FIG. 28) and the voltage sensor assembly Vcon2 (depicted in FIG. 28), which are inputs to the controller 110 via an interface module, (B) compute the status of the batteries (Batt1 or battery 1) and Batt2 or battery 2), and (C) write the battery status to the memory assembly 111. Preferably, the controller 110 is configured to accept the digital output from the angular encoder 115 directly.

Electrical communication between the controller 110 and the battery module 112 is also bi-directional as the controller 110 reads the status of the batteries in the battery module 112, and also outputs digital states to the switches of the battery module 112 based on the status of the batteries. Electrical communication between the controller 110 and the first generator interface module 214, the electric motor interface module 216 and the second generator interface module 218 is unidirectional. That is, the controller 110 is configured to write the digital status to (or to control the state of) the controllable switches that are associated with (A) the first generator interface module 214, (B) the electric motor interface module 216, and (C) the second generator interface module 218 based on the encoder position (which was provided by the angular encoder 115) that is stored in the memory assembly 111.

Preferably, the controller 110 is configured to interface with the rotatable electric machines. The controller 110 is configured to prevent electromechanical retardation (or braking) of the rotatable common shaft 102 when (A) a current is flowing in the stationary electromagnet coil windings of the rotatable electric machines, and (B) the rotatable common shaft 102 is rotated.

Preferably, the controller 110 is configured to recycle any stored energy in the rotatable electrical machines for any one of: (A) supplementing the electrical energy supplied from a DC source (such as the battery module 112 as depicted in FIG. 1), (B) recharging the batteries of the battery module 112, and (C) providing electrical power to an external load (depicted in FIG. 43 and FIG. 44).

To mitigate, at least in part, at least one problem associated with the existing technology, there is provided (in accordance with a major aspect) an apparatus. The apparatus includes a rotatable common shaft 102 configured to be rotatable about a longitudinal shaft axis 103 extending along the rotatable common shaft 102. Rotatable electric machines are arranged on the rotatable common shaft 102 in such a way that the disk assemblies of the rotatable electric machines and the rotatable common shaft 102 are concurrently rotatable. The disk assemblies of the rotatable electric machines are arranged on the rotatable common shaft 102 in such a way that a net cogging force 900, which is generated by the rotatable electric machines, and which is imparted to the rotatable common shaft 102, is reduced.

In view of the foregoing, there is provided (in accordance with a major aspect) a method. The method includes arranging rotatable electric machines on a rotatable common shaft 102 configured to be rotatable about a longitudinal shaft axis 103 extending along the rotatable common shaft 102. This is done in such a way that (A) disk assemblies of the rotatable electric machines and the rotatable common shaft 102 are concurrently rotatable, and (B) a net cogging force 900, which is generated by the rotatable electric machines, and which is imparted to the rotatable common shaft 102, is reduced.

In summary, the apparatus includes the rotatable common shaft 102 configured to be rotatable about a longitudinal shaft axis 103 extending along the rotatable common shaft 102. The disk assemblies of the rotatable electric machines are arranged on (preferably affixed to) the rotatable common shaft 102. This is done in such a way that disk assemblies of the rotatable electric machines and the rotatable common shaft 102 are concurrently rotatable. The rotatable electric machines are arranged on the rotatable common shaft 102 in such a way that a net cogging force 900, which is generated by the rotatable electric machines, and which is imparted to the rotatable common shaft 102, is reduced.

In summary, the method for operating the rotatable electric machines includes arranging the rotatable electric machines on the rotatable common shaft 102, which is configured to be rotatable about a longitudinal shaft axis 103 extending along the rotatable common shaft 102. This is done in such a way that (A) disk assemblies of the rotatable electric machines and the rotatable common shaft 102 are concurrently rotatable, and (B) a net cogging force 900, which is generated by the rotatable electric machines, and which is imparted to the rotatable common shaft 102, is reduced.

Figure 2:
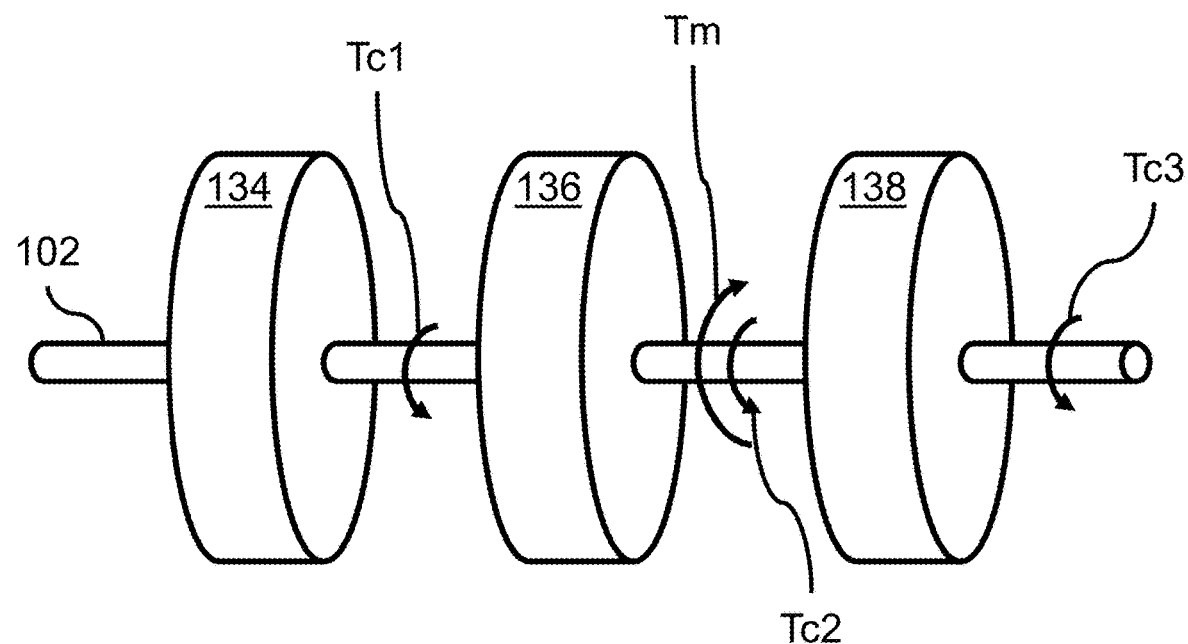
FIG. 2 and FIG. 3 depict a perspective view (FIG. 2) and a schematic view (FIG. 3) of a net cogging force generated as a result of using the apparatus of FIG. 1.
Figure 3:
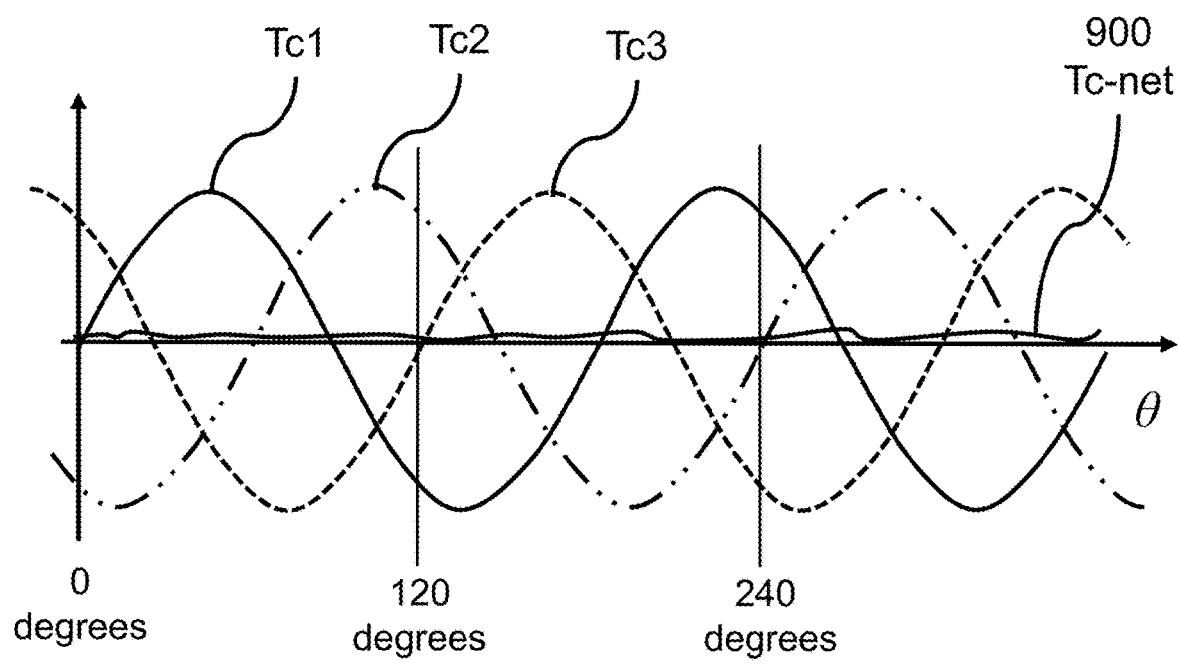

FIG. 2 and FIG. 3 depict a perspective view (FIG. 2) and a schematic view (FIG. 3) of a net cogging force 900 generated as a result of using the apparatus of FIG. 1.

Referring to the embodiment as depicted in FIGS. 2 and 3, it will be appreciated that the possible topologies (embodiments) of the apparatus may include any combination of (A) all electric motors, (B) all electric generators, or (C) any combination of electric motors and electric generators.

In accordance with a preferred embodiment, the second rotatable electric machine 106 is configured (used) to rotate the rotatable common shaft 102 (the second rotatable electric machine 106 is considered the prime mover of the rotatable common shaft 102), and the first rotatable electric machine 104 and the third rotatable electric machine 108 are driven by virtue of being rigidly coupled to the rotatable common shaft 102. It will be appreciated that the first rotatable electric machine 104 and the third rotatable electric machine 108 may also be configured to rotate the rotatable common shaft 102 when operated as either electric motors or electric generators. It will be appreciated that the first rotatable electric machine 104, the second rotatable electric machine 106 and the third rotatable electric machine 108 operate together (cooperate) to reduce the net cogging torque transmitted to the rotatable common shaft 102 to preferably zero or close to zero.

Referring to the embodiment as depicted in FIG. 3, the x-axis (the horizontal axis) represents $\theta$, which is the angular displacement as detected by the angular encoder 115 of FIG. 1.

$Tc1$ is generated by the first rotatable electric machine 104 (or the first electric generator assembly 204 of FIG. 1), and is the cogging torque acting on the first disk assembly 134, and $Tc1 = T \sin(m\theta)$.

$Tc2$ is generated by the second rotatable electric machine 106 (or the electric motor assembly 206 of FIG. 1), and is the cogging torque acting on the second disk assembly 136, and $Tc2 = T \sin(m\theta - 120 \text{ degrees})$.

$Tc3$ is generated by the third rotatable electric machine 108 (or the second electric generator assembly 208 of FIG. 1), and is the cogging torque acting on the third disk assembly 138, and $Tc3 = T \sin(m\theta - 240 \text{ degrees})$.

The angle $\theta$ of the rotatable common shaft 102 represents the displacement from a fixed starting position and varies from 0 degrees to 360 degrees for a complete revolution of the rotatable common shaft 102.

Tm is the instantaneous electromechanical torque transmitted to the rotatable common shaft 102 by the first rotatable electric machine 104. It will be appreciated that Tm may also be the algebraic sum of the instantaneous electromechanical torques transmitted to the rotatable common shaft 102 by the first rotatable electric machine 104, the second rotatable electric machine 106 and the third rotatable electric machine 108.

T is the peak cogging torque acting on the first rotatable electric machine 104, the second rotatable electric machine 106 and the third rotatable electric machine 108.

Tnet is the net torque acting on the rotatable common shaft 102, and $Tnet = Tm + Tc1 + Tc2 + Tc3$.

Tcnet is the net cogging torque acting on the rotatable common shaft 102 due to the cogging torques generated by the first rotatable electric machine 104, the second rotatable electric machine 106 and the third rotatable electric machine 108, which preferably is zero (or near zero).

Ac is the equiangular displacement between the stationary electromagnetic coil windings (coil pairs) about the longitudinal shaft axis 103. Am is the equiangular displacement between the permanent magnets about the longitudinal shaft axis 103. For the embodiment presented in FIG. 6 and FIG. 7, $Ac = (360/5) = 72$ degrees (as depicted in FIG. 6), and $Am = 360/6 = 60$ degrees (as depicted in FIG. 7).

It is understood that $m = 360 \text{ degrees}/(Ac - Am)$.

It is appreciated that the "m" above is the coefficient of the angular displacement $\theta$ of the rotatable common shaft 102 and represents the number of cycles of the cogging torque acting on the rotatable disk assemblies per revolution of the rotatable common shaft 102.

Figure 6:
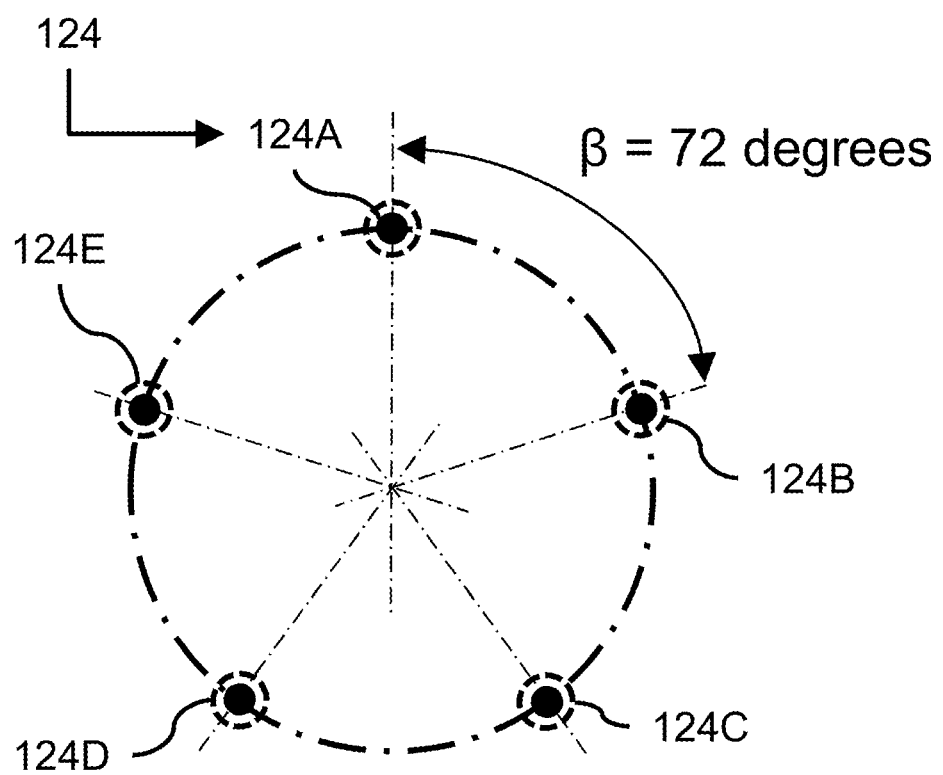
FIG. 6 depicts a side view of an embodiment of the first stationary electromagnetic coil pair collection usable for any one of the first rotatable electric machine, the second rotatable electric machine, and the third rotatable electric machine of the apparatus of FIG. 1.
Figure 7:
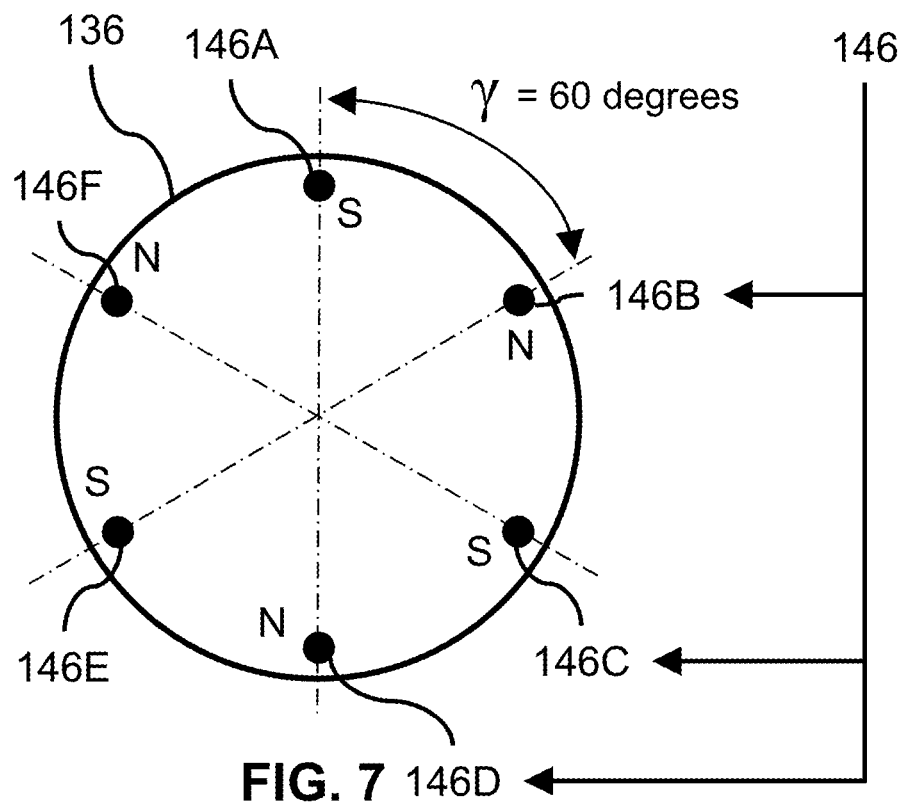
FIGS. 7 and 8 depict side views of embodiments of the second magnet collection usable for the second disk assembly of the second rotatable electric machine of FIG. 1.

N is the number of disk assemblies mounted to the rotatable common shaft 102 (which is three for the embodiment as depicted in FIGS. 6 and 7).

The angular shift (AS) is the circumferential angular shift between the disk assemblies of the rotatable electric machines relative to the longitudinal shaft axis 103 of the rotatable common shaft 102, and is computed using the formula: $AS = \text{absolute value } (Am - Ac)/N$.

For the embodiment presented in FIG. 6 and FIG. 7, $Ac = (360/5) = 72$ degrees (as depicted in FIG. 6), and $Am = 360/6 = 60$ degrees (as depicted in FIG. 7).

For the embodiment as depicted in FIG. 6 and FIG. 7, $m = 360/(72 - 60) = 30$ (which is the coefficient of angular displacement $\theta$).

In accordance with the embodiments as depicted in FIGS. 6 and 7, there are six permanent magnets and five coil pairs per each of the first rotatable electric machine 104 (the first electric generator assembly 204), the second rotatable electric machine 106 (the electric motor assembly 206), and the third rotatable electric machine 108 (the second electric generator assembly 208).

In accordance with the embodiments as depicted in FIG. 6 and FIG. 7, the angular shift (AS) = absolute value of $(60 - 72)/3 = 4$ degrees (which is also depicted in FIGS. 9 and 11).

It will be appreciated that Tc1, Tc2 and Tc3 are sinusoidal in nature. The algebraic sum of the cogging torque, Tnet, is zero (preferably) due to the circumferential angular shift between the first disk assembly 134, the second disk assembly 136 and the third disk assembly 138. The circumferential angular shift (also called a relative circumferential phase shift, a relative circumferential mechanical phase shift, or a mechanical phase shift, or any equivalent thereof) between the first disk assembly 134, the second disk assembly 136 and the third disk assembly 138 is depicted in FIG. 9, FIG. 10 and FIG. 11.

The rotatable electric machines are arranged on the rotatable common shaft 102 in such a way that a relative mechanical phase shift is maintained as the rotatable electric machines are rotated.

To cancel (reduce or eliminate) the net cogging force, multiple disk assemblies (that is, of the rotatable electric machines) may be mounted to the rotatable common shaft 102, in which each of the disk assemblies are mounted or arranged on the rotatable common shaft 102; this is done in such a way that there is an angular shift between the first disk assembly 134 of the first rotatable electric machine 104, the second disk assembly 136 of the second rotatable electric machine 106, and the third disk assembly 138 of the third rotatable electric machine 108.

The following formula is used to compute Tcnet=(Tc1+Tc2+Tc3).

$$T\text{cnet}=Tc1=T\sin(m\theta)+T\sin(m\theta-120\text{ degrees})+T\sin(m\theta-240\text{ degrees}).$$

This trigonometric equation can be manipulated and reduced to show that Tcnet=0.

Tnet (net torque acting on the rotatable common shaft 102)=Tm (torque generated by the second rotatable electric machine 106 or by the electric motor assembly 206)+Tcnet=Tm+0=Tm.

Figure 4:
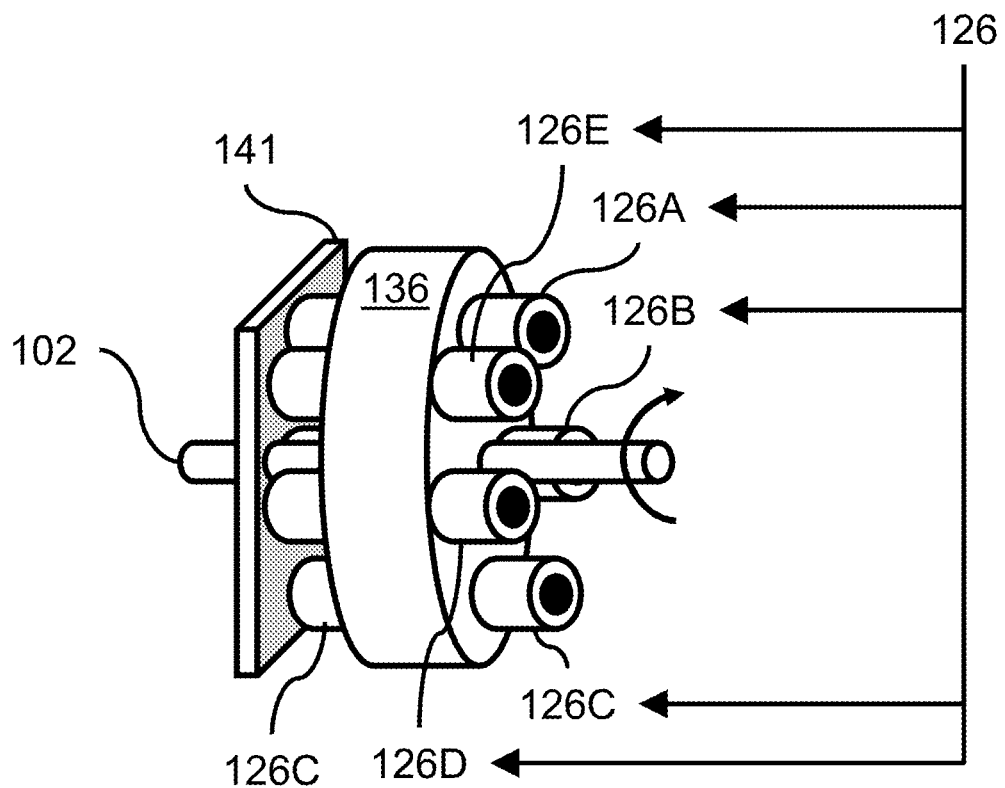
FIG. 4 depicts a close-up partial perspective view of an embodiment of an electric motor assembly of the apparatus of FIG. 1.

FIG. 4 depicts a close-up partial perspective view of an embodiment of a second rotatable electric machine 106 of the apparatus of FIG. 1.

Referring to the embodiment as depicted in FIG. 4, the second rotatable electric machine 106 includes the electric motor assembly 206 (as depicted in FIG. 1). The second rotatable electric machine 106 includes the second stationary electromagnetic coil pair collection 126. The coil pairs of the second stationary electromagnetic coil pair collection 126 are positioned relative to each other in such a way that the second disk assembly 136 is positionable between the coil pairs. The second disk assembly 136 is configured to be affixed to the rotatable common shaft 102 in such a way that the second disk assembly 136, in use, rotates together with the rotatable common shaft 102 (in unison). A stationary housing 141 is configured to support the second stationary electromagnetic coil pair collection 126 relative to the second disk assembly 136.

In accordance with the embodiment as depicted in FIG. 4, the second stationary electromagnetic coil pair collection 126 includes a first stationary coil pair 126A, a second stationary coil pair 126B, a third stationary coil pair 126C, a fourth stationary coil pair 126D, and a fifth stationary coil pair 126E, all spaced apart from each other, and each has end sections that face the second disk assembly 136.

It will be appreciated that the embodiment as depicted in FIG. 4, for the second stationary electromagnetic coil pair collection 126 of the second rotatable electric machine 106 (or of the electric motor assembly 206), is equally applicable for the first stationary electromagnetic coil pair collection 124 of the first rotatable electric machine 104, and is equally applicable for the third stationary electromagnetic coil pair collection 128 of the third rotatable electric machine 108, as depicted in FIG. 1.

Figure 5:
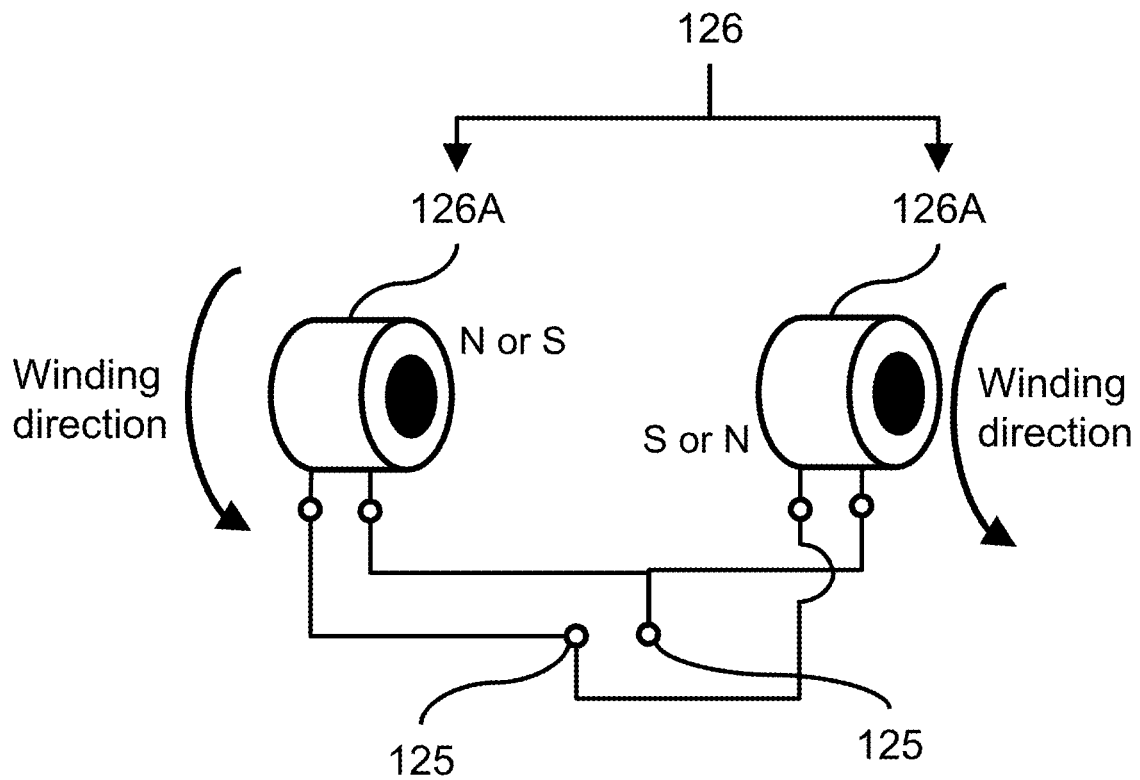
FIG. 5 depicts a close-up partial perspective view of an embodiment of one electromagnet coil pair (also called windings) of a second stationary electromagnetic coil pair collection usable for any one of the first rotatable electric machine, the second rotatable electric machine, and the third rotatable electric machine of the apparatus of FIG. 1.

FIG. 5 depicts a close-up partial perspective view of an embodiment of the second stationary electromagnetic coil pair collection 126 usable for any one of the first rotatable electric machine 104, the second rotatable electric machine 106, and the third rotatable electric machine 108 of the apparatus of FIG. 1.

Referring to the embodiment as depicted in FIG. 5, the first stationary coil pair 126A, which are spaced apart from each other, are wound in the same direction (such as the counter-clockwise direction). The electrical terminals 125 electrically connect the windings of the first stationary coil pair 126A in such a way that the magnetic polarity of the first stationary coil pair 126A, once the first stationary coil pair 126A is energized or electrified, assist each other and are not in opposition to one another. For the case where magnetic polarity N (north) is provided by a face section of one of the coil pair of the first stationary coil pair 126A, the adjacent face section of the neighboring coil pair of the first stationary coil pair 126A provides the magnetic polarity S (south) and vice versa. Generally, each coil section forming the electromagnet pair has opposing polarity. That is, if one coil section is a north pole towards the rotatable disk assembly, then the other coil section (the opposing coil section) is a south pole towards the rotatable disk assembly and vice versa.

It will be appreciated that the embodiment as depicted in FIG. 5, for the second stationary electromagnetic coil pair collection 126 of the second rotatable electric machine 106 (or of the electric motor assembly 206), is equally applicable for the first stationary electromagnetic coil pair collection 124 of the first rotatable electric machine 104, and is equally applicable for the third stationary electromagnetic coil pair collection 128 of the third rotatable electric machine 108, as depicted in FIG. 1.

FIG. 6 depicts a side view of an embodiment of the first stationary electromagnetic coil pair collection 124 usable for any one of the first rotatable electric machine 104, the second rotatable electric machine 106, and the third rotatable electric machine 108 of the apparatus of FIG. 1.

In accordance with the embodiment as depicted in FIG. 6, the first stationary electromagnetic coil pair collection 124 includes the first stationary coil pair 124A, the second stationary coil pair 124B, the third stationary coil pair 124C, the fourth stationary coil pair 124D, and the fifth stationary coil pair 124E, all spaced apart from each other. Preferably, the stationary electromagnet coil pairs are positioned in the same plane, at the same perpendicular distance (also called a radial distance) from the longitudinal shaft axis 103, and are also equally spaced apart from each other at positions that are located around (along) a circumferential path that is described by the radial position of the stationary electromagnet coil pairs relative to longitudinal shaft axis 103. The stationary electromagnet coil pairs are positioned equidistant from the longitudinal shaft axis 103, and are also spaced equally from each other (at positioned located) along a circumferential path described by the radial position (radial distance) of the stationary electromagnet coil pairs with respect to longitudinal shaft axis 103. The stationary electromagnet coil pairs are mounted (positioned) in the same plane.

In accordance with the embodiment as depicted in FIG. 6, each of the coil pairs of the first stationary electromagnetic coil pair collection 124 are spaced apart at a predetermined angle relative to the rotation axis and positioned the same radial distance from the axis of rotation. For the case where there is a quantity of five coil pairs, the angular spacing is, preferably, about 72 degrees.

It will be appreciated that the embodiment as depicted in FIG. 6, for the first stationary electromagnetic coil pair collection 124, is equally applicable for the second stationary electromagnetic coil pair collection 126 of the second rotatable electric machine 106, and is equally applicable for the third stationary electromagnetic coil pair collection 128 of the third rotatable electric machine 108, as depicted in FIG. 1.

Figure 8:
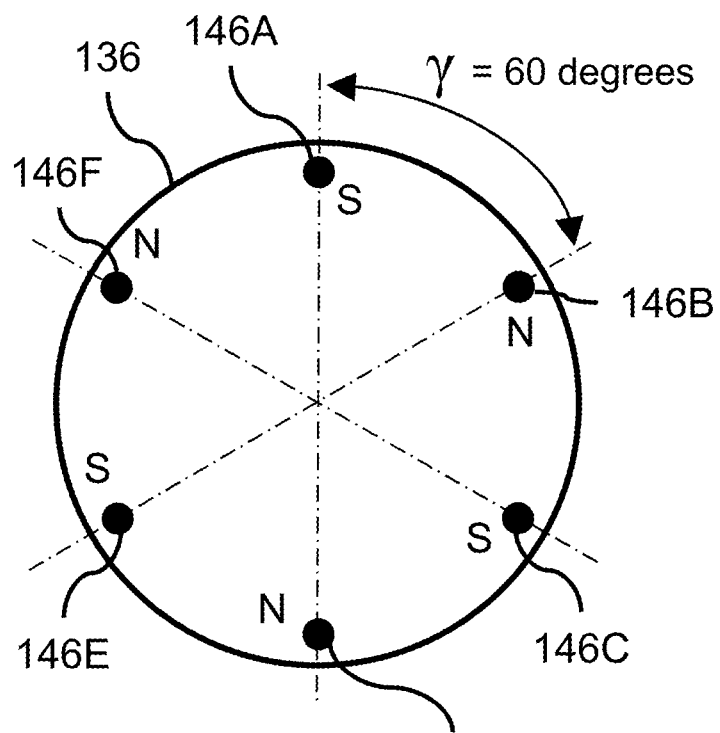

FIGS. 7 and 8 depict side views of embodiments of the second magnet collection 146 usable for the second disk assembly 136 of the second rotatable electric machine 106 of FIG. 1.

Referring to the embodiment as depicted in FIG. 7, the second disk assembly 136 faces the first rotatable electric machine 104 (or faces the first electric generator assembly 204) of FIG. 1. As depicted in FIG. 8, the second disk assembly 136 faces the third rotatable electric machine 108 (or faces the second electric generator assembly 208) of FIG. 1. It will be appreciated that it is not strictly necessary to place the second rotatable electric machine 106 physically between the first rotatable electric machine 104 and the third rotatable electric machine 108. That is, the second rotatable electric machine 106 may swap places or positions with either the first rotatable electric machine 104 or the third rotatable electric machine 108 with no adverse impact on system performance. It will be appreciated that the permanent magnets are mounted to (affixed to) the disk assemblies (134, 136, 138), as depicted in FIG. 1.

The second magnet collection 146 includes spaced apart magnets (preferably, spaced-apart permanent magnets). The second magnet collection 146 includes a quantity of six magnet assemblies. Preferably, the second magnet collection 146 includes a first magnet assembly 146A, a second magnet assembly 146B, a third magnet assembly 146C, a fourth magnet assembly 146D, a fifth magnet assembly 146E, and a sixth magnet assembly 146F.

In accordance with the embodiment as depicted in FIGS. 7 and 8, each of the magnet assemblies of the second magnet collection 146 are spaced apart at a predetermined angle relative to the rotation axis and positioned the same radial distance from the axis of rotation. For the case where there is a quantity of six magnet assemblies, the angular spacing is, preferably, about 60 degrees. It will be appreciated that the embodiments as depicted in FIG. 7 and FIG. 8, for the second magnet collection 146 of the second rotatable electric machine 106 (or of the electric motor assembly 206), is equally applicable for the first magnet collection 144 of the first rotatable electric machine 104, and is equally applicable for the third magnet collection 148 of the third rotatable electric machine 108, as depicted in FIG. 1.

FIGS. 9, 10 and 11 depict side views of embodiments of a first magnet collection 144, a second magnet collection 146, and a third magnet collection 148 respectively usable for the first rotatable electric machine 104, the second rotatable electric machine 106, and the third rotatable electric machine 108 of the apparatus of FIG. 1.

In accordance with the embodiment as depicted in FIG. 9, the first magnet collection 144 is mounted to, and affixed to, the first disk assembly 134. The first magnet collection 144 includes spaced-apart permanent magnets positioned radially from the central zone of the first disk assembly 134. The first magnet collection 144 includes a first magnet assembly 144A, a second magnet assembly 144B, a third magnet assembly 144C, a fourth magnet assembly 144D, a fifth magnet assembly 144E, and a sixth magnet assembly 144F, all spaced apart from each other.

In accordance with the embodiment as depicted in FIG. 10, the second magnet collection 146 is mounted to, and affixed to, the second disk assembly 136. The second magnet collection 146 includes spaced-apart permanent magnets positioned radially from the central zone of the second disk assembly 136. The second magnet collection 146 includes a first magnet assembly 146A, a second magnet assembly 146B, a third magnet assembly 146C, a fourth magnet assembly 146D, a fifth magnet assembly 146E, and a sixth magnet assembly 146F, all spaced apart from each other.

In accordance with the embodiment as depicted in FIG. 11, the third magnet collection 148 is mounted to, and affixed to, the third disk assembly 138. The third magnet collection 148 includes spaced-apart permanent magnets positioned radially from the central zone of the third disk assembly 138. The third magnet collection 148 includes a first magnet assembly 148A, a second magnet assembly 148B, a third magnet assembly 148C, a fourth magnet assembly 148D, a fifth magnet assembly 148E, and a sixth magnet assembly 148F, all spaced apart from each other.

In accordance with embodiments as depicted in FIGS. 9, 10 and 11, the second magnet collection 146 is mounted to, and affixed to, the second disk assembly 136 in such a way that the second magnet collection 146 is positioned at a predetermined mechanical lagging angle 131 (also called a circumferential lagging offset angle) relative to the first magnet collection 144 mounted to the second disk assembly 136. In accordance with the embodiment as depicted, the predetermined mechanical lagging angle 131 is about four degrees (that is, about four degrees from ahead of the vertical line extending through the first disk assembly 134).

In summary, the rotatable common shaft 102 is configured to be rotatable about the longitudinal shaft axis 103 extending along the rotatable common shaft 102. Rotatable electric machines (104, 106, 108) are arranged at spaced-apart positions along the rotatable common shaft 102. The rotatable electric machines (104, 106, 108) each have a respective disk assembly (134, 136, 138) that is circumferentially shifted relative to the other rotatable disk assemblies (134, 136, 138) about the longitudinal shaft axis 103. The respective disk assembly (134, 136, 138) remains circumferentially shifted relative to the other rotatable disk assemblies (134, 136, 138) while the respective disk assembly (134, 136, 138) are rotated about the longitudinal shaft axis 103. This is done in such a way that: (A) disk assemblies of the rotatable electric machines (104, 106, 108) and the rotatable common shaft 102 are concurrently rotatable; and (B) the net cogging force 900, which is generated by the rotatable electric machines (104, 106, 108), and which is imparted to the rotatable common shaft 102, is reduced.

In accordance with embodiments as depicted in FIGS. 9, 10 and 11, the second magnet collection 146 is mounted to, and affixed to, the second disk assembly 136 in such a way that the second magnet collection 146 is positioned at a predetermined leading mechanical angle 133 (also called a circumferential leading offset angle) relative to the third magnet collection 148 mounted to the third disk assembly 138. For instance, the predetermined leading mechanical angle 133 is four degrees (that is, about four degrees from behind the vertical line extending through the third disk assembly 138).

It will be appreciated that the angular shift (AS) may apply to either the rotatable disk assemblies or the stationary coil pair collections. In other words, (A) the rotatable disks respectively correspond to the first disk assembly 134, (B) the second disk assembly 136 and the third disk assembly 138 may be geometrically aligned, (C) the set of first stationary electromagnetic coil pair collection 124, and (D) the second stationary electromagnetic coil pair collection 126 and the third stationary coil pair collection are circumferentially shifted relative to each other.

It will be appreciated that the four degrees angular shift is applicable for the embodiment of the apparatus having six spaced-apart permanent magnets and five coil pairs.

For the embodiment presented in FIG. 6 and FIG. 7, Ac=360/5=72 degrees (as depicted in FIG. 6), and Am=360/6=60 degrees (as depicted in FIG. 7).

The angular shift is represented by As. As equals the absolute value (Am−Ac)/N.

For the embodiment as depicted in FIGS. 9, 10 and 11, As=abs (60−72)/3=4 degrees.

Figure 12:
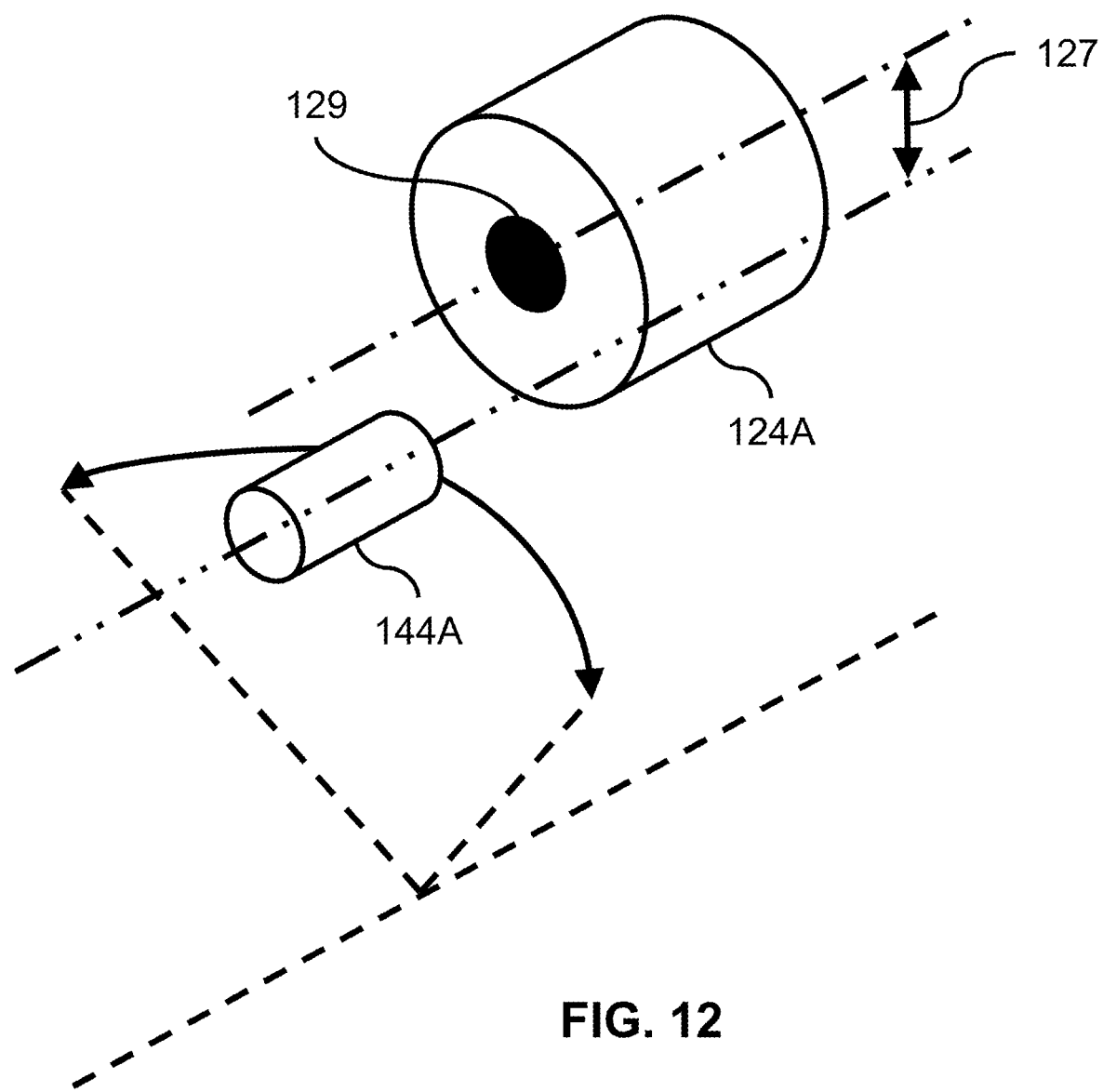
FIG. 12 depicts a partial perspective view of an embodiment of a first magnet assembly, a first stationary coil pair and an illustrated coaxial offset usable for any one of the first rotatable electric machine, the second rotatable electric machine, and the third rotatable electric machine of the apparatus of FIG. 1.

FIG. 12 depicts a partial perspective view of an embodiment of a first magnet assembly 144A and a first stationary coil pair 124A usable for any one of the first rotatable electric machine 104, the second rotatable electric machine 106, and the third rotatable electric machine 108 of the apparatus of FIG. 1.

Referring to the embodiment as depicted in FIG. 12, there is a coaxial offset 127 between the first stationary coil pair 124A and the permanent magnets of the first magnet collection 144. A center axis, which is parallel to the longitudinal shaft axis 103, extends through the first stationary coil pair 124A. A central axis, which is parallel to the longitudinal shaft axis 103, extends (respectively) through each of the permanent magnets of the first magnet collection 144. The coaxial offset 127 is the distance between the center axis extending through the first stationary coil pair 124A and the central axis respectively extending through each of the permanent magnets of the first magnet collection 144. The first stationary coil pair 124A includes an electromagnetic core 129. The centerline (central axis) of each of the permanent magnets of the first magnet collection 144 and the electromagnetic core 129 of the first stationary coil pair 124A are coaxially offset from each other, so that the torque generated by the second rotatable electric machine 106 (the electric motor assembly 206) is maximized. In general terms, the stationary electromagnet coil pairs each have the stationary electromagnetic cores that are spaced apart from the permanent magnets of the disk assemblies (134, 136, 138) by an air gap and a coaxial offset. A center axis (which is parallel to the longitudinal shaft axis 103, and which is spaced apart from the longitudinal shaft axis 103) extends through each of the stationary electromagnet coil pairs. A central axis (which is parallel to the longitudinal shaft axis 103, and which is spaced apart from the longitudinal shaft axis 103) extends through each of the permanent magnets of the disk assemblies (134, 136, 138). The coaxial offset is a radial distance between the center axis of the stationary electromagnet coil pairs and the central axis of the permanent magnets of the disk assemblies (134, 136, 138) with respect to the longitudinal shaft axis 103.

It will be appreciated that there is a coaxial offset between the electromagnetic cores of the coil pairs (coil windings) and the permanent magnets of the first rotatable electric machine 104, the second rotatable electric machine 106 and the third rotatable electric machine 108.

Demagnetization of the stationary electromagnetic cores of the stationary electromagnet coil pairs of the rotatable electric machines occurs with no electrical input power from a DC input source at a point where the stationary electromagnetic cores and the permanent magnets of the disk assemblies are radially in alignment and coaxially offset from each other.

Preferably, the stationary electromagnetic cores of the stationary electromagnet coil windings of the rotatable electric machines are configured to (A) achieve saturated magnetic flux with minimal electrical power input from the DC source, (B) maintain a high remnant magnetic flux (preferably greater than 70% of the saturated magnetic flux), (C) require minimal electrical power input from the DC source to demagnetize, and (D) have relatively low hysteresis and eddy current losses.

Preferably, a remnant magnetic flux in the stationary electromagnetic cores (of the stationary electromagnet coil pairs of the rotatable electric machines 104, 106, 108) is used to maximize a magnetic attraction force of the permanent magnets of the disk assemblies (134, 136, 138) as the permanent magnets of the disk assemblies (134, 136, 138) rotate towards the stationary electromagnet coil pairs.

Preferably, just enough current is permitted to flow in the stationary electromagnet coil pairs (coil windings) to maximize a magnetic repulsive force on the permanent magnets (of the disk assemblies 134, 136, 138) as the permanent magnets of the disk assemblies (134, 136, 138) rotate away from between the stationary electromagnet coil pairs. Preferably, the current flow in the coil pairs (that is, the stationary electromagnet coil windings) should cause the magnetic flux in the stationary electromagnetic cores to just reach magnetic saturation. For the case where the current is allowed to exceed this threshold value, then the efficiency of the apparatus may suffer.

Preferably, the energy stored in a magnetic field of the stationary electromagnet coil windings is reused to aid in a magnetic repulsion of the permanent magnets of the disk assemblies away from the stationary electromagnet coil windings. The energy stored in a magnetic field of the stationary electromagnet coil pairs is converted to electrical energy and is reused to aid in a magnetic repulsion of the permanent magnets of the disk assemblies away from the stationary electromagnet coil pairs.

Generally, the electromagnetic torque acting on the disk assemblies (134, 136, 138) of the rotatable electric machines (104, 106, 108) is a function of the remnant flux in the electromagnet coil pairs of the rotatable electric machines (104, 106, 108), the electrical power drawn from the DC input source (such as the DC/DC converter module 317), and the energy stored in the magnetic field of the electromagnet coil pairs of the rotatable electric machines (104, 106, 108).

FIGS. 13, 14, 15 and 16 depict side views of embodiments of a first magnet assembly 144A and a first stationary coil pair 124A usable for any one of the first rotatable electric machine 104, the second rotatable electric machine 106, and the third rotatable electric machine 108 of the apparatus of FIG. 1.

FIG. 13 depicts the preferred embodiment for the coaxial offset. Preferably, the coaxial offset between the periphery of the electromagnetic core of the first stationary coil pair 124A and the periphery of the first magnet assembly 144A should be zero for optimum performance of the first rotatable electric machine 104 (or the first rotatable electric machine 104), and it will be appreciated that this statement is applicable for the second rotatable electric machine 106, and the third rotatable electric machine 108. It will be appreciated that this is the case if the electromagnetic core and the permanent magnet have dissimilar cross-sectional areas. For the case where the electromagnetic core and the permanent magnet have the same cross-sectional area, a coaxial offset as per FIG. 16 may be optimal. An improved performance may result if both cross-sectional areas (of the electromagnetic core and the permanent magnet) are equal or approximately equal to each other.

FIGS. 14 and 15 represent less-preferred embodiments for the coaxial offset, in which the performance may be suboptimum for the coaxial offset as depicted.

It will be appreciated that the cross-sectional profiles of the electromagnetic core 129 and the permanent magnets of the first magnet collection 144 may be different from each other (if so desired).

Figure 17:
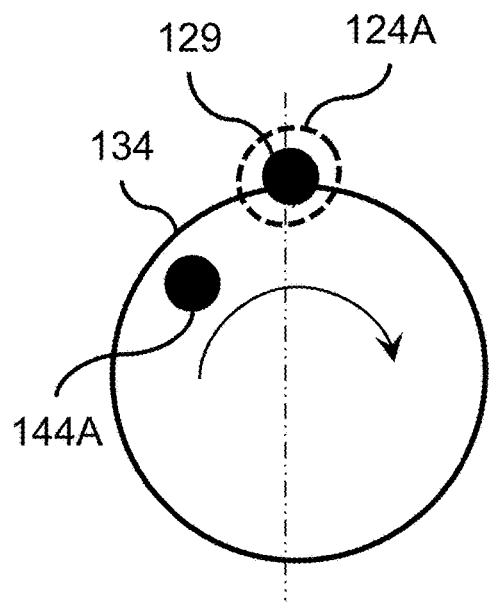
FIGS. 17, 18, and 19 depict side views of embodiments of a first magnet assembly and a first stationary coil pair usable for any one of the first rotatable electric machine, the second rotatable electric machine, and the third rotatable electric machine of the apparatus of FIG. 1.
Figure 18:
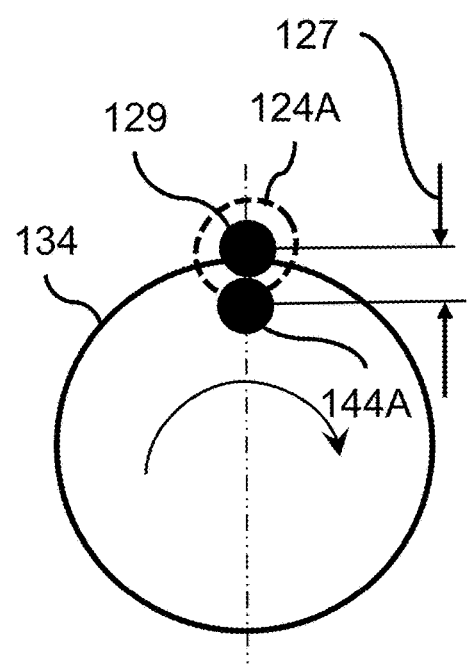
Figure 19:
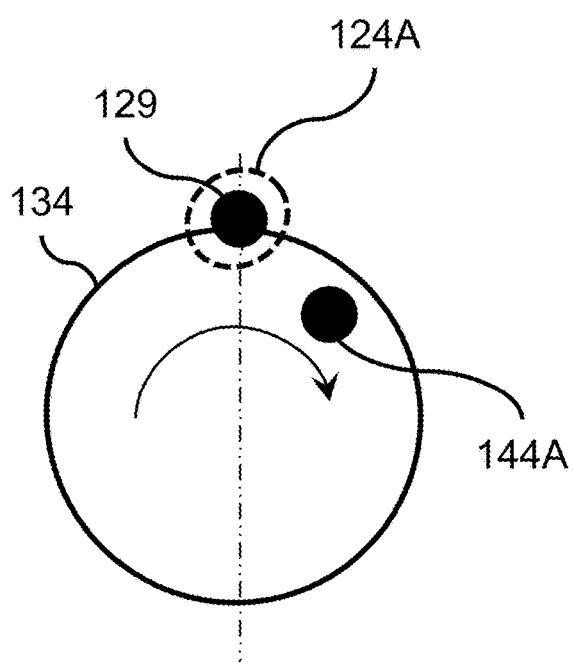

FIGS. 17, 18, and 19 depict side views of embodiments of a first magnet assembly 144A and a first stationary coil pair 124A usable for any one of the first rotatable electric machine 104, the second rotatable electric machine 106, and the third rotatable electric machine 108 of the apparatus of FIG. 1.

In accordance with the embodiment as depicted in FIGS. 17, 18 and 19, the coaxial offset 127 (also depicted in FIG. 12) is the distance between the centerlines of the first stationary coil pair 124A and the first magnet assembly 144A. Preferably, the coaxial offset is such that the radial distance between the bottom portion of the electromagnetic core 129 of the first stationary coil pair 124A and the top portion the permanent magnet of the first magnet assembly 144A is zero (for maximizing efficiency). In other words, there is (A) no radial overlap (radial overlap is depicted in FIG. 16) between the bottom portion of the electromagnetic core 129 of the first stationary coil pair 124A and the top portion of the first magnet assembly 144A (as noted earlier, this may be optimal if the cross-sectional areas are the same for the electromagnetic core and the permanent magnet), and (B) no radial separation (radial separation is depicted in FIGS. 14 and 15) between the bottom portion of the electromagnetic core 129 of the first stationary coil pair 124A and the top portion of the first magnet assembly 144A.

Figure 20:
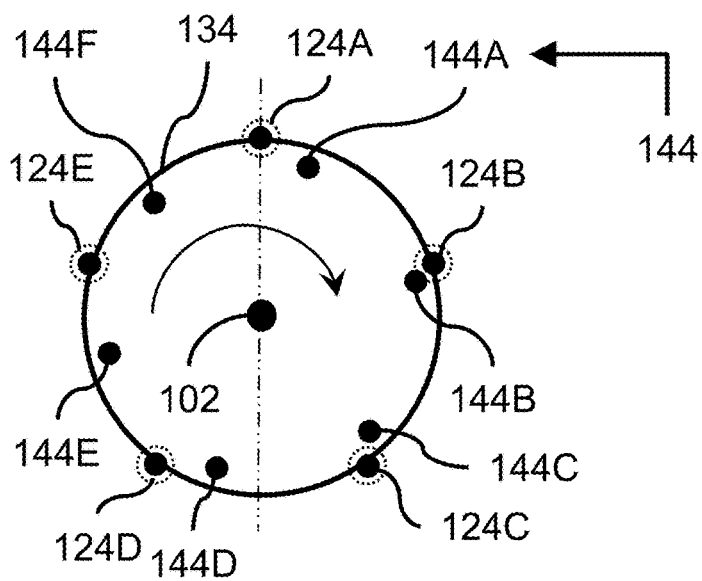
FIGS. 20, 21, and 22 depict side views of embodiments of the first magnet collection, the second magnet collection and the third magnet collection respectively usable for the first rotatable electric machine, the second rotatable electric machine, and the third rotatable electric machine of FIG. 1.
Figure 21:
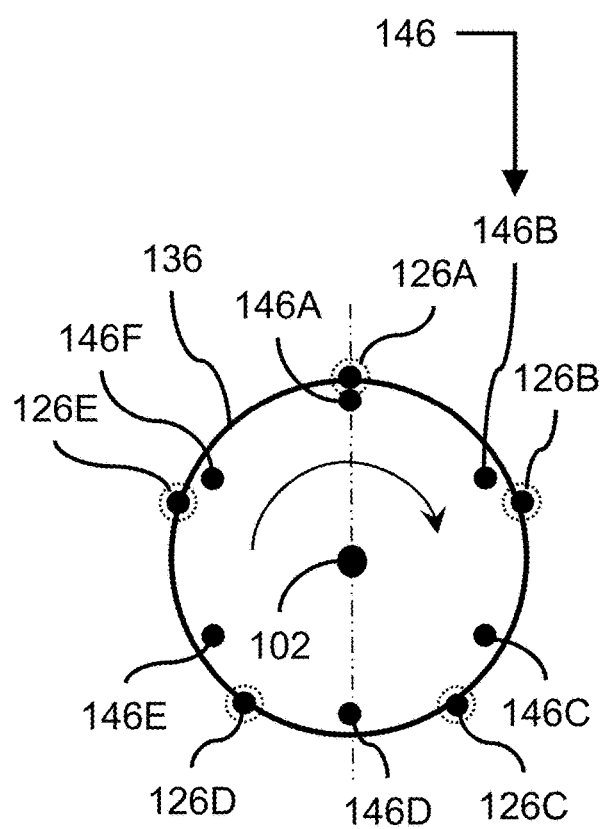
Figure 22:
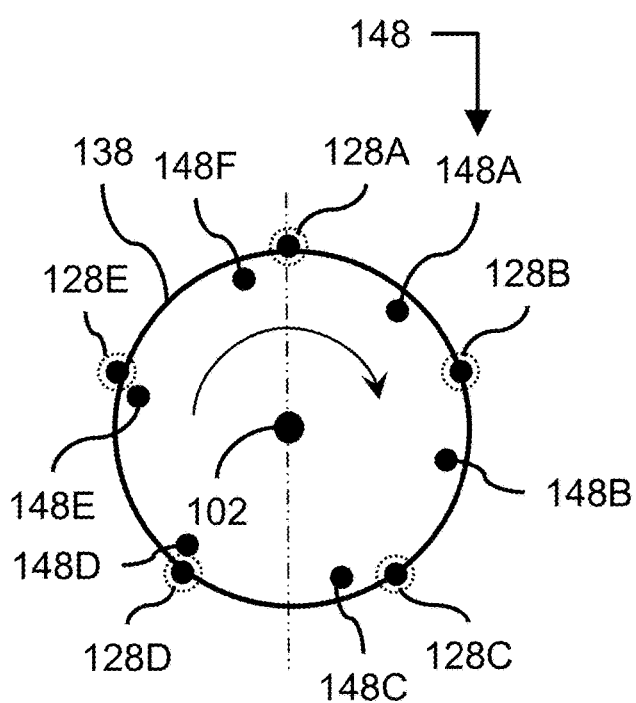

FIGS. 20, 21, and 22 depict side views of embodiments of the first magnet collection 144, the second magnet collection 146 and the third magnet collection 148 respectively usable for the first rotatable electric machine 104, the second rotatable electric machine 106, and the third rotatable electric machine 108 of FIG. 1.

Referring to the embodiment as depicted in FIG. 20, the first stationary electromagnetic coil pair collection 124 includes spaced-apart coil pairs positioned on opposite sides of the first disk assembly 134. The spaced-apart coil pairs are each positioned axially equidistant from the surface (or plane) of the first disk assembly 134. The centers of the spaced-apart coil pairs are positioned circumferentially equiangular relative to the center of the first disk assembly 134. In accordance with a preferred embodiment, the first stationary electromagnetic coil pair collection 124 includes the first stationary coil pair 124A, the second stationary coil pair 124B, the third stationary coil pair 124C, the fourth stationary coil pair 124D, and the fifth stationary coil pair 124E.

The second stationary electromagnetic coil pair collection 126 includes spaced-apart coil pairs positioned on opposite sides of the second disk assembly 136. The spaced-apart coil pairs are each positioned axially equidistant from the surface (plane) of the second disk assembly 136. The centers of the spaced-apart coil pairs are positioned circumferentially equiangular relative to the center of the second disk assembly 136. In accordance with a preferred embodiment, the second stationary electromagnetic coil pair collection 126 includes the first stationary coil pair 126A, the second stationary coil pair 126B, the third stationary coil pair 126C, the fourth stationary coil pair 126D, and the fifth stationary coil pair 126E.

The third stationary electromagnetic coil pair collection 128 includes spaced-apart coil pairs positioned on opposite sides of the third disk assembly 138. The spaced-apart coil pairs are each positioned axially equidistant from the surface (plane) of the third disk assembly 138. The centers of the spaced-apart coil pairs are positioned circumferentially equiangular relative to the center of the third disk assembly 138. In accordance with a preferred embodiment, the third stationary electromagnetic coil pair collection 128 includes the first stationary coil pair 128A, the second stationary coil pair 128B, the third stationary coil pair 128C, the fourth stationary coil pair 128D, and the fifth stationary coil pair 128E.

The first magnet collection 144 includes spaced-apart magnets supported by the first disk assembly 134 in such a way that the opposite sides (poles) of the magnets are oriented coaxially relative to the rotatable common shaft 102, and have equal radial spacing from the axis of the rotatable common shaft 102. The spaced-apart magnets are each positioned circumferentially equidistant and radially from the center of the first disk assembly 134. The centers of the spaced-apart magnets are positioned equiangular relative to the center of the first disk assembly 134. In accordance with a preferred embodiment, the first magnet collection 144 includes the first magnet assembly 144A, the second magnet assembly 144B, the third magnet assembly 144C, the fourth magnet assembly 144D, the fifth magnet assembly 144E, and the sixth magnet assembly 144F.

The second magnet collection 146 includes spaced-apart magnets supported by the second disk assembly 136 in such a way that the opposite sides of the magnets are oriented coaxially relative to the rotatable common shaft 102, and have equal radial spacing from the axis of the rotatable common shaft 102. The spaced-apart magnets are each positioned circumferentially equidistant and radially from the center of the second disk assembly 136. The centers of the spaced-apart magnets are positioned equiangular relative to the center of the second disk assembly 136. In accordance with a preferred embodiment, the second magnet collection 146 includes the first magnet assembly 146A, the second magnet assembly 146B, the third magnet assembly 146C, the fourth magnet assembly 146D, the fifth magnet assembly 146E, and the sixth magnet assembly 146F.

The third magnet collection 148 includes spaced-apart magnets supported by the third disk assembly 138 in such a way that the opposite sides of the magnets are oriented coaxially relative to the rotatable common shaft 102, and have equal radial spacing from the axis of the rotatable common shaft 102. The spaced-apart magnets are each positioned circumferentially equidistant and radially from the center of the third disk assembly 138. The centers of the spaced-apart magnets are positioned equiangular relative to the center of the third disk assembly 138. In accordance with a preferred embodiment, the third magnet collection 148 includes the first magnet assembly 148A, the second magnet assembly 148B, the third magnet assembly 148C, the fourth magnet assembly 148D, the fifth magnet assembly 148E, and the sixth magnet assembly 148F.

Figure 23:
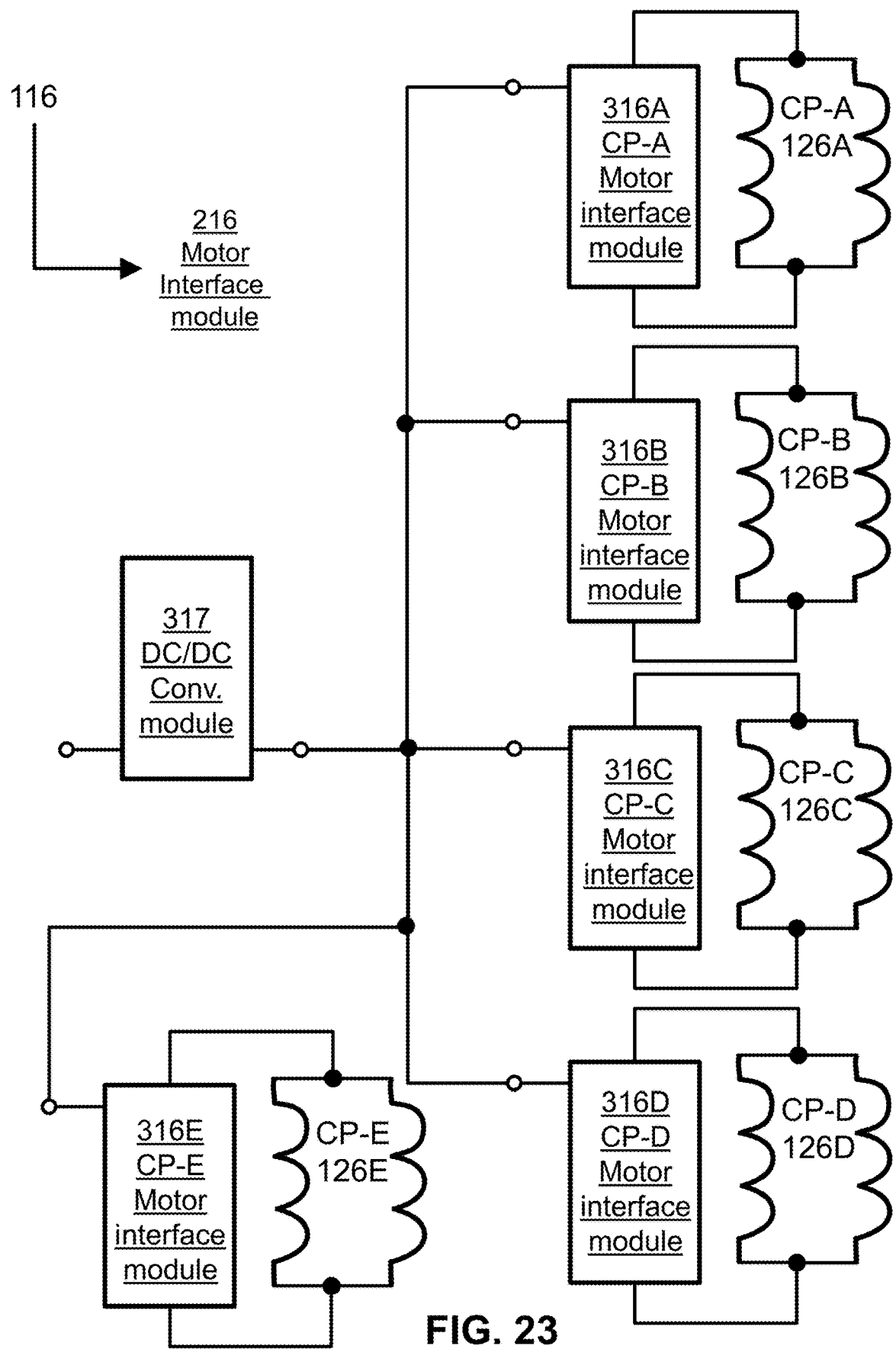
FIG. 23 depicts a schematic view of an embodiment of an electric motor interface module usable for the case where any one of the first rotatable electric machine, the second rotatable electric machine, and the third rotatable electric machine of FIG. 1 are operated as an electric motor assembly.

FIG. 23 depicts a schematic view of an embodiment of an electric motor interface module 216 usable for the case where any one of the first rotatable electric machine 104, the second rotatable electric machine 106, and the third rotatable electric machine 108 of FIG. 1 are operated as an electric motor assembly 206.

Referring to the embodiment as depicted in FIG. 23, for the case where the second rotatable electric machine 106 (depicted in FIG. 1) is configured to operate as (or include) the electric motor assembly 206 (depicted in FIG. 1), the second electric-machine interface module 116 (depicted in FIG. 1) includes the electric motor interface module 216 (depicted in FIG. 23). The electric motor interface module 216 is configured to interact (directly or indirectly) with the second disk assembly 136 (depicted in FIG. 1). The second disk assembly 136 is configured to be affixed to the rotatable common shaft 102 in such a way that the second disk assembly 136, in use, rotates together with the rotatable common shaft 102 (in unison).

In accordance with the general layout as depicted in FIG. 4 and FIG. 23, the second disk assembly 136 is positioned between, and spaced apart from, each of the first stationary coil pair 126A (also called the coil pair A or CP-A), the second stationary coil pair 126B (also called the coil pair B or CP-B), the third stationary coil pair 126C (also called the coil pair C or CP-C), the fourth stationary coil pair 126D (also called the coil pair D or CP-D), and the fifth stationary coil pair 126E (also called the coil pair E or CP-E).

The electric motor interface module 216 is configured to electrically interface with the first stationary coil pair 126A, the second stationary coil pair 126B, the third stationary coil pair 126C, the fourth stationary coil pair 126D, and the fifth stationary coil pair 126E. Preferably, the electric motor interface module 216 includes: (A) CP-A motor interface module 316A configured to electrically interface with the first stationary coil pair 126A (that is, configured for use with the coil pair A or CP-A), (B) CP-B motor interface module 316B configured to electrically interface with the second stationary coil pair 126B (that is, configured for use with the coil pair B or CP-B), (C) CP-C motor interface module 316C configured to electrically interface with the third stationary coil pair 126C (that is, configured for use with the coil pair C or CP-C), (D) CP-D motor interface module 316D configured to electrically interface with the fourth stationary coil pair 126D (that is, configured for use with the coil pair D or CP-D), and (E) CP-E motor interface module 316E configured to electrically interface with the fifth stationary coil pair 126E (that is, configured for use with the coil pair E or CP-E).

The DC/DC converter module 317 (direct current to direct current converter module) is a known commercial product (and is therefore not described here). The DC/DC converter module 317 is configured to convert the DC (direct current) voltage from the battery module to a higher utilization voltage. In other words, for the case where the DC voltage from the battery module 112 is (for instance) about 48 volts DC (Direct Current), the DC/DC converter module 317 may convert that voltage to a utilization DC voltage of about (for instance) 100 volts or higher. The utilization of a DC voltage may be controlled either by the controller 110 or may be operated with a fixed setting (if desired). However, the advantage of a controlled utilization voltage is that it may: (A) control the starting torque of the electric motor, (B) limit the starting current of the electric motor, and/or (C) control the motor operating torque. Note that the embodiment utilizes a fixed utilization voltage. The control of the DC utilization voltage is the preferred embodiment.

Figure 24:
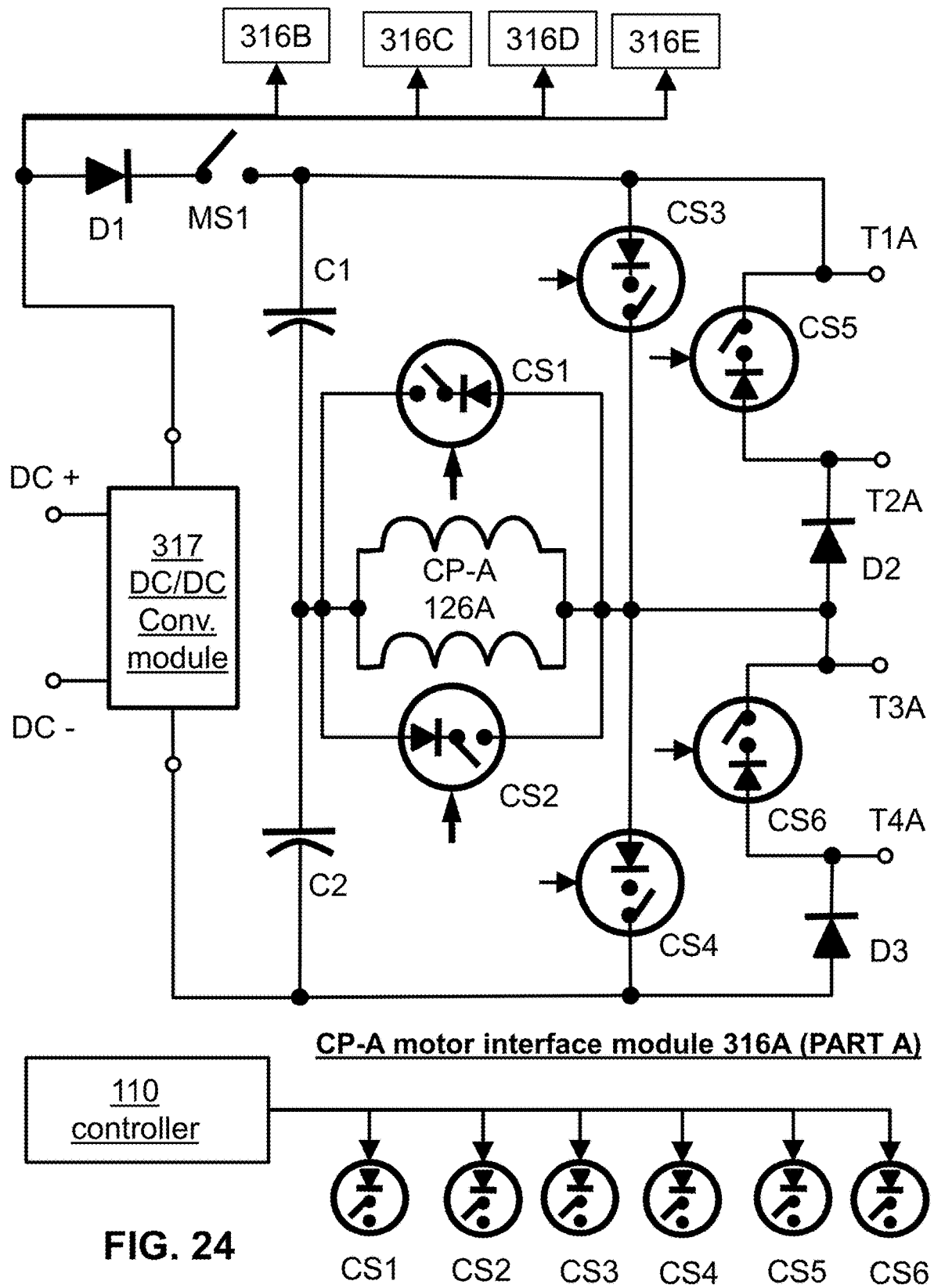
FIG. 24 depicts a schematic view of an embodiment of the CP-A motor interface module (PART A) and the DC/DC converter module both of the electric motor interface module of FIG. 23.

FIG. 24 depicts a schematic view of an embodiment of the CP-A motor interface module 316A (PART A) and the DC/DC converter module 317 both of the electric motor interface module 216 of FIG. 23.

Referring to the embodiment as depicted in FIG. 24, the CP-A motor interface module 316A (PART A) is also usable with (applicable for) the CP-B motor interface module 316B to the CP-E motor interface module 316E, as depicted in FIG. 23. The CP-A motor interface module 316A (PART A) includes the coil pair A (CP-A), such as the first stationary coil pair 126A, first main switch MS1, first diode D1, second diode D2, third diode D3, first capacitor C1, second capacitor C2, first digitally controllable switch CS1, second digitally controllable switch CS2, third digitally controllable switch CS3, fourth digitally controllable switch CS4, fifth digitally controllable switch CS5, sixth digitally controllable switch CS6, and the DC/DC converter module 317. The description of the operation of the CP-A motor interface module 316A (PART A) is provided in association with FIGS. 29 to 39. The controller 110 is configured to operate the switches CS1, CS2, CS3, CS4, CS5, and CS6. The controller 110 is configured to change the states or operation modes of the switches between an ON state and an OFF state, depending on the angular rotation information provided by the angular encoder 115, as depicted in FIG. 1. In this manner, the controller 110 is configured to control the operations of the CP-A motor interface module 316A to the CP-E motor interface module 316E, as depicted in FIG. 23.

Figure 25:
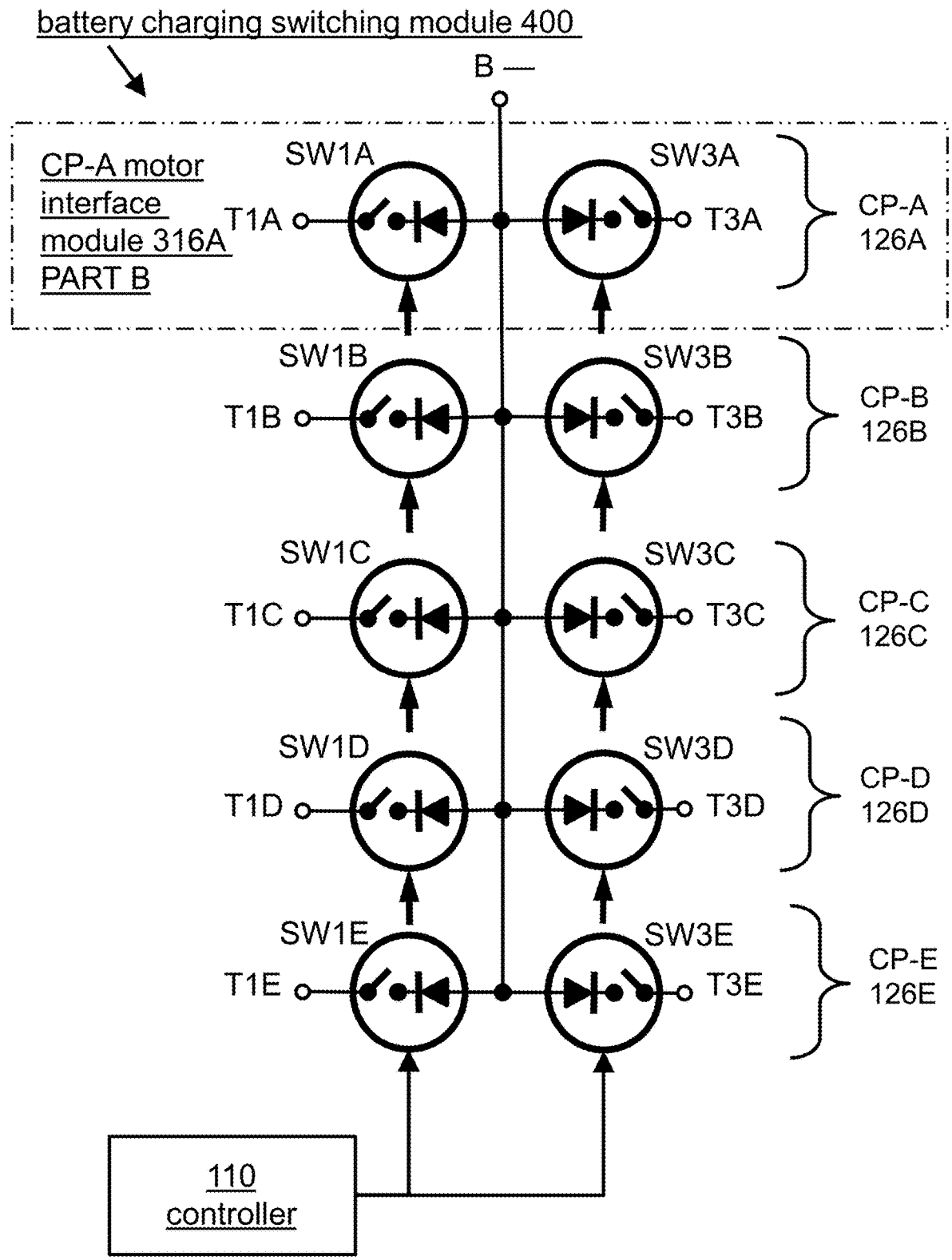
FIG. 25 and FIG. 26 depict schematic views of embodiments of the battery charging switching module of FIG. 24, and in which FIG. 26 also depicts a schematic view of an embodiment of the CP-A motor interface module (Part C) of the electric motor interface module of FIG. 23.
Figure 26:
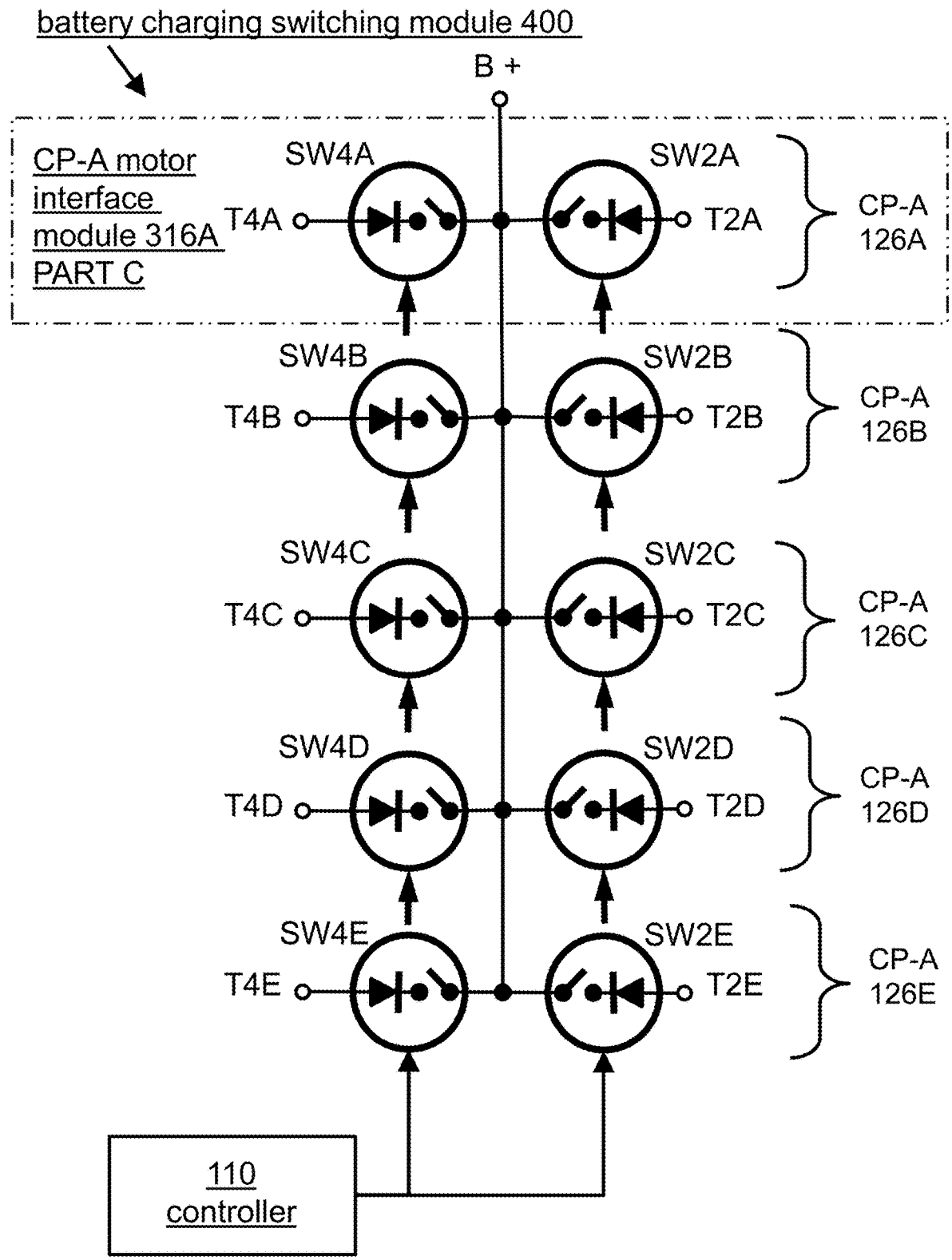

FIG. 25 and FIG. 26 depict schematic views of embodiments of the battery charging switching module 400 of FIG. 24.

Referring to the embodiment as depicted in FIG. 25, the battery charging switching module 400 includes the CP-A motor interface module 316A (Part A) configured for use with the first stationary coil pair 126A (coil pair A or CP-A).

The controller 110 is configured to control the switches SW1A, SW2A, SW3A, and SW4A in such a way that these switches, in use, control the charging of the batteries associated with the battery module 112 by using the recovered energy from coil pair CP-A (as needed), etc. It will be appreciated that the same description may apply to the CP-B motor interface module 316B, the CP-C motor interface module 316C, the CP-D motor interface module 316D, and the CP-E motor interface module 316E (depicted in FIG. 27). The controller 110 is configured to control the switches SW1B, SW2B, SW3B, and SW4B in such a way that these switches, in use, control the charging of the batteries of the battery module 112 by using the recovered energy from coil pair CP-B (as needed). The controller 110 is configured to control the switches SW1C, SW2C, SW3C, and SW4C in such a way that these switches, in use, control the charging of the batteries of the battery module 112 by using the recovered energy from coil pair CP-C (as needed). The controller 110 is configured to control the switches SW1D, SW2D, SW3D, and SW4D in such a way that these switches, in use, control the charging of the batteries of the battery module 112 by using the recovered energy from coil pair CP-D (as needed). The controller 110 is configured to control the switches SW1E, SW2E, SW3E, and SW4E in such a way that these switches, in use, control the charging of the batteries of the battery module 112 by using the recovered energy from coil pair CP-E (as needed).

It will be appreciated that the usage of the diodes in place of the switches is an alternative option (that is, for the switches depicted in FIG. 25 and FIG. 26, if so desired).

FIG. 26 depicts a schematic view of an embodiment of the CP-A motor interface module 316A (Part C) of the electric motor interface module 216 of FIG. 23.

It will be appreciated that the CP-A motor interface module 316A (Part B) and the CP-A motor interface module 316A (Part C) cooperate with each other to charge the batteries of the battery module 112 (which is depicted in FIG. 1). The CP-A motor interface module 316A (Part B) is electrically connected to the negative terminal of the battery module 112. The CP-A motor interface module 316A (Part C) is electrically connected to the positive terminal of the battery module 112.

Figure 27:
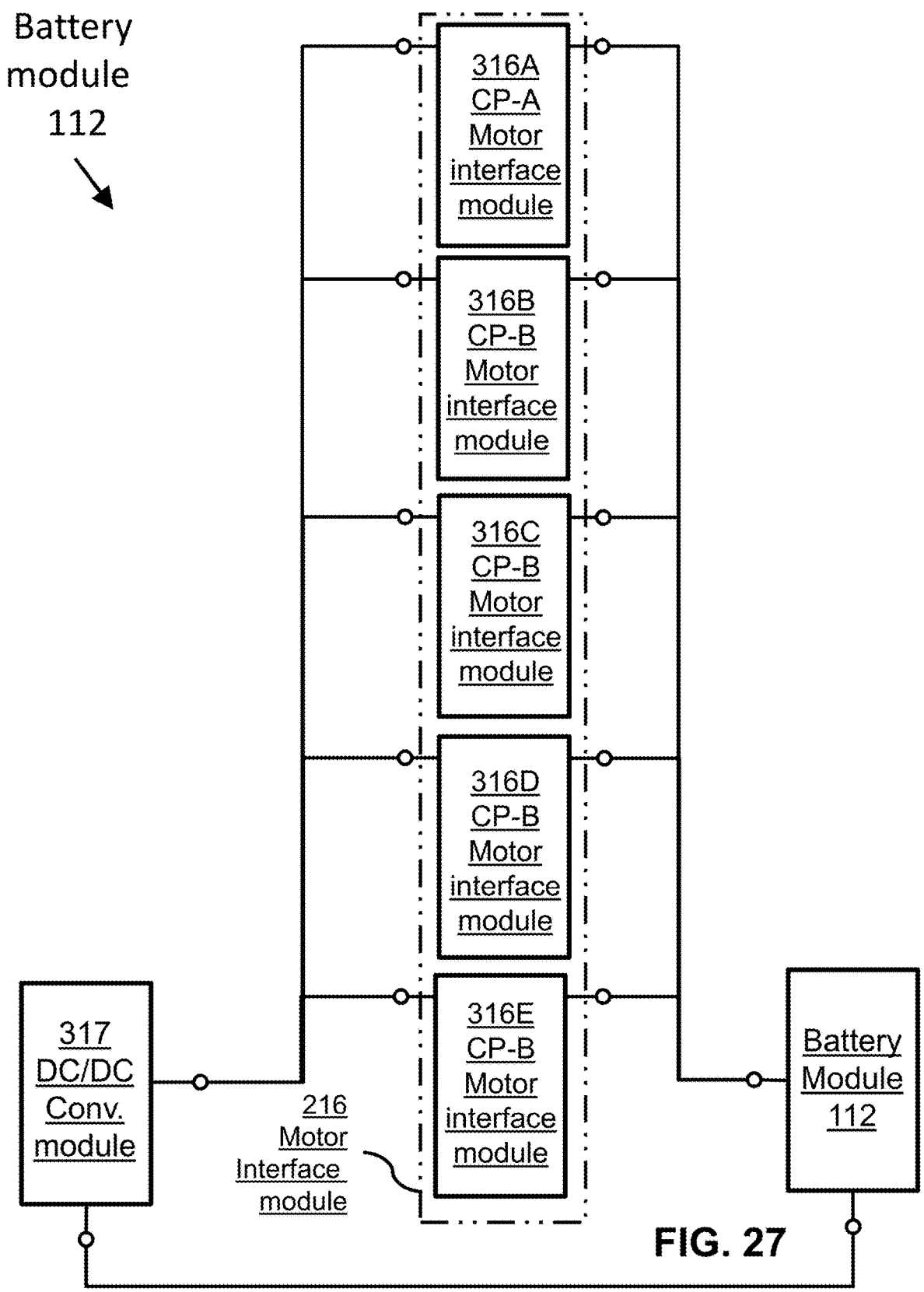
FIGS. 27 and 28 depict schematic views of embodiments of a battery module for use with the electric motor interface module of FIG. 23.
Figure 28:
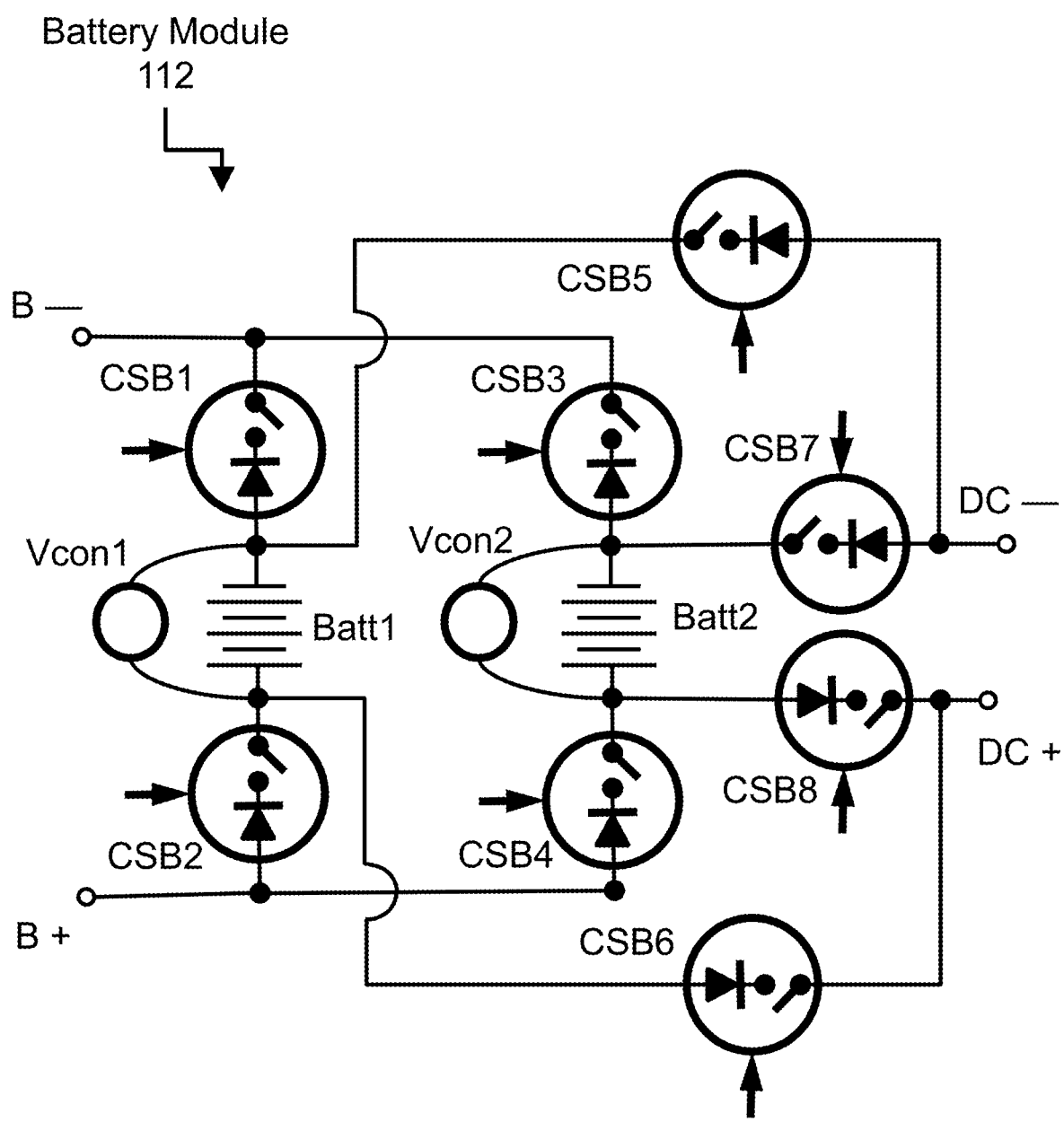

FIGS. 27 and 28 depict schematic views of embodiments of the battery module 112 for use with the electric motor interface module 216 of FIG. 23.

In accordance with the embodiment as depicted in FIG. 27, the electric motor interface module 216 includes the CP-A motor interface module 316A to the CP-E motor interface module 316E, each of which are configured to electrically interface with the first stationary coil pair 126A to the fifth stationary coil pair 126E (respectively) of the electric motor assembly 206. More specifically, the electric motor interface module 216 includes: (A) CP-A motor interface module 316A configured to electrically interface with the first stationary coil pair 126A, (B) CP-B motor interface module 316B configured to electrically interface with the second stationary coil pair 126B, (C) CP-C motor interface module 316C configured to electrically interface with the third stationary coil pair 126C, (D) CP-D motor interface module 316D configured to electrically interface with the fourth stationary coil pair 126D, and (E) CP-E motor interface module 316E configured to electrically interface with the fifth stationary coil pair 126E.

The battery module 112 is electrically connected to each of the CP-A motor interface module 316A to the CP-E motor interface module 316E of the electric motor interface module 216. The battery module 112 is configured to accept recovered energy from CP-A, CP-B, CP-C, CP-D, and CP-E (stationary coil pairs) electrically connected to the electric motor interface module 216 (as needed). The battery module 112 is configured to provide DC (Direct Current) input power to the DC/DC converter module 317.

The DC/DC converter module 317 is electrically connected to each of the CP-A motor interface module 316A to the CP-E motor interface module 316E of the electric motor interface module 216. The DC/DC converter module 317 is configured to provide utilization DC input power to the CP-A motor interface module 316A, CP-B motor interface module 316B, CP-C motor interface module 316C, CP-D motor interface module 316D and CP-E motor interface module 316E. The DC/DC converter module 317 may be configured to increase the voltage supply by the battery module 112 to a relatively higher utilization DC voltage that is used by the electric motor interface module 216.

In accordance with the embodiment as depicted in FIG. 28, the B(+) and B(−) terminals of the battery module 112 are electrically connected to the CP-A motor interface module 316A (Part B), which is depicted in FIG. 25, and the CP-A motor interface module 316A (Part C), which is depicted in FIG. 26.

The DC(+) and the DC(−) terminals of the battery module 112 are electrically connected to the DC/DC converter module 317, as depicted in FIG. 24.

Battery 1 (batt 1) and battery 2 (batt 2) of the battery module 112 may be operated in either running mode or in standby mode. The running battery provides power to the DC/DC converter module 317. The standby battery is charged from the recovered energy from coil pairs CP-A (coil pair A), CP-B (coil pair B), CP-C (coil pair C), CP-D (coil pair D) and CP-E (coil pair E) as needed. Note that battery 1 and/or battery 2 may include a single physical battery or may include a bank of batteries (if desired). For the case where the switches (computer controllable switches) CSB1, CSB2, CSB5 and CSB6 are OFF, battery 1 is electrically isolated and is neither being charged nor supplying electrical power to the DC/DC converter module 317.

For the case where the switches (computer controllable switches) CSB3, CSB4, CSB7 and CSB8 are OFF, battery 2 is electrically isolated and is neither being charged nor supplying electrical power to the DC/DC converter module 317.

The following is a disallowed state of battery 1 and battery 2: battery 1 and battery 2 cannot be operated in the standby or the running mode at the same time.

For the case where switches CSB1 and CSB2 are ON, switches CSB5 and CSB6 must be OFF, and in this operation mode, battery 1 is the standby battery and battery 2 is the running battery, and the switches CSB3 and CSB4 must be OFF, and the switches CSB7 and CSB8 must be ON.

For the case where CSB3 and CSB4 are ON, switches CSB7 and CSB8 must be OFF, and in this operation mode battery 2 is the standby battery and battery 1 is the running battery, and the switches CSB1 and CSB2 are OFF, and switches CBS5 and CSB6 are ON.

Voltage sensor assembly Vcon1 and voltage sensor assembly Vcon2 are each configured to electrically communicate with the controller 110. Voltage sensor assemblies Vcon1 and Vcon2 are configured to monitor the voltages of battery 1 and battery 2, respectively. For the case where the voltage exceeds a predetermined threshold, the standby battery can either be electrically isolated, or the roles switched with the running battery. For the case where the voltage of the running battery is below a threshold value, the running battery is switched with the standby battery so that the running battery may be placed off-line and recharged.

For the case where the electrical rotating motor (such as, the second rotatable electric machine 106 or the electric motor assembly 206) is operated in the fifth motor operation mode 505 or the tenth motor operation mode 515, then battery 1 or battery 2 is available for charging, and the switches CS5 and CS6 are OFF, and the switches SW1A, SW2A, SW3A and SW4A are ON for both the positive and negative motor current transitions. For the case where neither battery 1 nor battery 2 are available for charging, then the switches CS5 and CS6 are maintained in the ON state, and the switches SW1A, SW2A, SW3A and SW4A are switched OFF.

For the case where the switches CS5 and CS6 are ON, then the switches SW1A, SW2A, SW3A and SW4A must be OFF, respectively, and vice versa.

The switches SW1A, SW2A, SW3A and SW4A may be ON at the same time. However, this state is allowed only when the switches CS5 and CS6 are OFF.

The above-described operation may apply to the corresponding circuits for CP-A (coil pair A), CP-B (coil pair B), CP-C (coil pair C), CP-D (coil pair D) and CP-E (coil pair E).

Figure 29:
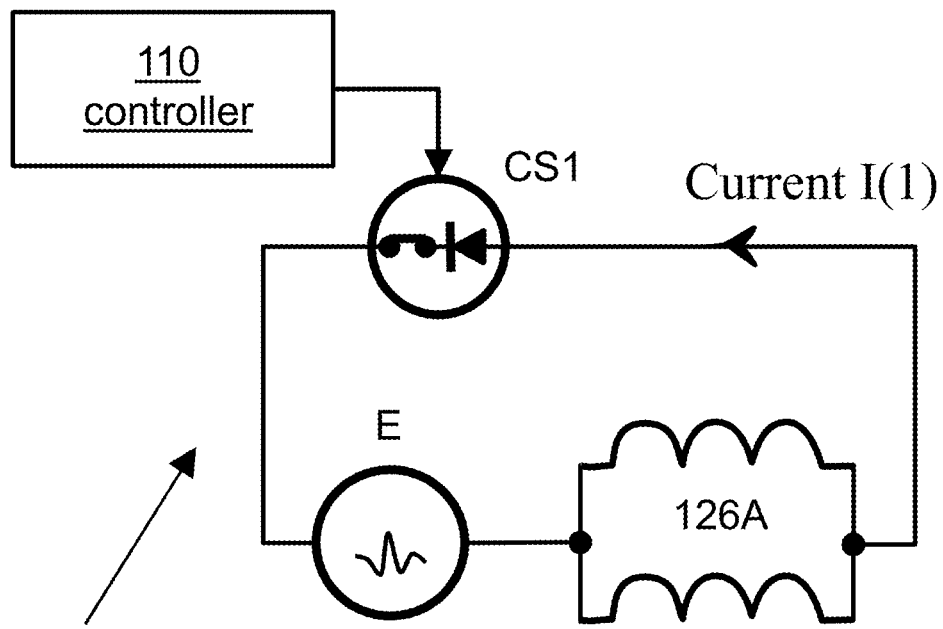
FIG. 29 and FIG. 30 depict a reduced schematic view (FIG. 29) and a perspective view (FIG. 30) of an embodiment of part A of the electric motor interface module of FIG. 23, and the first stationary coil pair and the first magnet assembly (respectively), in which part A of the electric motor interface module operates in a first motor operation mode and a sixth motor operation mode.
Figure 30:
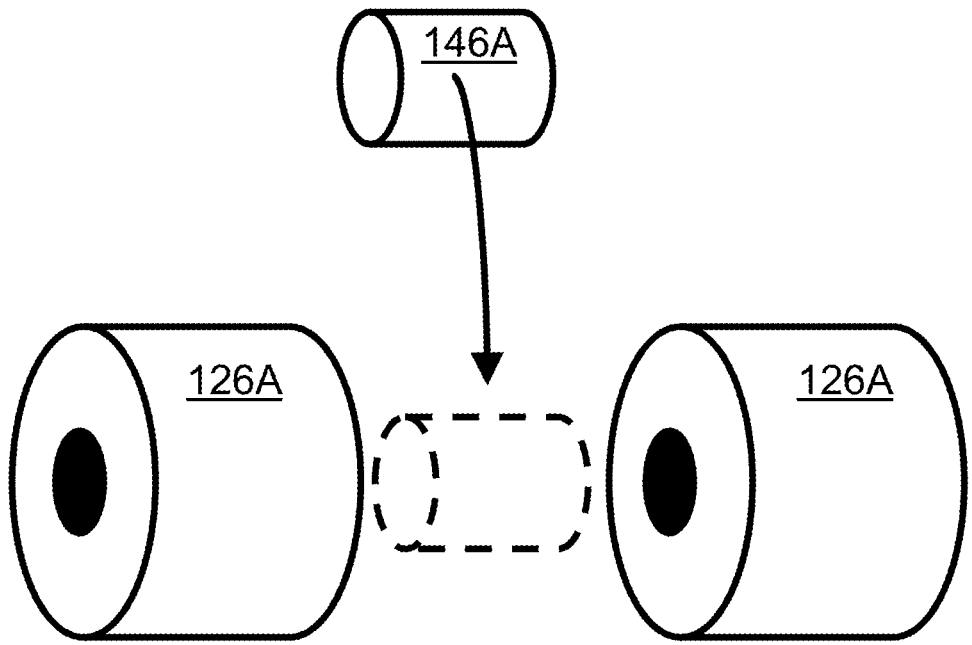

FIG. 29 and FIG. 30 depict a reduced schematic view (FIG. 29) and a perspective view (FIG. 30) of an embodiment of part A of the electric motor interface module 216 of FIG. 23, and the first stationary coil pair 126A and the first magnet assembly 146A (respectively), operating in the first motor operation mode 501 and the sixth motor operation mode 511 (also called the energy generation modes), respectively.

Referring to the embodiment as depicted in FIG. 29, it will be appreciated that the description for the first stationary coil pair 126A is applicable to the second stationary coil pair 126B to the fifth stationary coil pair 126E.

Figure 40:
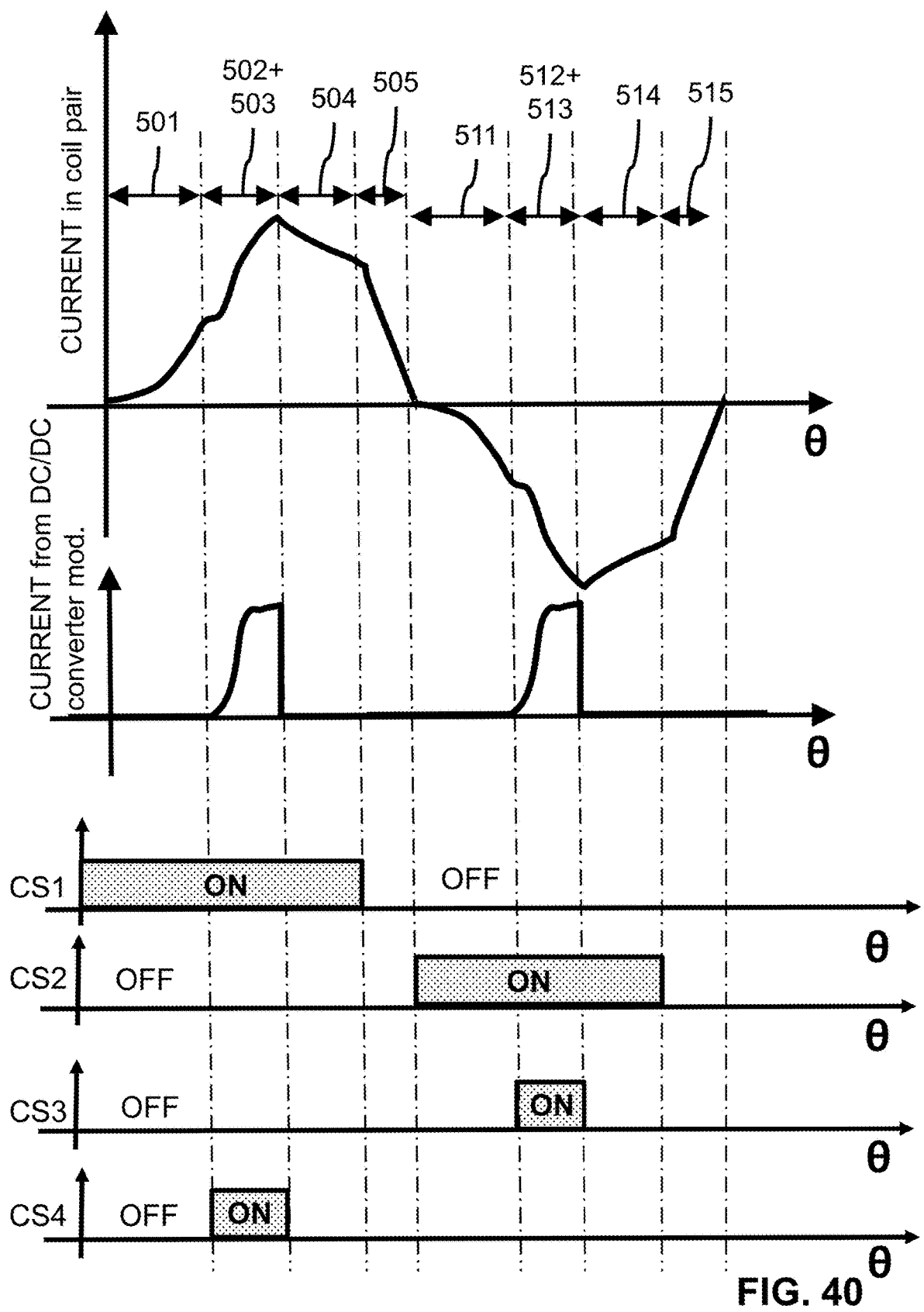
FIG. 40 depicts a schematic view of an embodiment of the operation modes associated with the electric motor interface module of FIG. 23.

The first motor operation mode 501 is schematically depicted in FIG. 40. The mode 501 spans across a portion of the angular rotation of the rotatable common shaft 102 (as depicted in FIG. 40) relative to the other operation modes of the electric motor interface module 216. The time duration of the first motor operation mode 501 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to the embodiment as depicted in FIG. 29, it will be appreciated that E is the induced emf or EMF (electromotive force), which is induced into the first stationary coil pair 126A. The first magnet assembly 146A is moving towards the first stationary coil pair 126A, and between the coils of the first stationary coil pair 126A. The first magnet assembly 146A is magnetically attracted to move toward the first stationary coil pair 126A, and between the coil pairs of the first stationary coil pair 126A.

For the positive current transition in the first stationary coil pair 126A (which corresponds to the first motor operation mode 501), the digitally controllable switch CS1 is switched ON to cause a current 41) to flow in the first stationary coil pair 126A. For the first motor operation mode 501, the switches MS1 and CS1 are ON, and the switches CS2, CS3 and CS4 are OFF. Switches CS5 and CS6 may be ON or OFF depending on the charging requirement of the batteries (battery 1 and battery 2). For the case where the batteries do not require charging, then the switches CS5 and CS6 are switched ON in the first motor operation mode 501, else (otherwise) the switches CS5 and CS6 are switched OFF.

For the negative current transition in the first stationary coil pair 126A (which corresponds to the sixth motor operation mode 511), the digitally controllable switch CS2 is switched ON to cause a current to flow in the first stationary coil pair 126A, in which the current is equal in magnitude to current 41) but in the opposite direction.

The switches MS1 and CS2 are ON, and the switches CS1, CS3 and CS4 are OFF. Switches CS5 and CS6 may be switched OFF depending on the charging requirement of the batteries (battery 1 and battery 2). For the case where battery 1 and battery 2 do not require charging, then switches CS5 and CS6 are switched ON in the sixth motor operation mode 511, else (otherwise) switches CS5 and CS6 would be switched OFF. The magnitude of current 41) in the coil pairs of the first stationary coil pair 126A is sufficient to reduce the remnant magnetic flux residing in the electromagnetic core 129 to about zero (preferably to zero) at the instant when the first magnet assembly 146A is radially aligned with the coil pairs of the first stationary coil pair 126A (as depicted in FIG. 32).

Figure 31:
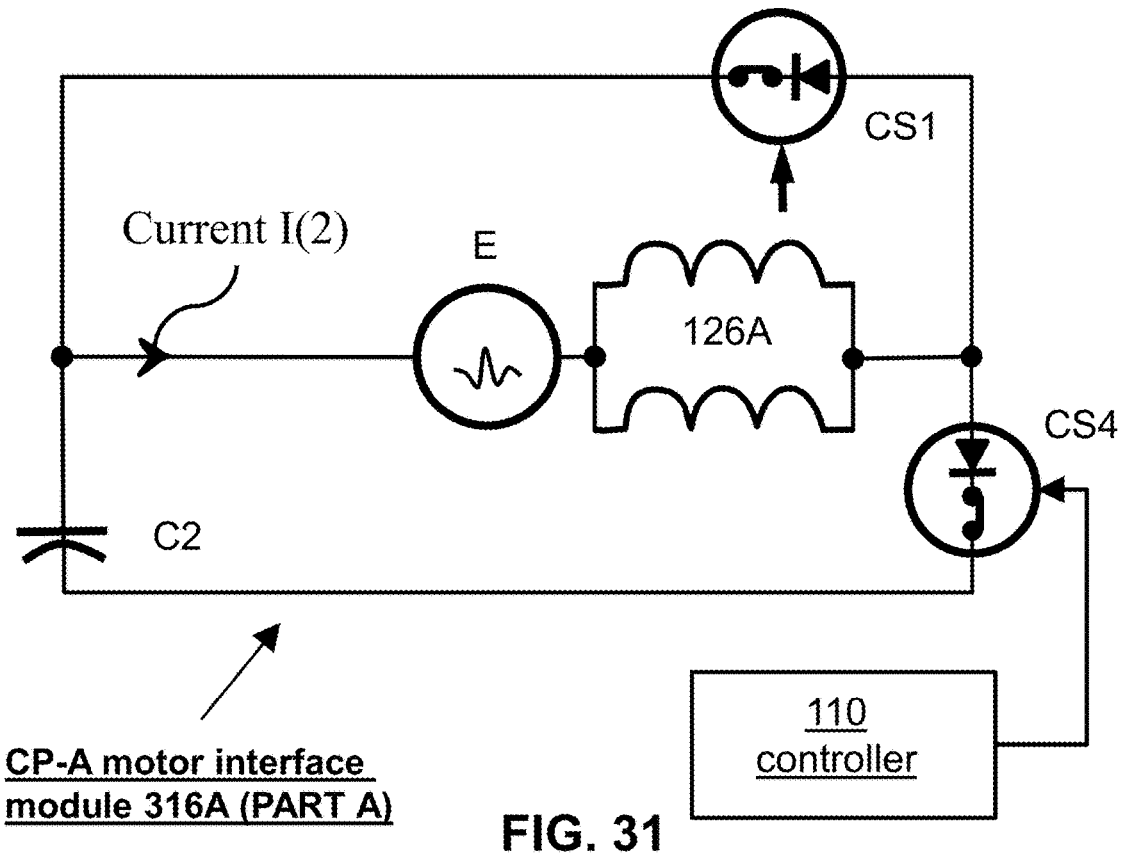
FIG. 31 and FIG. 32 depict a reduced schematic view (FIG. 31) and a perspective view (FIG. 32) of an embodiment of part A of the electric motor interface module of FIG. 23, and the first stationary coil pair and the first magnet assembly (respectively), in which part A of the electric motor interface module operates in a second motor operation mode and a seventh motor operation mode.
Figure 32:
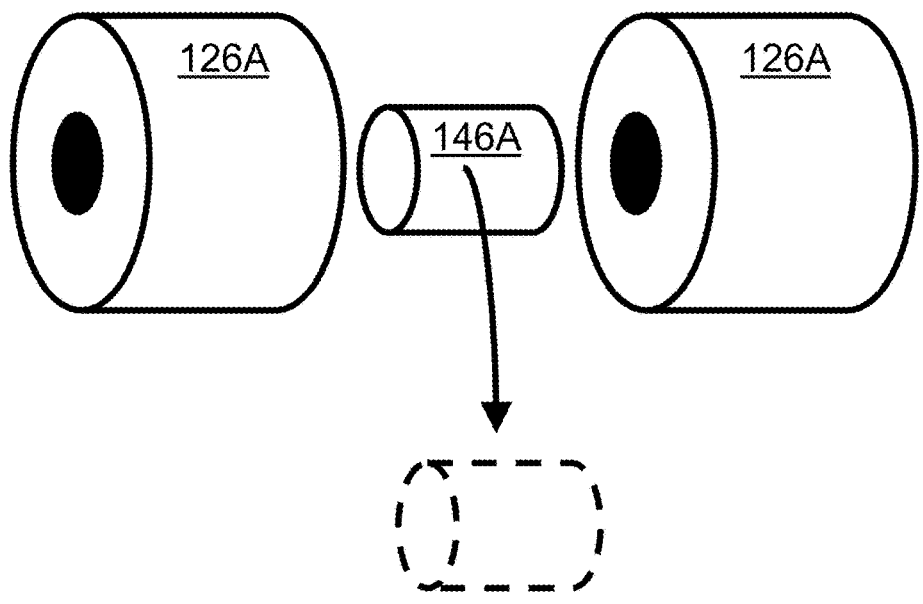

FIG. 31 and FIG. 32 depict a reduced schematic view (FIG. 31) and a perspective view (FIG. 32) of an embodiment of (part A) of the electric motor interface module 216 of FIG. 23 (for the first stationary coil pair 126A and the first magnet assembly 146A, respectively), in which (part A) of the electric motor interface module 216 operates in the second motor operation mode 502 and the seventh motor operation mode 512 (also called the energy discharge modes), respectively.

Referring to the embodiment as depicted in FIG. 31, the second motor operation mode 502 is schematically depicted in FIG. 40. The mode 502 spans across a portion of the angular rotation of the rotatable common shaft 102 (as depicted in FIG. 40) relative to the other operation modes of the electric motor interface module 216. The time duration of the second motor operation mode 502 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to the embodiment as depicted in FIG. 31, the first magnet assembly 146A is aligned (radially aligned) with the first stationary coil pair 126A, and is positioned between the coil pairs of the first stationary coil pair 126A. The digitally controllable switch CS4 is switched ON to cause a current I(2) to flow in the first stationary coil pair 126A, where the magnitude of current I(2) is greater than or equal to current 41) (as depicted in FIG. 29). The current I(2) is configured to increase the magnetic flux in the first stationary coil pair 126A, such that the resulting magnetic repulsive force propels the first magnet assembly 146A forward (as indicated by the arrow of FIG. 32).

For the second motor operation mode 502 with the positive current transition of the current flowing through the first stationary coil pair 126A, the switches MS1, CS4 and CS1 are switched ON, and the switches CS2 and CS3 are switched OFF.

For the seventh motor operation mode 512, with the negative current transition of the current flowing through the first stationary coil pair 126A, the switches MS1, CS3 and CS2 are switched ON, and the switches CS1 and CS4 are switched OFF.

Switches CS5 and CS6 may be switched ON or OFF depending on the charging requirement of the batteries (battery 1 and battery 2). For the case where the batteries do not require charging, then switches CS5 and CS6 may be switched ON in the second motor operation mode 502 and the seventh motor operation mode 512, respectively, else (otherwise) switches CS5 and CS6 would be switched OFF.

Figure 33:
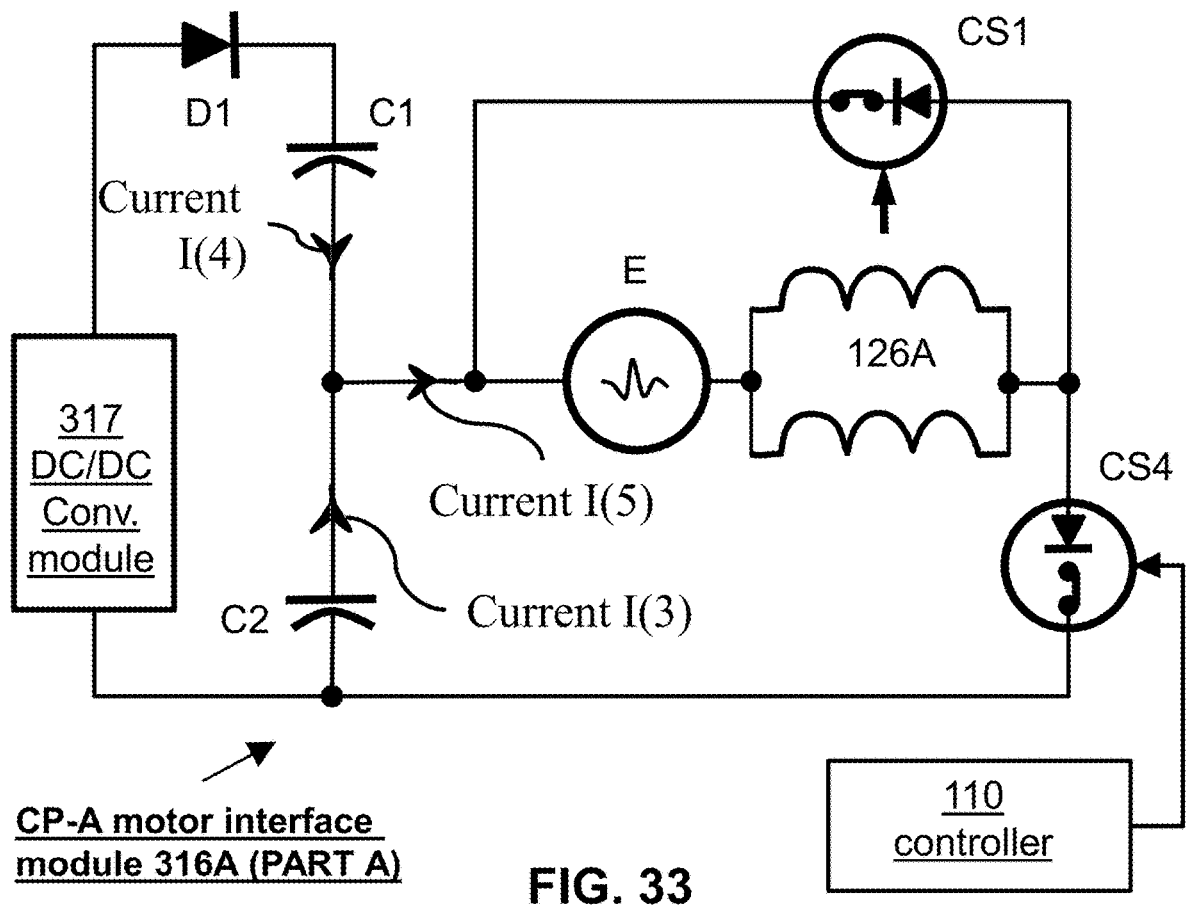
FIG. 33 and FIG. 34 depict a reduced schematic view (FIG. 33) and a perspective view (FIG. 34) of an embodiment of part A of the electric motor interface module of FIG. 23, and the first stationary coil pair and the first magnet assembly (respectively), in which part A of the electric motor interface module operates in a third motor operation mode and an eighth motor operation mode.
Figure 34:
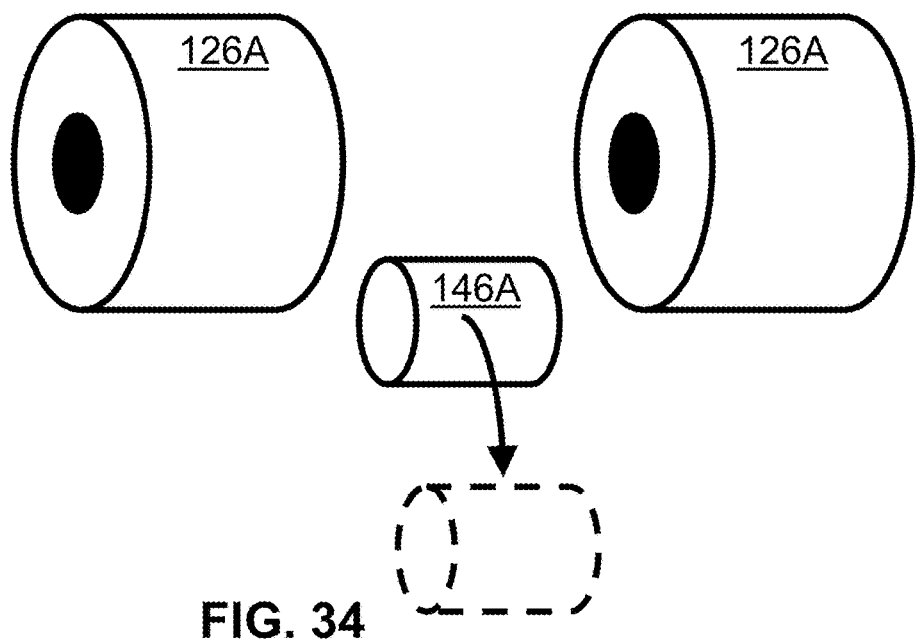

FIG. 33 and FIG. 34 depict a reduced schematic view (FIG. 33) and a perspective view (FIG. 34) of an embodiment of (part A) of the electric motor interface module 216 of FIG. 23 (for use with the first stationary coil pair 126A and the first magnet assembly 146A, respectively), in which (part A) of the electric motor interface module 216 operates in the third motor operation mode 503 and the eighth motor operation mode 513 (which may be called the source energy discharge mode).

Referring to the embodiment as depicted in FIG. 33, the third motor operation mode 503 is schematically depicted in FIG. 40. The mode 503 spans across a portion of the angular rotation of the rotatable common shaft 102 (as depicted in FIG. 40) relative to the other operation modes of the electric motor interface module 216. The time duration of the third motor operation mode 503 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to FIG. 33, the first magnet assembly 146A moves away from the first stationary coil pair 126A, and from between the coil pairs of the first stationary coil pair 126A. Electrical power is drawn from the DC/DC converter module 317 (also called a DC voltage source) as diode D1 becomes forward biased (to supplement the charge from capacitor C2). Current I(5) provides an additional boost to further increase the magnetic flux in the first stationary coil pair 126A, thus providing additional propulsion to the first magnet assembly 146A. For each of the third motor operation mode 503 and the eighth motor operation mode 513, electrical power is drawn from the DC/DC converter module 317 (the DC voltage source).

For the third motor operation mode 503, with the positive current transition of the current flowing through the first stationary coil pair 126A, the switches MS1, CS4 and CS1 are switched ON and the switches CS2 and CS3 are switched OFF.

For the eighth motor operation mode 513, with the negative current transition for the current flowing through the first stationary coil pair 126A, the switches MS1, CS3 and CS2 are switched ON and the switches CS1 and CS4 are switched OFF.

Switches CS5 and CS6 may be switched ON or OFF depending on the charging requirement of the batteries (battery 1 and battery 2). If the batteries do not require charging, then switches CS5 and CS6 may be switched ON in the third motor operation mode 503 and the eighth motor operation mode 513, respectively, else (otherwise) switches CS5 and CS6 would be switched OFF.

For the third motor operation mode 503, with the positive current transition of the current flowing through the first stationary coil pair 126A, the current I(5) in the first stationary coil pair 126A is the sum of the current I(4) from the DC voltage source and current I(3) from the charged capacitor C2.

For the eighth motor operation mode 513, with the negative current transition of the current flowing through the first stationary coil pair 126A, charged capacitor C1 and the DC voltage source (the DC/DC converter module 317) supply current to the first stationary coil pair 126A that is equal in magnitude to current I(5) but in the opposing direction to current I(5), as depicted in FIG. 33.

Figure 35:
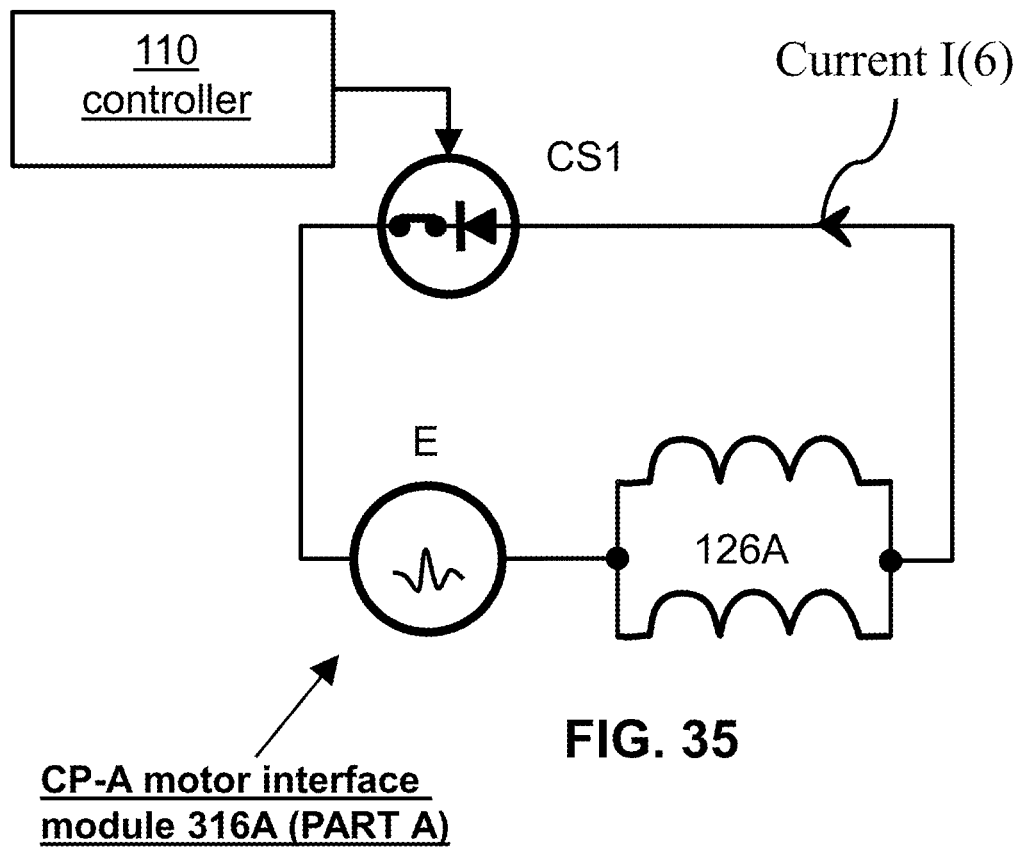
FIG. 35 and FIG. 36 depict a reduced schematic view (FIG. 35) and a perspective view (FIG. 36) of an embodiment of part A of the electric motor interface module of FIG. 23, and the first stationary coil pair and the first magnet assembly (respectively), in which part A of the electric motor interface module of FIG. 23 operates in a fourth motor operation mode and a ninth motor operation mode.
Figure 36:
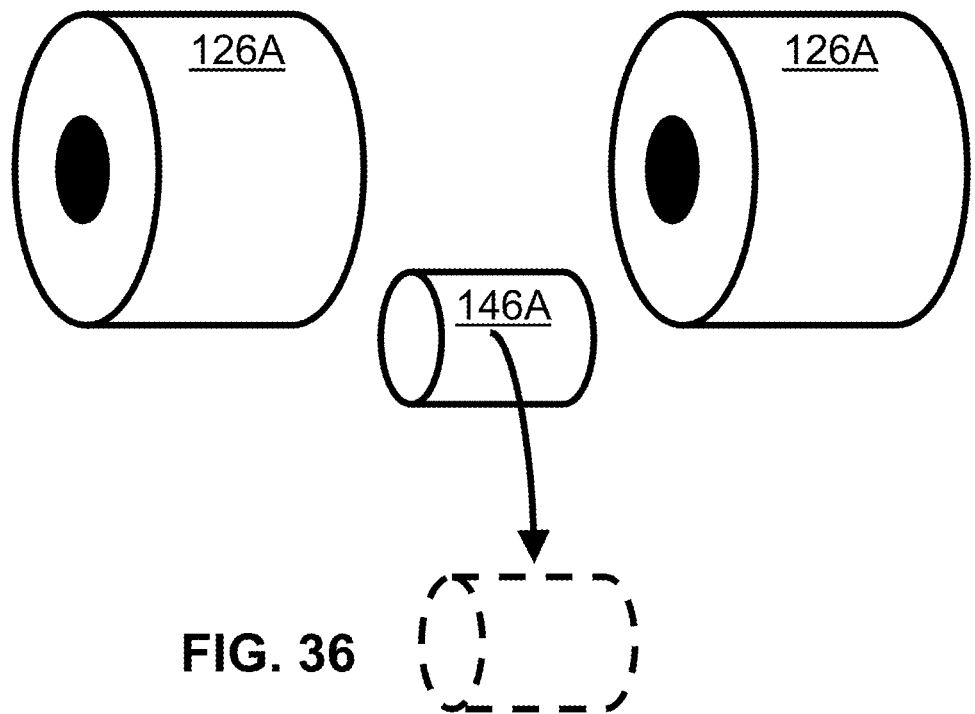

FIG. 35 and FIG. 36 depict a reduced schematic view (FIG. 35) and a perspective view (FIG. 36) of an embodiment of (part A) of the electric motor interface module 216 of FIG. 23 (for use with the first stationary coil pair 126A and the first magnet assembly 146A, respectively), in which (part A) of the electric motor interface module 216 operates in the fourth motor operation mode 504 and the ninth motor operation mode 514 (also called the magnetic field discharge mode), respectively.

Referring to the embodiment as depicted in FIG. 35, the fourth motor operation mode 504 is schematically depicted in FIG. 40. The fourth operation mode 504 spans across a portion of the angular rotation of the rotatable common shaft 102 (as depicted in FIG. 40) relative to the other operation modes of the electric motor interface module 216. The time duration of the fourth motor operation mode 504 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to FIG. 35, the first magnet assembly 146A continues to move away from (rotate away from) the first stationary coil pair 126A, and further away from between the coil pairs of the first stationary coil pair 126A. Electric power is not drawn (obtained or received) from the DC/DC converter module 317 (also called a DC source) in this operation mode, and the energy stored in the magnetic field of the first stationary coil pair 126A (that is developed in the third motor operation mode 503 and the eighth motor operation mode 513) is converted to electrical energy, which is discharged into the first stationary coil pair 126A. The electrical energy that is discharged into the first stationary coil pair 126A produces a current I(6) (depicted in FIG. 35), which provides an additional boost to propel (move) the first magnet assembly 146A further along.

For the fourth motor operation mode 504 with the positive current transition of the current flowing through the first stationary coil pair 126A, the switches MS1 and CS1 are switched ON, and the switches CS2, CS3 and CS4 are switched OFF.

For the ninth motor operation mode 514 and negative current transition for the current flowing through the first stationary coil pair 126A, the switches MS1 and CS2 are switched ON, and the switches CS1, CS3 and CS4 are switched OFF.

Switches CS5 and CS6 may be switched ON or OFF depending on the charging requirement of the batteries (battery 1 and battery 2). For the case where the batteries do not require charging, then the switches CS5 and CS6 are switched ON during the fourth motor operation mode 504 and the ninth motor operation mode 514, respectively, else (otherwise) switches CS5 and CS6 would be switched OFF.

Figure 37:
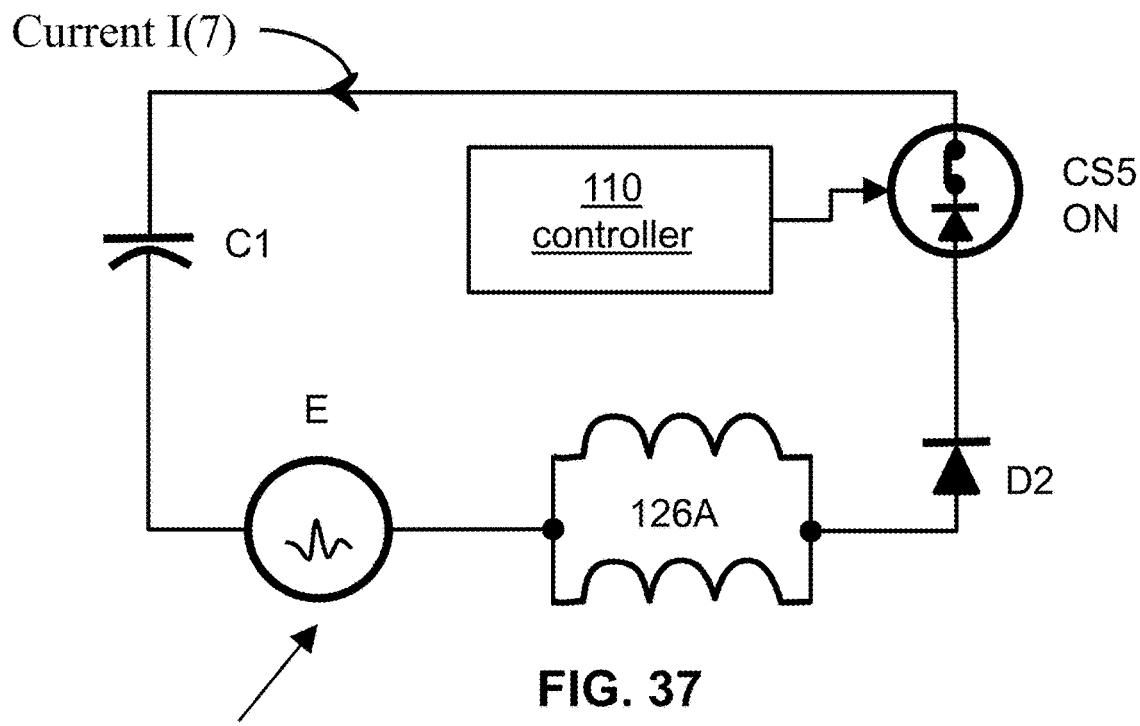
FIG. 37 and FIG. 38, and FIG. 39 depict reduced schematic views (FIG. 37 and FIG. 39), and a perspective view (FIG. 38) of an embodiment of part A of the electric motor interface module of FIG. 23, and the first stationary coil pair and the first magnet assembly (respectively), in which part A of the electric motor interface module operates in a fifth motor operation mode and a tenth motor operation mode.
Figure 38:
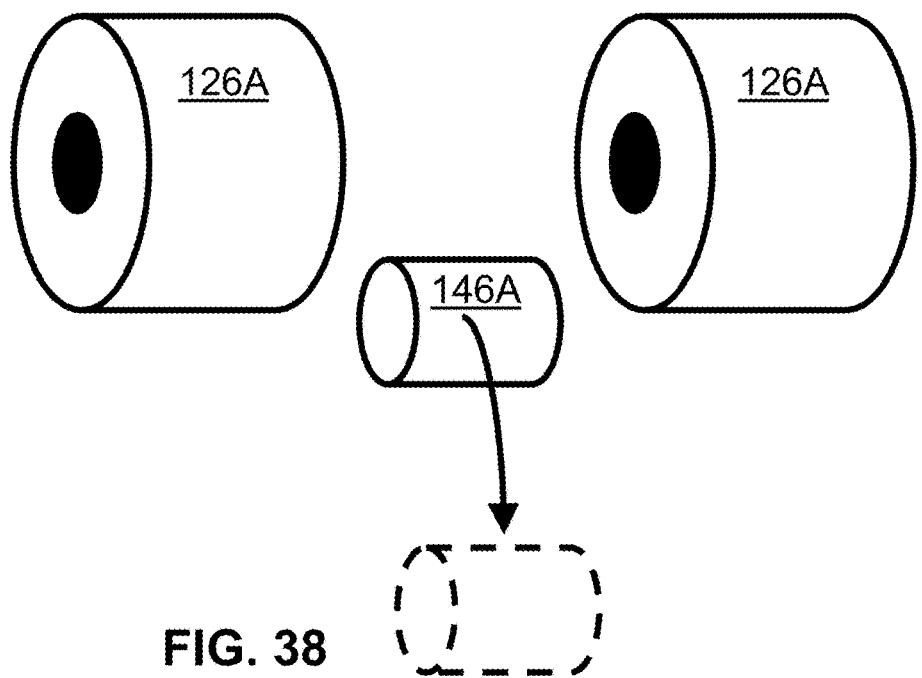
Figure 39:
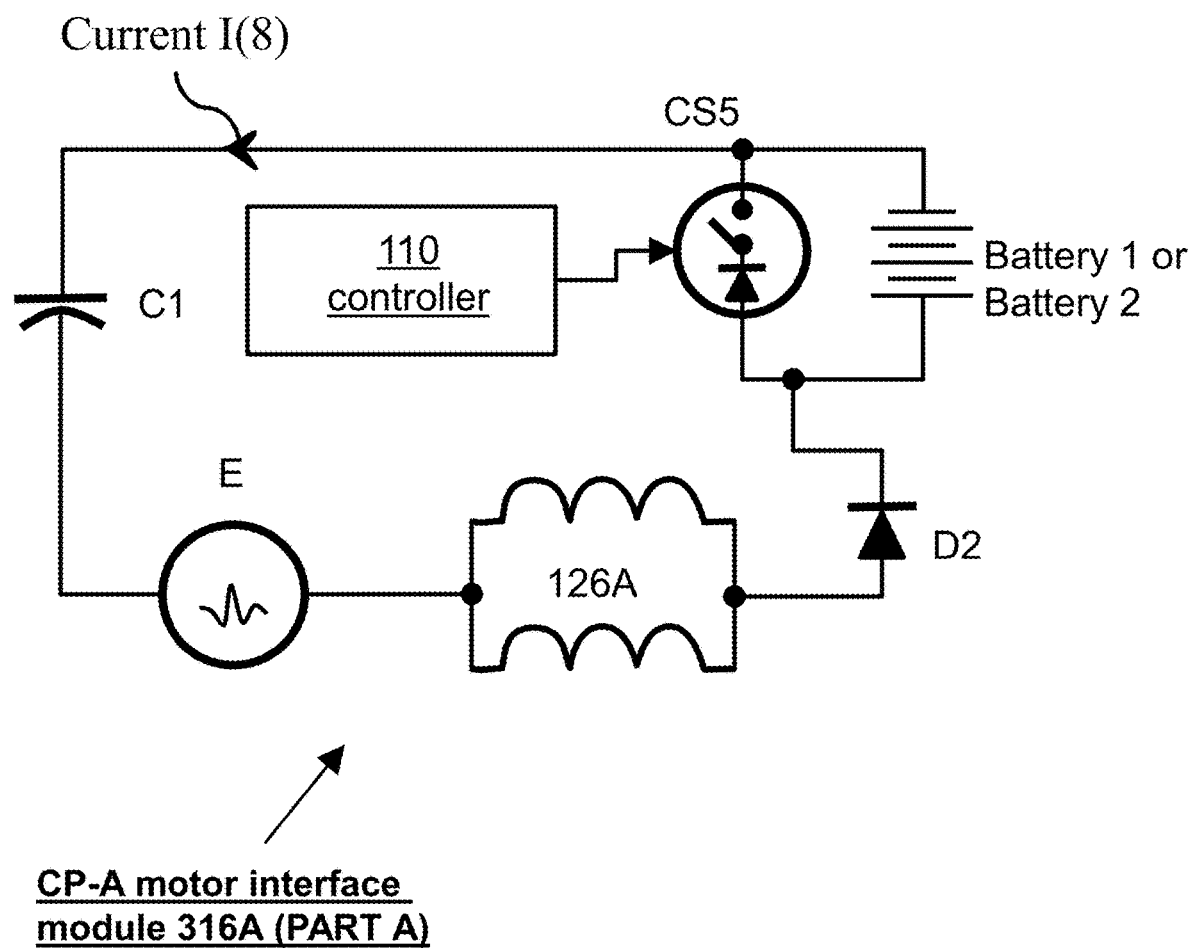

FIG. 37, FIG. 38, and FIG. 39 depict reduced schematic views (FIG. 37 and FIG. 39), and a perspective view (FIG. 38) of an embodiment of (part A) of the electric motor interface module 216 of FIG. 23 (for use with the first stationary coil pair 126A and the first magnet assembly 146A, respectively), in which the (part A) of the electric motor interface module 216 operates in the fifth motor operation mode 505 and the tenth motor operation mode 515 (also called the energy storage mode), respectively.

The fifth motor operation mode 505 is schematically depicted in FIG. 40. The mode 505 spans across a portion of the angular rotation of the rotatable common shaft 102 (as depicted in FIG. 40) relative to the other operation modes of the electric motor interface module 216. The time duration of the fifth motor operation mode 505 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to the embodiment as depicted in FIG. 37, there is depicted a reduced schematic view of an embodiment of (part A) of the electric motor interface module 216 of FIG. 23 operating in a configuration that would not charge the batteries (battery 1 or battery 2). Current I(7) flows through diode D2 and switch CS5 and charges capacitor C1, as depicted in FIG. 37.

Referring to the embodiment as depicted in FIG. 39, there is depicted a reduced schematic view of an embodiment of (part A) of the electric motor interface module 216 of FIG. 23 operating in a configuration that would charge the batteries (battery 1 or battery 2). Current I(8) flows through diode D2 and charges the batteries and the capacitor C1, as depicted in FIG. 39. It will be appreciated that this is a configuration that does not fundamentally change the operation mode (that is, energy is recycled to the source capacitors in both configurations, as depicted in FIG. 37 and FIG. 39.

Referring to the embodiments as depicted in FIGS. 37 and 39, it will be appreciated that the energy stored in the magnetic field of the coil pairs is used twice to perform mechanical work. Mechanical work is performed when (A) electrical energy is drawn from the source to develop a magnetic field in the coil pair, and (B) energy is released from the magnetic field of the coil pair, and converted back to electrical energy. All the energy is accounted for in the process including losses in the wires and switches, etc. The objective is to minimize the resistive and switching losses to optimize the use of the stored energy in the magnetic field of the coil pairs.

Referring to FIG. 37, the first magnet assembly 146A continues to move away from (rotate away from) from the first stationary coil pair 126A, and further away from between the coil pairs of the first stationary coil pair 126A.

For the fifth motor operation mode 505 with the positive current transition of the current flowing through the first stationary coil pair 126A, switch CS1 is switched OFF to force the excess energy in the magnetic field of the first stationary coil pair 126A that is not consumed in the fourth motor operation mode 504 into capacitor C1. The energy stored in capacitor C1 is used on the next cycle of the second motor operation mode 502 to supplement the energy received from the DC/DC converter module 317. As the excess energy from the magnetic field of the first stationary coil pair 126A is directed to capacitor C1, the first magnet assembly 146A is propelled further along, and the current I(7) that flows in the first stationary coil pair 126A falls to zero. It will be appreciated that as the current I(7) falls to zero, the magnetic flux in the electromagnetic core 129 of the first stationary coil pair 126A does not fall to zero due to the magnetic hysteresis of the electromagnetic core 129.

For the fifth motor operation mode 505 and positive current transition of the current flowing through the first stationary coil pair 126A, switch MS1 is switched ON and switches CS1, CS2, CS3 and CS4 are switched OFF.

For the tenth motor operation mode 515 and negative current transition of the current flowing through the first stationary coil pair 126A, switch CS2 is switched OFF to force the excess energy in the magnetic field of the first stationary coil pair 126A that is not consumed in the ninth motor operation mode 514 into capacitor C2. The energy stored in capacitor C2 is used on the next cycle of the sixth motor operation mode 511 to supplement the energy received from the DC/DC converter module 317. As the excess energy from the magnetic field of the first stationary coil pair 126A is directed to capacitor C2, and the first magnet assembly 146A is propelled (moved) further along as the current that flows in the first stationary coil pair 126A falls to zero. It will be appreciated that as the current flowing in the first stationary coil pair 126A falls to zero, the magnetic flux in the electromagnetic core 129 of the first stationary coil pair 126A does not fall to zero due to the magnetic hysteresis of the electromagnetic core 129.

For the tenth motor operation mode 515 with the negative current transition of the current flowing through the first stationary coil pair 126A, switch MS1 is switched ON and switches CS1, CS2, CS3 and CS4 are switched OFF.

Switches CS5 and CS6 may be switched ON or OFF depending on the charging requirement of the batteries (battery 1 and battery 2). If the batteries do not require charging, then switches CS5 and CS6 are switched ON in the fifth motor operation mode 505 and the tenth motor operation mode 515, respectively, else (otherwise) switches CS5 and CS6 would be switched OFF.

FIG. 40 depicts a schematic view of an embodiment of the modes (operation modes) for the electric motor interface module 216 of FIG. 23.

Referring to the embodiment as depicted in FIG. 40, the first motor operation mode 501 may be called the motor operation mode (1+). The remnant magnetic flux residing in the electromagnetic core 129 results in the attraction of the first magnet assembly 146A towards the first stationary coil pair 126A. In this operation mode, the current flowing in the first stationary coil pair 126A is considered positive and has a magnitude that is sufficient to reduce the remnant magnetic flux residing in the electromagnetic core 129 to about zero (preferably zero) prior to the start of the second motor operation mode 502.

The second motor operation mode 502 may be called the motor operation mode (2+). In the second motor operation mode current I(2) flows in the first stationary coil pair 126A as capacitor C2 discharges its stored energy. Current I(2) causes an initial increase in magnetic flux in the electromagnetic core of the first stationary coil pair 126A that results in the propulsion of the first magnet assembly 146A away from the first stationary coil pair 126A.

The third motor operation mode 503 may be called the motor operation mode (3+). The second motor operation mode 502 occurs before the third motor operation mode 503. In the third motor operation mode current I(5) flows in the first stationary coil pair 126A as capacitor C2 continues to discharge its stored energy and supplemental energy is drawn from the DC/DC converter module 317 as diode D1 becomes forward biased. Current I(5) causes a further increase in magnetic flux in the electromagnetic core of the first stationary coil pair 126A that works to propel the first magnet assembly 146A further away from the first stationary coil pair 126A. In the second motor operation mode 502 and the third motor operation mode 503, the current flowing in the first stationary coil pair 126A is considered positive and has a magnitude that is greater than or equal to the current flowing in the first motor operation mode 501. Preferably, the current flowing in the first stationary coil pair 126A in the third motor operation mode 503 should be sufficient to cause the magnetic flux in the electromagnetic core 129 to just reach magnetic saturation.

The fourth motor operation mode 504 may be called the motor operation mode (4+). In this motor operation mode, the current flowing in the first stationary coil pair 126A is considered positive and has a magnitude that is less or equal to the current that flows in the third motor operation mode 503. The energy stored in the magnetic field of the first stationary coil pair 126A, in the third motor operation mode 503, is released as electrical energy back into the first stationary coil pair 126A while continuing to propel (move) the first magnet assembly 146A away from the first stationary coil pair 126A.

The fifth motor operation mode 505 may be called the motor operation mode (5+). In this operation mode, the current flowing in the first stationary coil pair 126A is considered positive and has a magnitude that is less than or equal to the current flowing in the fourth motor operation mode 504. The excess energy, which is not consumed in the third motor operation mode 503, is directed back to capacitor C1 while continuing to propel (move) the first magnet assembly 146A away from the first stationary coil pair 126A. The current in the fifth motor operation mode 505 falls to zero, and leaves a remnant magnetic flux in the electromagnetic core 129 as a result.

The sixth motor operation mode 511 may be called the motor operation mode (1−), which is similar to the motor operation mode (1+). In this motor operation mode, the remnant magnetic flux residing in the electromagnetic core 129 results in the attraction of the first magnet assembly 146A toward the first stationary coil pair 126A. In the sixth motor operation mode 511, the current flowing in the first stationary coil pair 126A is considered negative, and has a magnitude sufficient to reduce the remnant magnetic flux in the electromagnetic core 129 to zero. This remnant magnetic flux would have been developed in the fifth motor operation mode 505.

The seventh motor operation mode 512 may be called the motor operation mode (2−) and the eighth motor operation mode 513 may be called the motor operation mode (3−), which are similar to the motor operation mode (2+) and the motor operation mode (3+), respectively. The seventh motor operation mode 512 occurs before the eighth motor operation mode 513.

In the seventh motor operation mode 512, current flows in the first stationary coil pair 126A as capacitor C1 discharges its stored energy. It will be appreciated that the current discharge from capacitor C1 is equal in magnitude to I(2) but flow in the opposite direction. This current causes an initial increase in magnetic flux in the electromagnetic core of the first stationary coil pair 126A that results in the propulsion of the first magnet assembly 146A away from the first stationary coil pair 126A.

In the eighth motor operation mode 513, current flow is maintained in the first stationary coil pair 126A as capacitor C1 continues to discharge its stored energy and supplemental energy is drawn from the DC/DC converter module 317 as diode D1 becomes forward biased. The total current flow from the capacitor C1 and the DC/DC converter module 317 causes a further increase in magnetic flux in the electromagnetic core of the first stationary coil pair 126A that works to propel the first magnet assembly 146A further away from the first stationary coil pair 126A.

In the seventh motor operation mode 512 and the eighth motor operation mode 513, the current flowing in the first stationary coil pair 126A is considered negative and has a magnitude that is greater than or equal to that in the sixth motor operation mode 511. Preferably, the current flowing in the first stationary coil pair 126A in the eighth motor operation mode should be sufficient to cause the magnetic flux in the electromagnetic core 129 to just reach magnetic saturation.

The ninth motor operation mode 514 may be called the motor operation mode (4−), which is similar to the motor operation mode (4+). In this operation mode, the current flowing in the first stationary coil pair 126A is considered negative and has a magnitude that is less than or equal to that in the eighth motor operation mode 513. The energy stored in the magnetic field of the first stationary coil pair 126A in the ninth motor operation mode 514 is released as electrical energy back into the first stationary coil pair 126A while continuing to propel the first magnet assembly 146A away from the first stationary coil pair 126A.

The tenth motor operation mode 515 may be called the motor operation mode (5−), which is similar to the motor operation mode (5+). In this operation mode, the current flowing in the first stationary coil pair 126A is considered negative and has a magnitude that is less than or equal to that in the ninth motor operation mode 514. The excess energy that is not consumed in the ninth motor operation mode 514, is directed back to capacitor C2 while continuing to propel (move) the first magnet assembly 146A away from the first stationary coil pair 126A. The current that flows in the tenth motor operation mode 515 falls to zero and leaves a remnant magnetic flux residing in the electromagnetic core 129 as a result.

The motor operation modes, as schematically depicted in FIG. 40, span across portions of the angular rotation of the rotatable common shaft 102 relative to the other motor operation modes. The time durations of the motor operation modes are controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Figure 41:
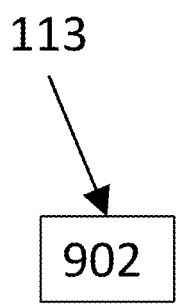
FIG. 41 depicts a schematic view of an embodiment of a flow chart usable by the controller of FIG. 1 for controlling the operations of the electric motor interface module of FIG. 23 in accordance with the schematic diagram of FIG. 40.
Figure 44:
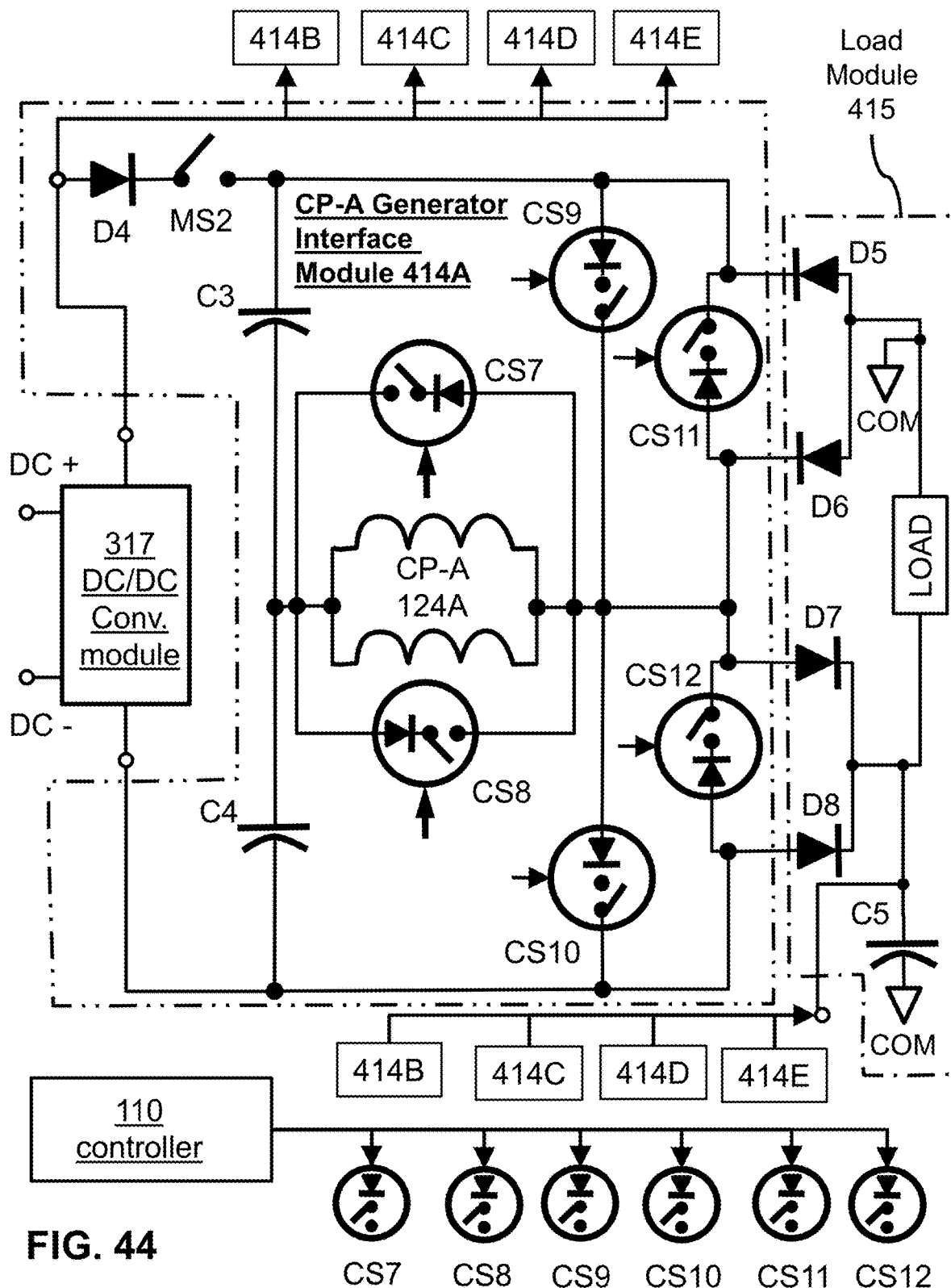
FIG. 44 depicts a schematic view of an embodiment of the first generator interface module or a second generator interface module for use with a first coil pair (also called coil windings) of any one of (A) the first rotatable electric machine, (B) the second rotatable electric machine, and (C) the third rotatable electric machine of FIG. 1.
Figure 53:
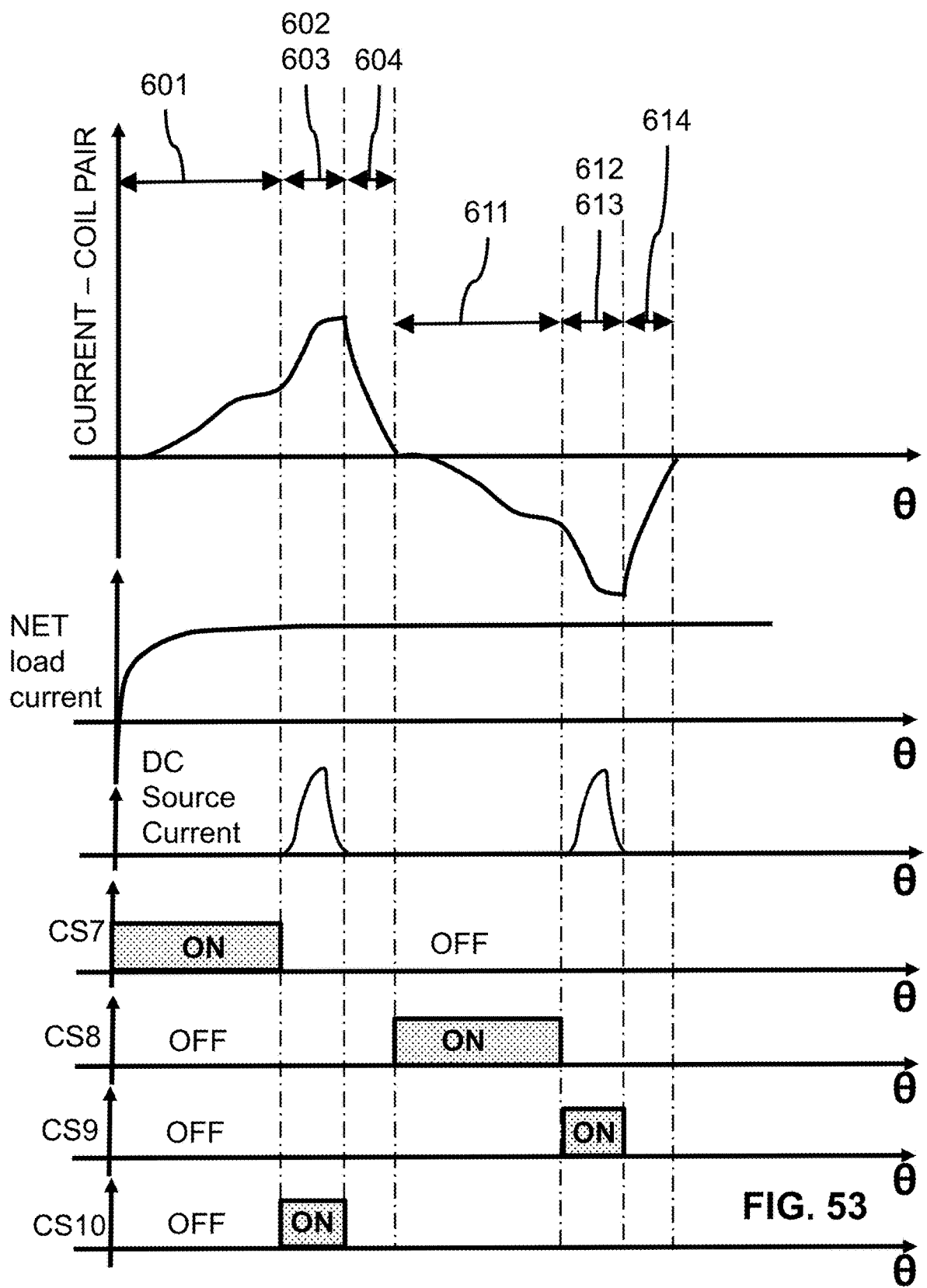
FIG. 53 depicts a schematic view of an embodiment of the operation modes of the first generator interface module and/or a second generator interface module of FIG. 44.

FIG. 41 depicts a schematic view of an embodiment of a flow chart usable by the controller 110 of FIG. 1 for controlling the operations of the electric motor interface module 216 of FIG. 23 in accordance with the schematic diagram of FIG. 40 (and for controlling the operation of the first generator interface module 214 or a second generator interface module 218 of FIG. 44 in accordance with the schematic diagram of FIG. 53).

The controller 110 (depicted in FIG. 1) is configured to electrically (operatively) interface with the rotatable electric machines (such as, the first rotatable electric machine 104, the second rotatable electric machine 106, and the third rotatable electric machine 108). For instance, the controller 110 is configured to control the current flowing through the electromagnet coil windings of the rotatable electric machines in such a way that, in use, the electromechanical torque generated by the second rotatable electric machine 106 is maximized, and the electrical energy supplied to the load module 415 from the first rotatable electric machine 104 and the third rotatable electric machine 108 does not retard the speed of rotation of the rotatable common shaft 102. The program 113 (depicted in FIG. 1) includes a set of computer-coded (processor coded) instructions that are readable by the controller 110. For instance, the instructions include an operation 902 configured to urge (instruct) the controller 110 to control the current flowing through the electromagnet coil windings of the first rotatable electric machine 104, the second rotatable electric machine 106 and the third rotatable electric machine 108 (in the manner as indicated above). It will be appreciated that other operations can be derived from this specification by those skilled in the art given a reasonable time for experimentation.

It will be understood by those skilled in the art that the switching logic is illustrated in digital switching diagrams in FIG. 40 for the rotatable electric motor and in FIG. 53 for the rotatable electric generators. It will be appreciated that switching logic is applicable to the operation of the rotatable electric machines and may be accomplished using various available technologies (components, assemblies, etc.).

Figure 42:
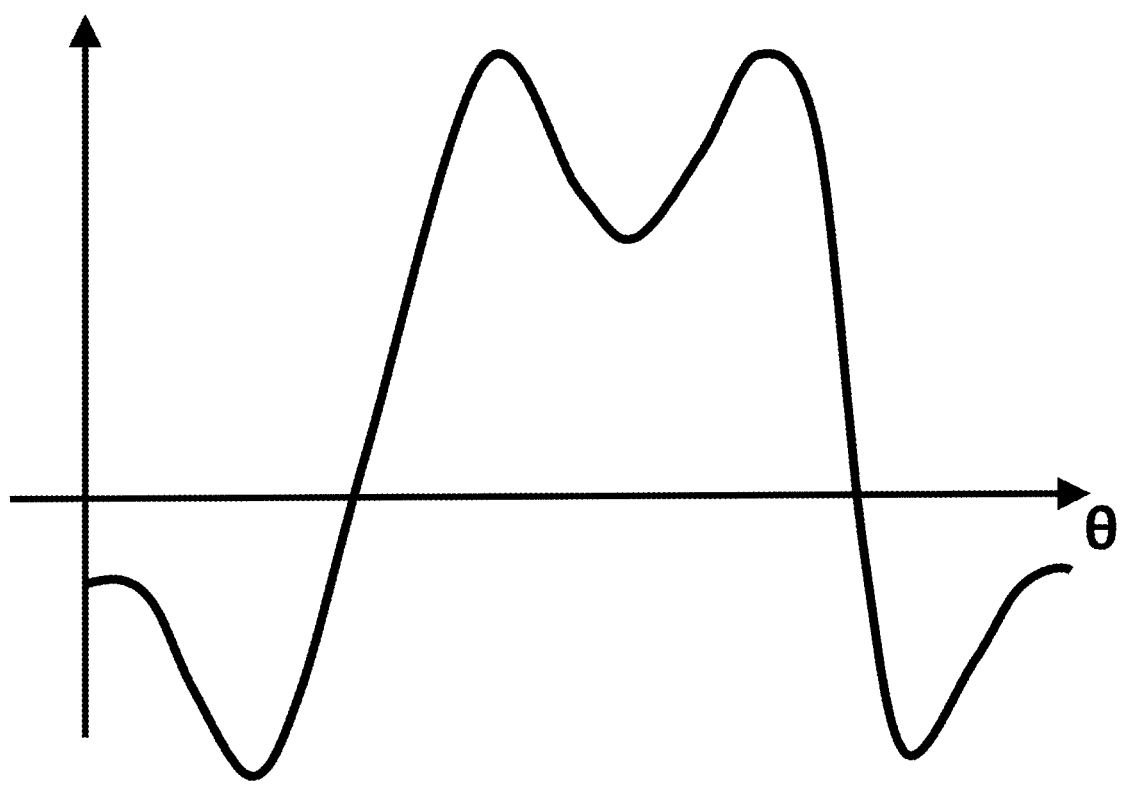
FIG. 42 depicts a schematic view of an embodiment of an induced electromotive force (emf or EMF) generated in the first stationary coil pair as a result of the first magnet assembly and the second magnet assembly B approaching and moving past the first stationary coil pair in accordance with the timing diagram of FIG. 40.

FIG. 42 depicts a schematic view of an embodiment of an induced electromotive force (emf) generated in the first stationary coil pair 126A as a result of the first magnet assembly 146A and the second magnet assembly 146B approaching and moving past the first stationary coil pair 126A in accordance with the timing diagram of FIG. 40.

Referring to the embodiment as depicted in FIG. 42, for the case where the first magnet assembly 146A and the second magnet assembly 146B approach and pass by the first stationary coil pair 126A, an induced emf (electromotive force) is developed in the first stationary coil pair 126A. One cycle of the induced emf is depicted in FIG. 42 as a function of the angular displacement of the rotatable common shaft 102. The frequency of the induced emf (electromotive force) is equal to the product of half the number of permanent magnets positioned on the second disk assembly 136 and the mechanical rotation frequency (rotation cycles per second) of the rotatable common shaft 102. It will be appreciated that the above description is applicable to the first disk assembly 134 and the third disk assembly 138.

The induced emf is a function of the angular displacement of the rotatable common shaft 102, the rotational speed and the number of turns of wire on the first stationary coil pair 126A. Furthermore, the induced emf is directly proportional to the product of the rotational speed and the number of turns of wire on the first stationary coil pair 126A.

It will be appreciated that the induced emf depicted in FIG. 42 is based on electrical terminals 125 being open (resulting in zero current flow in the first stationary coil pair 126A) and due to the rate of change of flux in the electromagnetic core 129 as the first magnet assembly 146A and the second magnet assembly 146B approach and pass by the first stationary coil pair 126A. It will also be appreciated that the induced emf may be different than that depicted in FIG. 42 if the current flowing in the first stationary coil pair 126A is greater than zero.

Figure 43:
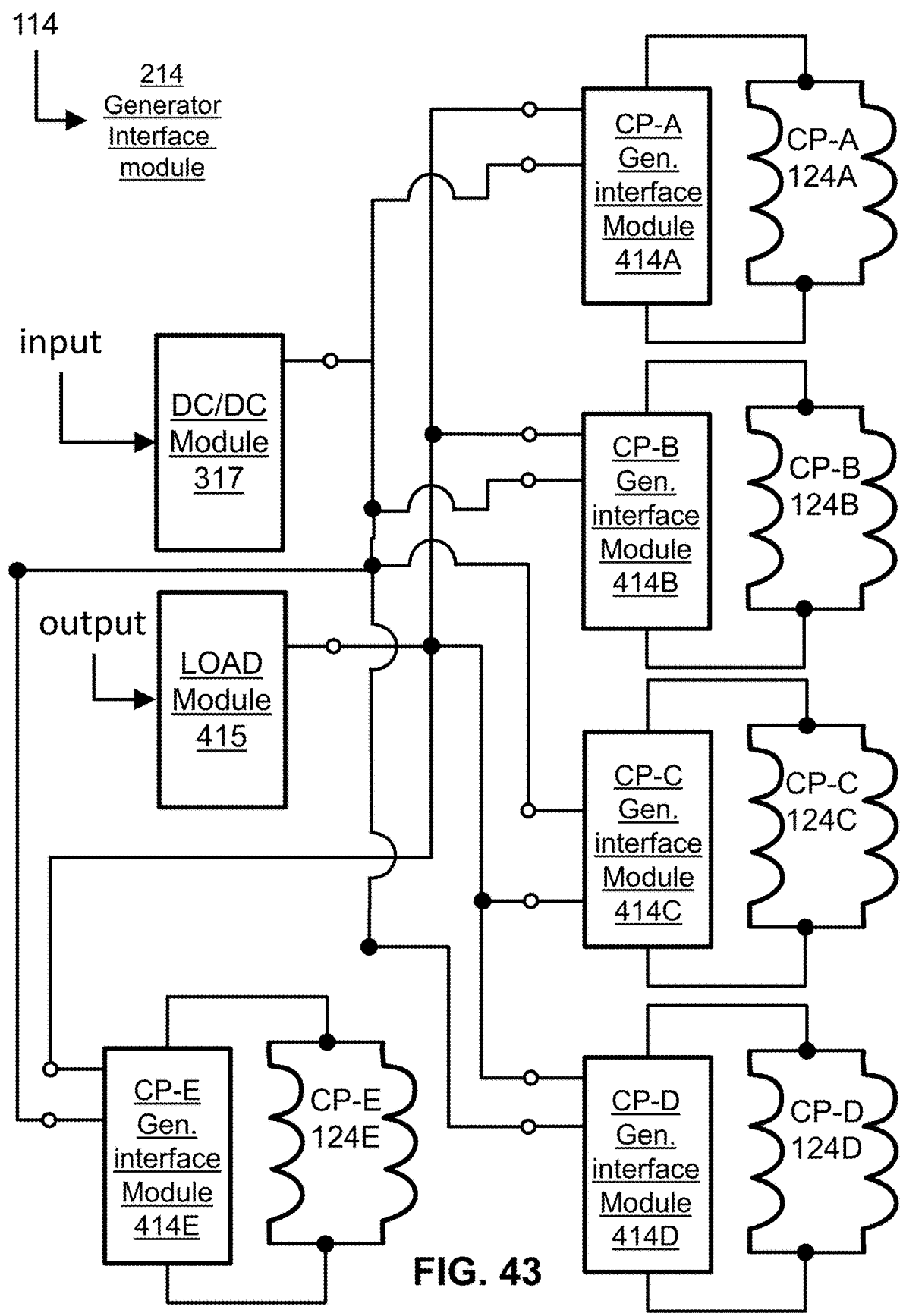
FIG. 43 depicts a schematic view of an embodiment of a first generator interface module or a second generator interface module usable for the case where any one of the first rotatable electric machine, the second rotatable electric machine, and the third rotatable electric machine of FIG. 1 are operated as a first electric generator assembly or as a second electric generator assembly.

FIG. 43 depicts a schematic view of an embodiment of a first generator interface module 214 or a second generator interface module 218 usable for the case where any one of the first rotatable electric machine 104, the second rotatable electric machine 106, and the third rotatable electric machine 108 of FIG. 1 are operated as a first electric generator assembly 204 or as a second electric generator assembly 208.

Referring to the embodiment as depicted in FIG. 43, the first generator interface module 214 includes the CP-A first generator interface module 414A to the CP-E first generator interface module 414E configured to electrically interface (respectively) with the first stationary electromagnetic coil pair collection 124 (the first stationary coil pair 124A to the fifth stationary coil pair 124E) of the first rotatable electric machine 104 or the first electric generator assembly 204. The second generator interface module 218 (as depicted in FIG. 1) includes the generator interface modules (similar to the CP-A first generator interface module 414A to the CP-E first generator interface module 414E) configured to electrically interface with the first stationary coil pair 128A to the fifth stationary coil pair 124E (respectively) of the second electric generator assembly 208 (as depicted in FIG. 1).

Referring to the embodiment as depicted in FIG. 43, the first generator interface module 214 includes: (A) the CP-A first generator interface module 414A (interfaced to the first stationary coil pair 124A), (B) the CP-B first generator interface module 414B (interfaced to the second stationary coil pair 124B), (C) the CP-C first generator interface module 414C (interfaced to the third stationary coil pair 124C), (D) the CP-D first generator interface module 414D (interfaced to the fourth stationary coil pair 124D), and (E) the CP-E first generator interface module 414E (interfaced to the fifth stationary coil pair 124E).

A load module 415 is configured to accept electrical energy developed in coil pair A (CP-A), coil pair B (CP-B), coil pair C (CP-C), coil pair D (CP-D), and coil pair E (CP-E) to a DC electrical load (such as the load module 415) without introducing a retarding torque on (or to) the rotatable common shaft 102.

FIG. 44 depicts a schematic view of an embodiment of the first generator interface module 214 (or a second generator interface module 218) for use with a first coil pair (coil winding) of any one of (A) the first rotatable electric machine 104, (B) the second rotatable electric machine 106, and (C) the third rotatable electric machine 108 of FIG. 1.

The first rotatable electric machine 104 and the third rotatable electric machine 108 are operated as (configured to operate as) the first electric generator assembly 204 and/or as the second electric generator assembly 208.

Referring to the embodiment as depicted in FIG. 44, the CP-A first generator interface module 414A is also usable with (applicable for) the CP-B second generator interface module 416B, CP-C third generator interface module 416C, CP-D fourth generator interface module 416D, and CP-B fifth generator interface module 416E, as depicted in FIG. 43).

The CP-A first generator interface module 414A includes the coil pair CP-A, such as the first stationary coil pair 124A, a main switch MS2, a diode D4, a diode D5, a diode D6, a diode D7, a diode D8, a capacitor C3, a capacitor C4, a digitally controllable switch CS7, a digitally controllable switch CS8, a digitally controllable switch CS9, a digitally controllable switch CS10, a digitally controllable switch CS11, a digitally controllable switch CS12, and the DC/DC converter module 317. Operation of the CP-A first generator interface module 414A is described in association with FIGS. 45 to 52.

Figure 45:
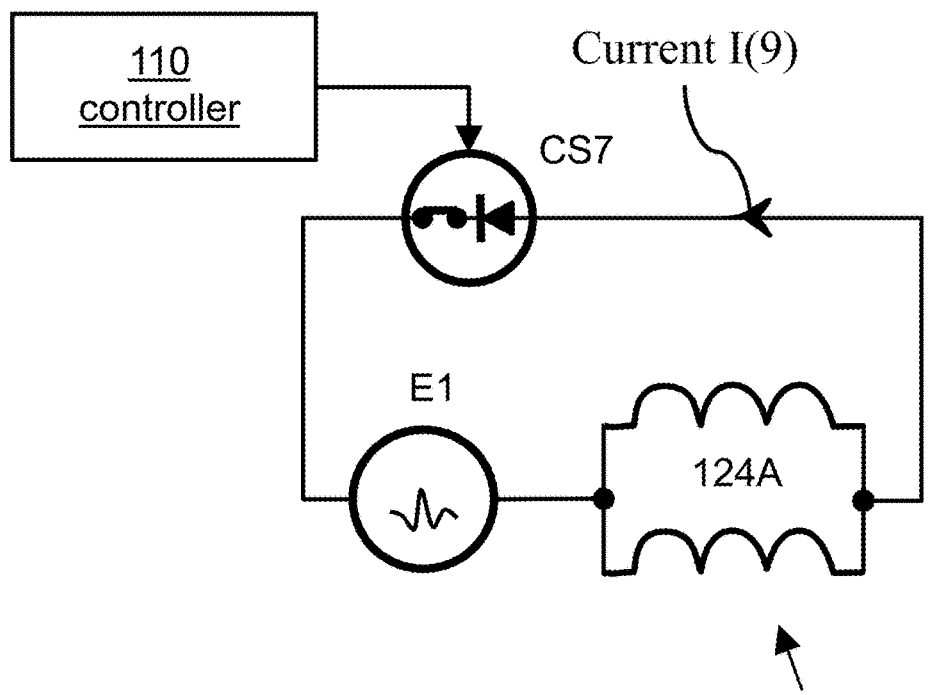
FIG. 45 and FIG. 46 depict a reduced schematic view (FIG. 45) and a perspective view (FIG. 46) of an embodiment of a reduced circuit for the CP-A first generator interface module of FIG. 44, and the first stationary coil pair of FIG. 44, respectively, and in which the reduced circuit for the CP-A first generator interface module operates in a first generator operation mode and a fifth generator operation mode.
Figure 46:
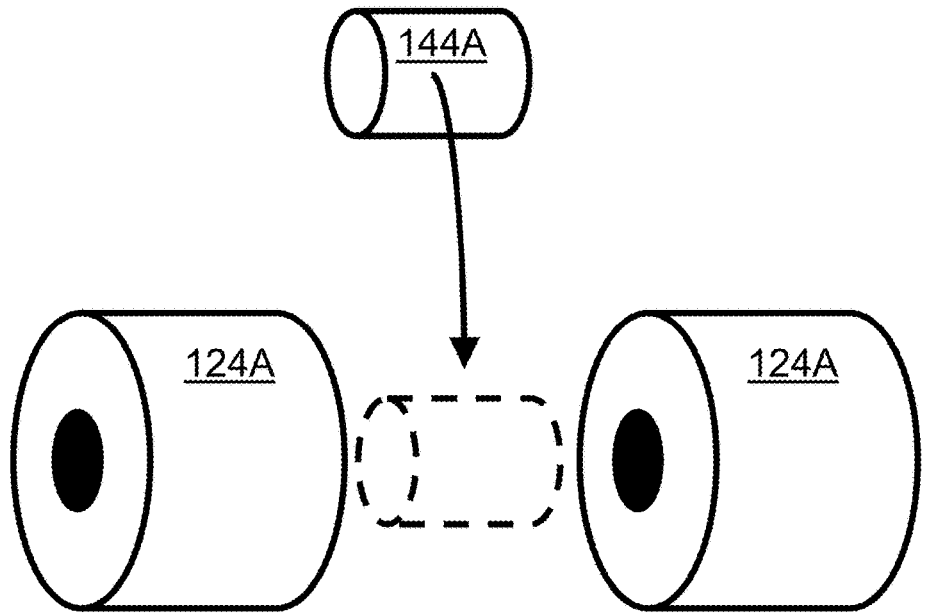

FIG. 45 and FIG. 46 depict a reduced schematic view (FIG. 45) and a perspective view (FIG. 46) of an embodiment of a reduced circuit for the CP-A first generator interface module 414A of FIG. 44, and the first stationary coil pair 124A of FIG. 44, respectively, and operating in the first generator operation mode 601 and the fifth generator operation mode 611 (also called the induced emf generative energy mode).

Referring to the embodiment as depicted in FIG. 45, the first generator operation mode 601 is schematically depicted in FIG. 53. The mode 601 spans across a portion of the angular rotation of the rotatable common shaft 102 (as depicted in FIG. 53) relative to the other operation modes of the CP-A first generator interface module 414A. The time duration of the first generator operation mode 601 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to the embodiment as depicted in FIG. 45, it will be appreciated that E1 represents the induced emf (electromotive force), which is induced into the first stationary coil pair 124A. The first magnet assembly 144A is moving towards the first stationary coil pair 124A, and between the coil pairs of the first stationary coil pair 124A (depicted in FIG. 46). The first magnet assembly 144A is magnetically attracted to move toward the first stationary coil pair 124A, and between the coil pairs of the first stationary coil pair 124A due to the remnant magnetic flux developed in the electromagnetic core 129.

Referring to the embodiment as depicted in FIG. 45, in the first generator operation mode 601, the digitally controllable switch CS7 is switched ON to cause a current I(9) to flow in the first stationary coil pair 124A. Switches MS2 and CS7 are switched ON, and the switches CS8, CS9, CS10, CS11 and CS12 are switched OFF. The current I(9) is considered to be positive and its value (magnitude) is sufficient to reduce the remnant magnetic flux residing in the electromagnetic core 129 to zero (about zero) for the case where the first stationary coil pair 124A and the first magnet assembly 144A are radially aligned with respect to the axis of rotation of the rotatable common shaft 102.

The fifth generator operation mode 611 (not schematically depicted) spans across a portion of the angular rotation of the rotatable common shaft 102 (as depicted in FIG. 53) relative to the other operation modes of the CP-A first generator interface module 414A. The time duration of the fifth generator operation mode 611 is controlled by the controller 110 (depicted in FIG. 1) in response to the controller 110, in use, receiving angular shaft information (data), which is associated with the rotation of the rotatable common shaft 102, from the angular encoder 115 (depicted in FIG. 1). The first magnet assembly 144A moves towards the first stationary coil pair 124A, and between the coil pairs of the first stationary coil pair 124A (depicted in FIG. 46). The first magnet assembly 144A is magnetically attracted to move toward the first stationary coil pair 124A, and between the coil pairs of the first stationary coil pair 124A due to the remnant magnetic flux developed in the electromagnetic core 129.

In the fifth generator operation mode 611, the digitally controllable switch CS8 is switched ON to cause a current to flow in the first stationary coil pair 124A. Switches MS2 and CS8 are switched ON, and the switches CS7, CS9, CS10, CS11 and CS12 are switched OFF. The current in the first stationary coil pair 124A is considered to be negative and its value (magnitude) is sufficient to reduce the remnant magnetic flux residing in the electromagnetic core 129 to zero (about zero) for the case where the first stationary coil pair 124A and the first magnet assembly 144A are radially aligned with respect to the axis of rotation of the rotatable common shaft 102.

Switches CS11 and CS12 are used to bypass (when switched ON) the load module 415 as needed. No current is drawn from the DC/DC converter module 317 in the first generator operation mode 601 and fifth generator operation mode 611.

Figure 47:
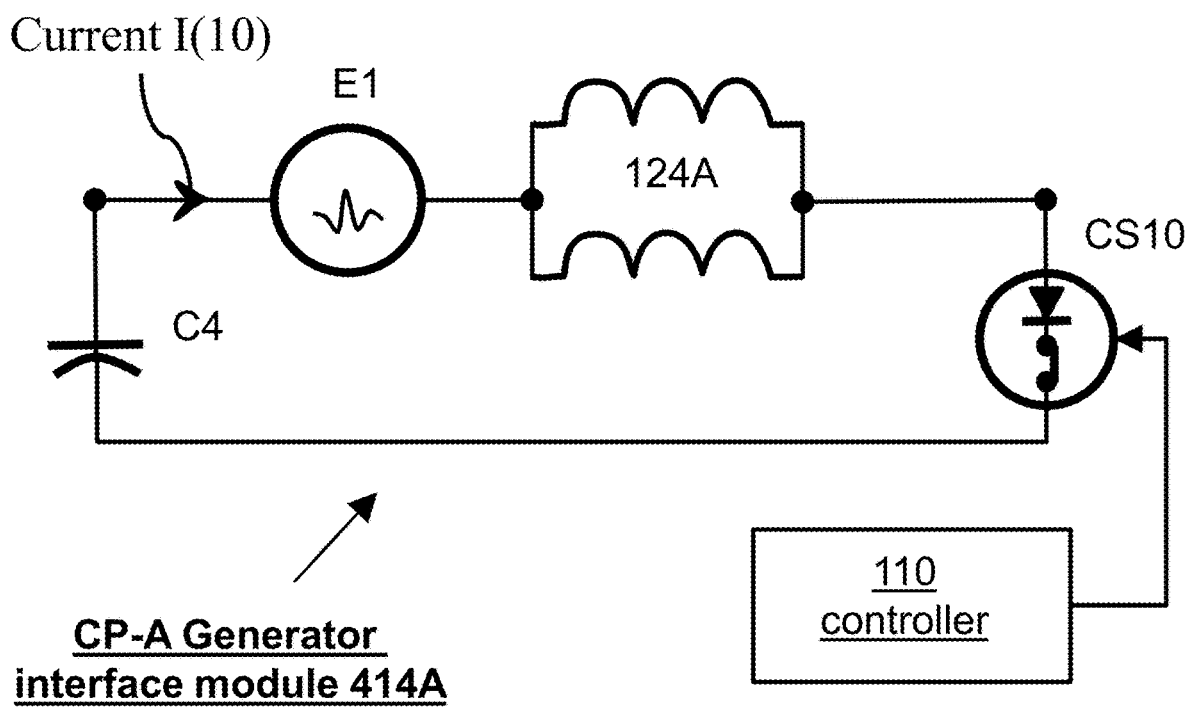
FIG. 47 and FIG. 48 depict a reduced schematic view (FIG. 47) and a perspective view (FIG. 48) of an embodiment of a reduced circuit for the CP-A first generator interface module of FIG. 44, and the first stationary coil pair of FIG. 44, respectively, and in which the reduced circuit for the CP-A first generator interface module operates in a second generator operation mode and a sixth generator operation mode.
Figure 48:
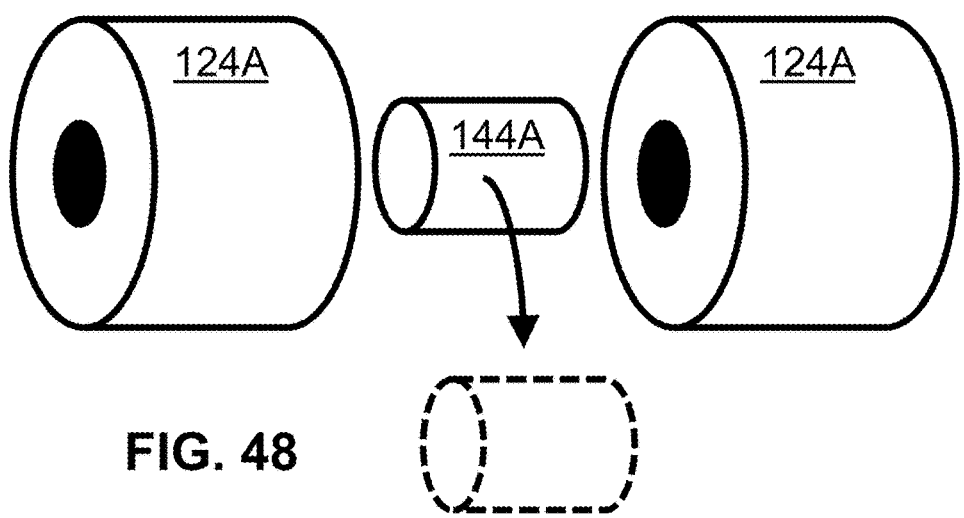

FIG. 47 and FIG. 48 depict a reduced schematic view (FIG. 47) and a perspective view (FIG. 48) of an embodiment of a reduced circuit for the CP-A first generator interface module 414A of FIG. 44, and the first stationary coil pair 124A of FIG. 44, respectively, and operating in the second generator operation mode 602 and sixth generator operation mode 612.

Referring to the embodiment as depicted in FIG. 47, the second generator operation mode 602 is schematically depicted in FIG. 53. The mode 602 spans across a portion of the angular rotation of the rotatable common shaft 102 (as depicted in FIG. 53) relative to the other operation modes of the CP-A first generator interface module 414A. The time duration of the second generator operation mode 602 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to the embodiment as depicted in FIG. 48, the first magnet assembly 144A is aligned (radially aligned) and coaxially offset from the first stationary coil pair 124A, and is positioned between the coil pairs of the first stationary coil pair 124A. The digitally controllable switch CS10 is switched ON to cause positive current 410) to flow in the first stationary coil pair 124A, where the magnitude of current I(10) is greater than or equal to current I(9). Current 410), in use, increases the magnetic flux residing in the electromagnetic core of the first stationary coil pair 124A, which propels (moves) the first magnet assembly 144A as indicated by the arrow in FIG. 48. The switches MS2 and CS10 are switched ON, and the switches CS7, CS8, CS9, CS11 and CS12 are switched OFF.

The sixth generator operation mode 612 (not schematically depicted) spans across a portion of the angular rotation of the rotatable common shaft 102 (as depicted in FIG. 53) relative to the other operation modes of the CP-A first generator interface module 414A. The time duration of the sixth generator operation mode 612 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to the embodiment as depicted in FIG. 48, the first magnet assembly 144A is aligned (radially aligned) and coaxially offset from the first stationary coil pair 124A, and is positioned between the coil pairs of the first stationary coil pair 124A. The digitally controllable switch CS11 is switched ON to cause negative current to flow in the first stationary coil pair 124A, where the magnitude of this current is equal to current I(10) but flows in the opposite direction. The current in the first stationary coil pair 124A, in use, increases the magnetic flux residing in the electromagnetic core of the first stationary coil pair 124A, which propels (moves) the first magnet assembly 144A as indicated by the arrow in FIG. 48. The switches MS2 and CS11 are switched ON, and the switches CS7, CS8, CS9, CS10 and CS12 are switched OFF.

Switches CS11 and CS12 are used to bypass (when switched ON) the load module 415 as needed. No current is drawn from the DC/DC converter module 317 in the second generator operation mode 602 and the sixth generator operation mode 612.

Figure 49:
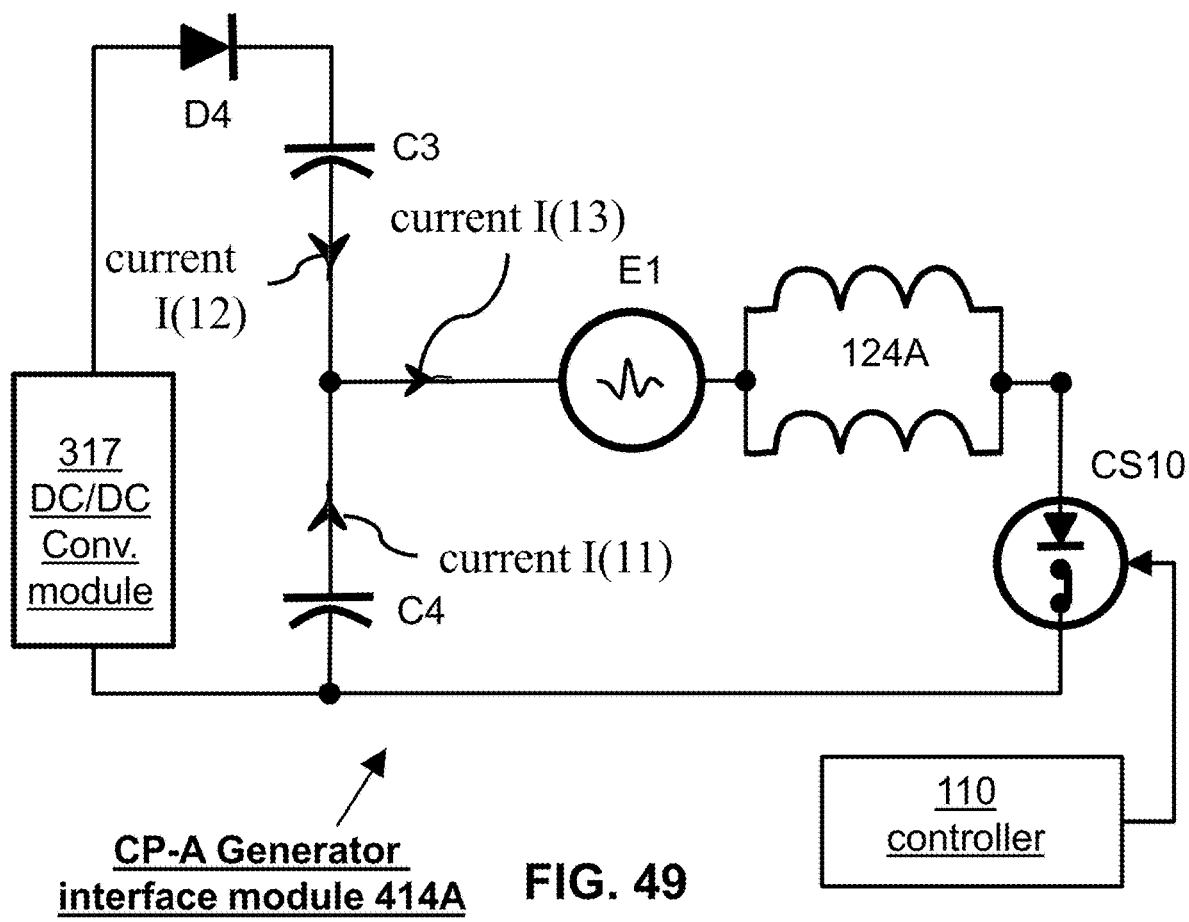
FIG. 49 and FIG. 50 depict a reduced schematic view (FIG. 49) and a perspective view (FIG. 50) of an embodiment of a reduced circuit for the CP-A first generator interface module of FIG. 44, and the first stationary coil pair of FIG. 44, respectively, in which the reduced circuit for the CP-A first generator interface module operates in a third generator operation mode and a seventh generator operation mode.
Figure 50:
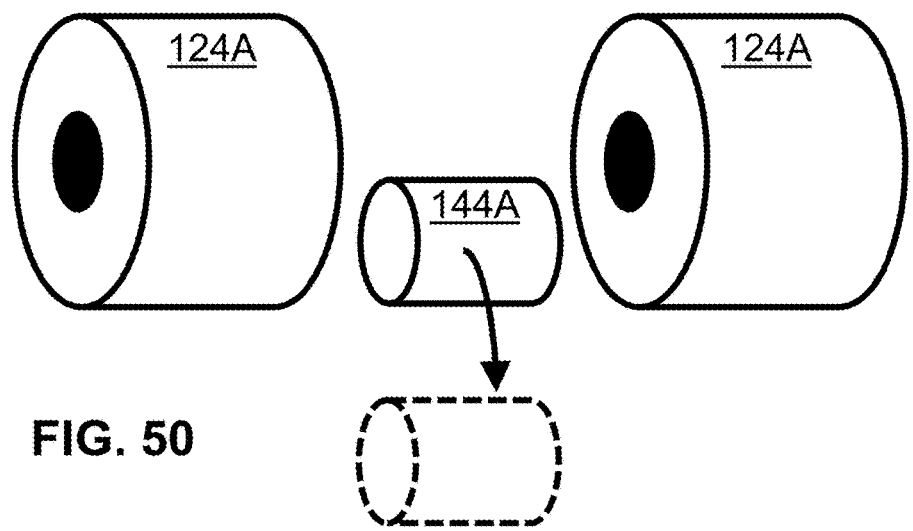

FIG. 49 and FIG. 50 depict a reduced schematic view (FIG. 49) and a perspective view (FIG. 50) of an embodiment of a reduced circuit for the CP-A first generator interface module 414A of FIG. 44, and the first stationary coil pair 124A of FIG. 44, respectively, operating in the third generator operation mode 603 and the seventh generator operation mode 613.

Referring to the embodiment as depicted in FIG. 49, the third generator operation mode 603 is schematically depicted in FIG. 53. The mode 603 spans across a portion of the angular rotation of the rotatable common shaft 102 (as depicted in FIG. 53) relative to the other operation modes of the CP-A first generator interface module 414A. The time duration of the third generator operation mode 603 is controlled by the controller 110 (depicted in FIG. 1) in response to the controller 110, in use, receiving angular shaft information (angular displacement or angular shaft displacement data), which is associated with the rotation of the rotatable common shaft 102, from the angular encoder 115, as depicted in FIG. 1.

Referring to the embodiment as depicted in FIG. 50, the first magnet assembly 144A moves away from the first stationary coil pair 124A, and from between the coil pairs of the first stationary coil pair 124A. Current I(12) is drawn from the DC/DC converter module 317 (a DC voltage source) as diode D4 becomes forward biased (to supplement the current I(11) from capacitor C4). Current I(13), the sum of currents I(11) and I(12), increases the magnetic flux in the electromagnetic core 129 and provides additional boost to propel the first magnet assembly 144A away from first stationary coil pair 124A. Referring to the embodiment as depicted in FIG. 49, the switches MS2 and CS10 are switched ON and the switches CS7, CS8, CS9, CS11 and CS12 are switched OFF.

The seventh generator operation mode 613 (not schematically depicted) spans across a portion of the angular rotation of the rotatable common shaft 102 (as depicted in FIG. 53) relative to the other operation modes of the CP-A first generator interface module 414A. The time duration of the seventh generator operation mode 613 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to the embodiment as depicted in FIG. 50, the first magnet assembly 144A moves away from the first stationary coil pair 124A, and from between the coil pairs of the first stationary coil pair 124A. Current is drawn from the DC/DC converter module 317 (a DC voltage source) as diode D4 becomes forward biased (to supplement the current from capacitor C3). The sum of the currents from the capacitor C3 and the DC/DC converter module 317, increases the magnetic flux in the electromagnetic core 129 and provides additional boost to propel the first magnet assembly 144A away from first stationary coil pair 124A. In the embodiment (not depicted), the switches MS2 and CS9 are switched ON and the switches CS7, CS8, CS10, CS11 and CS12 are switched OFF.

Switches CS11 and CS12 are used to bypass (when switched ON) the load module 415 as needed. The third and seventh generator operation modes are the only operation modes where electrical power is drawn from the DC/DC converter module 317 (also called the DC voltage source).

Figure 51:
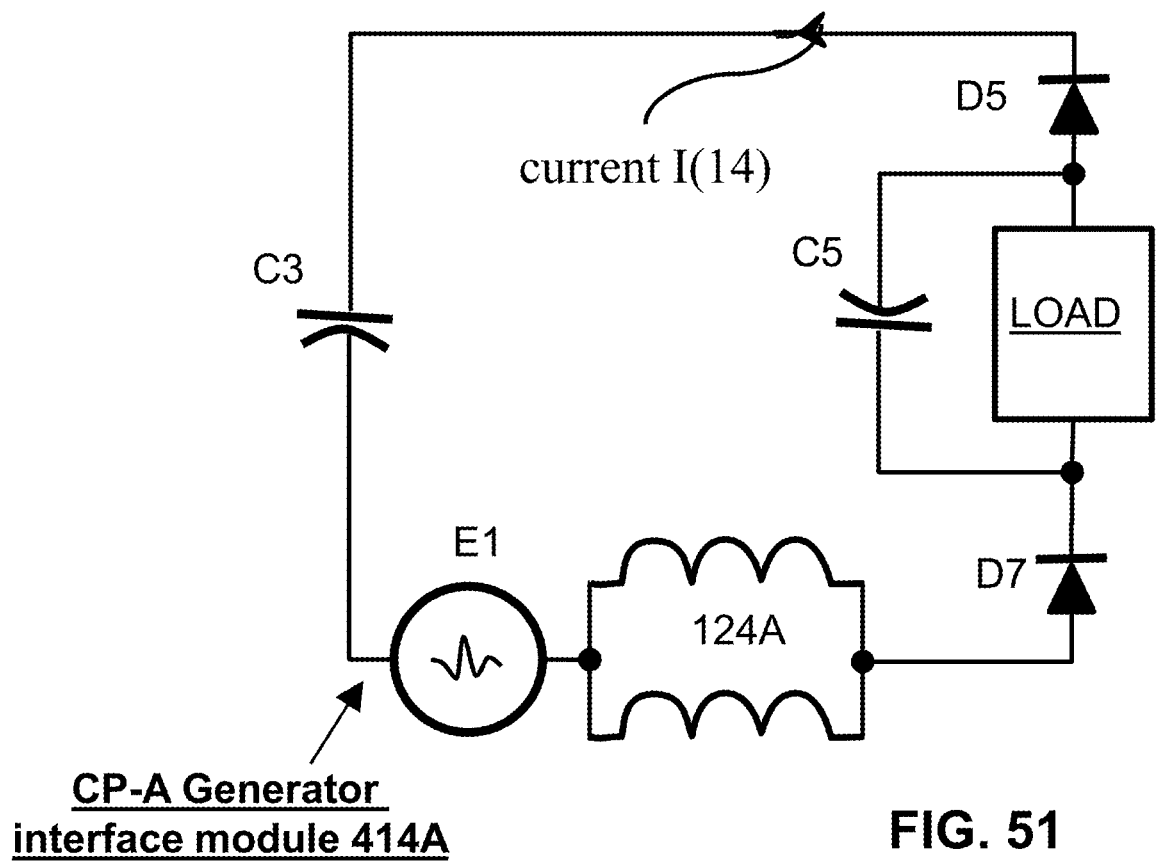
FIG. 51 and FIG. 52 depict a reduced schematic view (FIG. 51) and a perspective view (FIG. 52) of an embodiment of a reduced circuit for the CP-A first generator interface module of FIG. 44, and the first stationary coil pair of FIG. 44, respectively, in which the reduced circuit for the CP-A first generator interface module operates in a fourth generator operation mode and an eighth generator operation mode.
Figure 52:
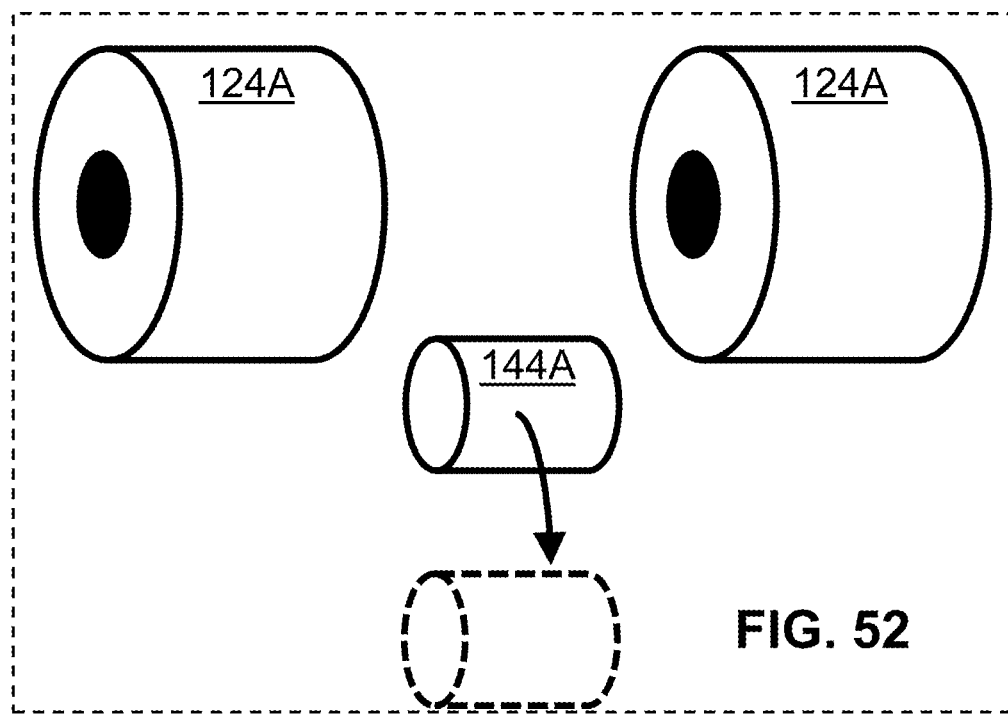

FIG. 51 and FIG. 52 depict a reduced schematic view (FIG. 51) and a perspective view (FIG. 52) of an embodiment of a reduced circuit for the CP-A first generator interface module 414A of FIG. 44, and the first stationary coil pair 124A of FIG. 44, respectively, operating in the fourth generator operation mode 604 and the eighth generator operation mode 614.

Referring to the embodiment as depicted in FIG. 51, the fourth generator operation mode 604 is schematically depicted in FIG. 53. The mode 604 spans across a portion of the angular rotation of the rotatable common shaft 102 (as depicted in FIG. 53) relative to the other operation modes of the CP-A first generator interface module 414A. The time duration of the fourth generator operation mode 604 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to FIG. 52, the first magnet assembly 144A continues to move away from the first stationary coil pair 124A, and further away from between the coil pairs of the first stationary coil pair 124A. Switch CS10 is switched OFF to force the energy from the magnetic field of the first stationary coil pair 124A into capacitor C3 and the load module 415 through diode D5 and diode D7. The energy stored in capacitor C3 is used on the next cycle of the second generator operation mode to supplement the energy from the DC/DC converter module 317. As the energy from the magnetic field residing in the first stationary coil pair 124A is directed into capacitor C3 and the load module 415, the first magnet assembly 144A is propelled (moved) further along as the current I(14) in the first stationary coil pair 124A falls to zero (about zero). It will be appreciated that the magnetic flux in the electromagnetic core 129 does not fall to zero when the current I(14) in the first stationary coil pair 124A falls to zero due to the magnetic hysteresis of the electromagnetic core. Furthermore, a remnant magnetic flux is retained in the electromagnet core when the current flowing in the first stationary coil pair 124A falls to zero.

Referring to the embodiment as depicted in FIG. 51, switch MS2 is switched ON and switches CS7, CS8, CS9, CS10, CS11 and CS12 are switched OFF.

The eighth generator operation mode 614 (not schematically depicted) spans across a portion of the angular rotation of the rotatable common shaft 102 (as depicted in FIG. 53) relative to the other operation modes of the CP-A first generator interface module 414A. The time duration of the eighth generator operation mode 614 is controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Referring to FIG. 52, the first magnet assembly 144A continues to move away from the first stationary coil pair 124A, and further away from between the coil pairs of the first stationary coil pair 124A. Switch CS9 is switched OFF to force the energy from the magnetic field of the first stationary coil pair 124A into capacitor C4 and the load module 415 through diode D5 and diode D7. The energy stored in capacitor C4 is used on the next cycle of the sixth generator operation mode 612 to supplement the energy from the DC/DC converter module 317. As the energy from the magnetic field residing in the first stationary coil pair 124A is directed into capacitor C4 and the load module 415, the first magnet assembly 144A is propelled (moved) further along as the current in the first stationary coil pair 124A falls to zero (about zero). It will be appreciated that the magnetic flux in the electromagnetic core 129 does not fall to zero when the current in the first stationary coil pair 124A falls to zero due to the magnetic hysteresis of the electromagnetic core. Furthermore, a remnant magnetic flux is retained in the electromagnet core when the current flowing in the first stationary coil pair 124A falls to zero.

Referring to the embodiment as depicted in FIG. 51, switch MS2 is switched ON and switches CS7, CS8, CS9, CS10, CS11 and CS12 are switched OFF.

Switches CS11 and CS12 are used to bypass (when switched ON) the load module 415 as needed. No current is drawn from the DC/DC converter module 317 in the fourth generator operation mode 604 and the eighth generator operation mode 614.

FIG. 53 depicts a schematic view of an embodiment of the operation modes of the first generator interface module 214 or a second generator interface module 218 of FIG. 44.

Referring to the embodiment as depicted in FIG. 45, the first generator operation mode 601 may be called a generator operation mode (1+). The remnant magnetic flux residing in the electromagnetic core 129 results in the attraction of the first magnet assembly 144A towards the first stationary coil pair 124A. In the first generator operation mode 601, the current flowing in the first stationary coil pair 124A is considered positive and has a magnitude sufficient to reduce the remnant magnetic flux in the electromagnetic core 129 to about zero (preferably zero if possible) at the start of the second generator operation mode 602.

The second generator operation mode 602 and the third generator operation mode 603 may be called the generator operation mode (2+) and the generator operation mode (3+), respectively. The second generator operation mode 602 occurs before the third generator operation mode 603.

In the second generator operation mode 602 current I(10) flows in the first stationary coil pair 124A as capacitor C4 discharges its stored energy. Current I(10) causes an initial increase in magnetic flux in the electromagnetic core of the first stationary coil pair 124A that results in the propulsion of the first magnet assembly 144A away from the first stationary coil pair 124A.

In the third generator operation mode 603, current I(13) flows in the first stationary coil pair 124A as capacitor C4 continues to discharge its stored energy with supplemental energy drawn from the DC/DC converter module 317 as diode D4 becomes forward biased. Current I(13) causes a further increase in magnetic flux in the electromagnetic core of the first stationary coil pair 124A that works to propel the first magnet assembly 144A further away from the first stationary coil pair 126A. Current I(13) is the sum of currents I(11) from capacitor C4 and current I(12) from the DC/DC converter module 317.

In the second generator operation mode 602 and the third generator operation mode 603, the current flowing in the first stationary coil pair 124A is considered positive, and has a magnitude that is greater than or equal to current I(9) in the first generator operation mode 601. Preferably, the current flowing in the first stationary coil pair 124A in the third generator operation mode 603 should be sufficient to cause the magnetic flux in the electromagnetic core 129 to just reach magnetic saturation in order to maximize the energy efficiency of the system. Energy is only required from the DC/DC converter module 317 in the third generator operation mode 603.

The fourth generator operation mode 604 may be called the generator operation mode (4+). For the fourth generator operation mode 604, the current flowing in the first stationary coil pair 124A is considered positive and has a magnitude that is less than or equal to that in the third generator operation mode 603. The energy, which is developed in the magnetic field of the first stationary coil pair 124A in the third generator operation mode 603, is directed towards the load module 415 and capacitor C3 while continuing to propel (move) the first magnet assembly 144A away from the first stationary coil pair 124A. The current I(14) flowing during the fourth generator operation mode 604 falls to about zero (preferably at zero), and leaves a remnant magnetic flux residing in the electromagnetic core 129.

The fifth generator operation mode 611 may be called the generator operation mode (1−), which is similar to the generator operation mode (1+). The remnant magnetic flux residing in the electromagnetic core 129 results in the magnetic attraction of the first magnet assembly 144A towards the first stationary coil pair 124A. In the fifth generator operation mode 611, the current flowing in the first stationary coil pair 124A is considered negative and has a magnitude sufficient to reduce the remnant magnetic flux that resides in the electromagnetic core 129 to about zero (preferably to zero) at the start of the sixth generator operation mode 612.

The sixth generator operation mode 612 and the seventh generator operation mode 613 may be called the generator operation mode (2−) and the generator operation mode (3−), respectively, and which are similar to the generator operation mode (2+) and the generator operation mode (3+), respectively. The sixth generator operation mode 612 occurs before the seventh generator operation mode 613.

In the sixth generator operation mode 612, current flows in the first stationary coil pair 124A as capacitor C3 discharges its stored energy. The current flowing in the first stationary coil pair 124A causes an initial increase in magnetic flux in the electromagnetic core of the first stationary coil pair 124A that results in the propulsion of the first magnet assembly 144A away from the first stationary coil pair 124A.

In the seventh generator operation mode 613, current flows in the first stationary coil pair 124A as capacitor C3 continues to discharge its stored energy with supplemental energy drawn from the DC/DC converter module 317 as diode D4 becomes forward biased. The current flowing in the first stationary coil pair 124A causes a further increase in magnetic flux in the electromagnetic core of the first stationary coil pair 124A that works to propel the first magnet assembly 144A further away from the first stationary coil pair 126A. The current flowing in the first stationary coil pair 124A is the sum of currents from capacitor C3 and the current supplemented from the DC/DC converter module 317. In the sixth generator operation mode 612 and the seventh generator operation mode 613, the current flowing in the first stationary coil pair 124A is considered negative, and has a magnitude that is greater than or equal to that in the fifth generator operation mode 611. Preferably, the current flowing in the first stationary coil pair 124A in the seventh generator operation mode 613 mode should be sufficient to cause the magnetic flux in the electromagnetic core 129 to just reach magnetic saturation in order to maximize the energy efficiency of the system. Energy is only required from the DC/DC converter module 317 in the seventh generator operation mode 613.

The eighth generator operation mode 614 may be called the generator operation mode (4−), which is similar to the generator operation mode (4+). For the eighth generator operation mode 614, the current flowing in the first stationary coil pair 124A is considered negative and has a magnitude that is less than or equal to that in the seventh generator operation mode 613. The energy in the magnetic field residing in the first stationary coil pair 124A is directed towards the load module 415 and capacitor C4 while continuing to propel the first magnet assembly 144A away from the first stationary coil pair 124A. The current that flows in the eighth generator operation mode 614 falls to zero, and leaves a remnant magnetic flux in the electromagnetic core 129.

For the first electric generator assembly 204, the second electric generator assembly 208, and the electric motor assembly 206, it will be appreciated that the current flowing through the coil pairs are out of phase, relative to each other, by the absolute value of (Am−Ac)=abs (60−72)=12 degrees (for the depicted embodiment).

The generator operation modes, as schematically depicted in FIG. 53, span across portions of the angular rotation of the rotatable common shaft 102 relative to the other generator operation modes. The time durations of the generator operation modes are controlled by the controller 110 (depicted in FIG. 1) in response to the controller 110, in use, receiving angular shaft information (data), which is associated with the rotation of the rotatable common shaft 102, from the angular encoder 115, as depicted in FIG. 1.

Additional Description

Preferably, the circumferential angular offset of the rotatable disk assemblies cause a reduction (preferably elimination) of the net cogging torque at the rotatable common shaft 102.

Preferably, the initialization of the coil pair current uses the generated induced current without invoking retarding torques (this reduces the energy required from the source to increase the magnetic flux in the electromagnet).

Preferably, a coaxial offset between the electromagnet core of the coil pairs and the permanent magnets of the disk assemblies improves or increases the torque of the rotatable common shaft 102 (preferably to achieve maximum torque).

Preferably, the extraction and usage of the energy stored in the magnetic field of the coil pairs is used for performing mechanical work (this boosts or improves system efficiency).

Preferably, the first generator interface module 214 (depicted in FIG. 43) and the second generator interface module 218 (depicted in FIG. 1) are equivalent to the electric motor interface module 216 (depicted in FIG. 23) but with the battery charging switching module 400 (depicted in FIG. 25 and FIG. 26) replaced with the load module 415 (depicted in FIG. 43).

In accordance with a preferred embodiment, the apparatus includes two or more rotatable disk assemblies that are rigidly mounted (fixedly mounted) to the rotatable common shaft 102, which is rotatable about an elongated rotation axis.

Each rotatable disk assembly has an even number of permanent magnets with relatively strong magnetic fields that are embedded in the rotatable disk assemblies, and equally spaced along their periphery.

An odd number (such as three) of electromagnet pairs with high magnetic permeability, low hysteresis loss and low eddy current loss cores are rigidly mounted and arranged to interact with the magnetic field of the permanent magnets mounted to the rotatable disk assemblies as they rotate. Preferably, the electromagnet cores (of the coil pairs) have a high remnant magnetic flux relative to their saturated magnetic flux and low magnetic coercivity.

The rotatable disk assemblies and their corresponding electromagnet pairs are specifically arranged to eliminate (or reduce) the cogging forces that would normally be experienced in conventional electric rotating machines.

Preferably, external power is only required to overcome bearing friction and windage torques (frictional losses) as the rotatable common shaft 102 and the rotatable disk assemblies rotate about the rotation axis of the rotatable common shaft 102.

The apparatus is set into operation using an initial external impulse (starting) torque that is applied to the rotatable common shaft 102 and/or the rotatable disk assemblies, and the controller 110 is subsequently engaged to maintain and control rotation of the rotatable disk assemblies.

The controller 110 is configured (programmed) to control computer-controllable switches to: (A) selectively activate and deactivate electrical power to the electromagnet pairs of the rotatable electric machines, (B) control the speed and torque and of the rotatable common shaft 102, and (C) control the electrical output from the first rotatable electric machine 104 and the third rotatable electric machine 108.

The controller 110 is configured to take advantage of the ability of the electromagnets to store energy in their magnetic field and discharge the stored energy from their magnetic field while performing mechanical work. The controller 110 is also configured to take advantage of the magnetic hysteresis of the electromagnetic core 129 to maximize the electromechanical torque at the rotatable common shaft 102 with no additional power requirement from the DC source (such as the DC/DC converter module 317).

As the electromagnets are energized, the electromagnets, in use, propel (rotate) the rotatable disk assemblies as the electromagnets magnetically interact with the magnetic field of the permanent magnets positioned on the rotatable disk assemblies, and, preferably at the same time, the electromagnets store energy in their magnetic field.

The energy stored in the magnetic field of the electromagnets is subsequently extracted as electrical energy, and is used to provide additional propulsion to the rotatable disk assemblies while the interfacing circuits are disconnected from the DC source.

The controller 110 and memory assembly 111 may require a constant source of power to operate the system.

The non-extracted energy from the electromagnets is directed to a storage device such as a capacitor (while still propelling the rotatable disk assemblies and remaining disconnected from the DC source), and is subsequently used to offset the DC source requirement on the next activation cycle of the electromagnet pairs.

Thus, the apparatus obtains only a fraction of its energy requirement from the DC source to operate, hence the improvement in efficiency over conventional rotating electric machines.

A relatively higher efficiency of the apparatus is achieved when the resistive losses in the electromagnet are low and the permeability and electrical resistivity of the electromagnet cores are relatively high.

Some of the electromagnet pairs may be used to drive the apparatus, and some to supply energy to an external electrical load.

As an electrical generator, energy is extracted from the electromagnet coil pairs without impacting the mechanical performance.

Mechanically, the axis of permanent magnets mounted to the rotatable disk assemblies, and that of the cores of the electromagnet pairs, are coaxially offset from each other in such a way that the axis of permanent magnets, in use, maximize the performance of the electric machine (electric motor and/or electric generator).

While conventional motors and generators typically require more mechanical energy to overcome the cogging forces in order to initiate and maintain rotation, the apparatus, in use, reduces or eliminates the cogging forces, and reduces the total energy required to operate the first rotatable electric machine 104, the second rotatable electric machine 106, and the third rotatable electric machine 108.

While conventional motors typically have efficiencies in the range of 75-80%, the apparatus may improve efficiency due to (A) the minimum energy requirement from the DC source while in operation, and (B) the recycling of the energy in the first rotatable electric machine 104, the second rotatable electric machine 106 and the third rotatable electric machine 108.

The apparatus may be utilized in hybrid vehicles (automobiles), wind turbines, pumps, etc.

The apparatus is powered from a direct current (DC) electrical source and operated using a controlled switching circuit to regulate speed, torque and electrical output.

Preferably, the apparatus includes two or more rotatable disk assemblies that are rigidly mounted onto a common shaft that is free to rotate about a fixed axis. Each rotatable disk assembly has an even number of permanent magnets with relatively strong magnetic fields, which are mounted to the rotatable disk assemblies, and are equally spaced along the periphery of the rotatable disk assemblies. An odd number of electromagnet pairs with high magnetic permeability and high electrical resistivity cores are rigidly mounted and arranged to interact with the magnetic field of the permanent magnets on the rotatable disk assemblies as the rotatable disk assemblies rotate.

Unless otherwise specified, relational terms used in these specifications should be construed to include certain tolerances that the person skilled in the art would recognize as providing equivalent functionality. By way of example the term perpendicular is not necessarily limited to 90.0 degrees, but also to any slight variation thereof that the person skilled in the art would recognize as providing equivalent functionality for the purposes described for the relevant member or element. Terms such as "about" and "substantially", in the context of configuration, relate generally to disposition, location, or configuration that is either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as it does not materially change the operability of the invention. It will be appreciated that the description and/or drawings identify and describe embodiments of the apparatus (either explicitly or non-explicitly). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
a rotatable common shaft configured to be rotatable about a longitudinal shaft axis extending along the rotatable common shaft; and
rotatable electric machines being arranged on the rotatable common shaft in such a way that:
  disk assemblies of the rotatable electric machines and the rotatable common shaft are concurrently rotatable; and
  a net cogging force, which is generated by the rotatable electric machines, and which is imparted to the rotatable common shaft, is reduced,
wherein each of the rotatable electric machines includes:
  stationary electromagnet coil pairs being equidistant from the longitudinal shaft axis and spaced equally from each other along a circumferential path described by a radial position of the stationary electromagnet coil pairs with respect to the longitudinal shaft axis; and
  the stationary electromagnet coil pairs being mounted in the same plane; and
  stationary electromagnetic cores being respectively positioned in the stationary electromagnet coil pairs; and
  permanent magnets being mounted to the disk assemblies; and
  each of the permanent magnets of the disk assemblies being spaced apart from the stationary electromagnetic cores of the stationary electromagnet coil pairs by an air gap and a coaxial offset.

2. The apparatus of claim 1, wherein:
the rotatable electric machines each includes stationary electromagnet coil pairs; and
the net cogging force, which is generated by the rotatable electric machines, and which is imparted to the rotatable common shaft, is reduced for a case in which any one of the following is true:
  with a current flowing in the stationary electromagnet coil pairs; and
  without any current flowing in the stationary electromagnet coil pairs of the rotatable electric machines; or
  when the disk assemblies of the rotatable electric machines and the rotatable common shaft are rotated; or
  when the disk assemblies of the rotatable electric machines and the rotatable common shaft are not rotated.

3. The apparatus of claim 1, wherein:
the rotatable electric machines are arranged on the rotatable common shaft in such a way that a relative circumferential phase shift is maintained between the disk assemblies as the disk assemblies are rotated.

4. The apparatus of claim 1, further comprising:
a controller being configured to interface with the rotatable electric machines; and
the controller being configured to prevent electromechanical retardation of the rotatable common shaft when:
  current is flowing in stationary electromagnet coil pairs of the rotatable electric machines; and
  the rotatable common shaft is rotated.

5. The apparatus of claim 4, wherein:
the controller is configured to control current flow in the rotatable electric machines depending on an angular displacement of the rotatable common shaft.

6. The apparatus of claim 4, further comprising:
an angular encoder being coupled to the rotatable common shaft; and
the angular encoder being interfaced with the controller; and
the angular encoder being configured to monitor an angular displacement of the rotatable common shaft as the rotatable common shaft, in use, rotates; and
wherein:
the controller is configured to control current flow in the rotatable electric machines depending on the angular displacement of the rotatable common shaft as monitored by the angular encoder.

7. The apparatus of claim 4, wherein:
the controller is configured to recycle any stored energy for any one of:
  supplementing the electrical energy supplied from a DC source;
  recharging the batteries of a battery module; and
  providing electrical power to an external load.

8. The apparatus of claim 4, further comprising:
a battery module being interfaced with the controller; and
the battery module being electrically connected with the rotatable electric machines in such a way that the battery module, in use, interacts with coil pairs of the rotatable electric machines; and
wherein:
the controller is configured to interface with, and control operation of, the battery module in such a way that:
  the battery module, in use, provides electrical power to the rotatable electric machines in such a way that any electrical power that is provided to the rotatable electric machines, in use, urges rotation of the rotatable electric machines; and
  the battery module, in use, receives electrical power from the stored energy in the rotatable electric machines in such a way that the electrical power that is provided by the stored energy in the rotatable electric machines, in use, charges the battery module as needed.

9. The apparatus of claim 8, wherein:
the controller is configured to control the battery module depending on an angular displacement of the rotatable common shaft.

10. The apparatus of claim 1, wherein:
the stationary electromagnetic cores of the stationary electromagnet coil pairs of the rotatable electric machines are configured to:
  achieve saturated magnetic flux with minimal electrical power input; and
  maintain a remnant magnetic flux, which is greater than 70 percent of the saturated magnetic flux; and require minimal electrical power input to demagnetize; and have relatively low hysteresis and eddy current losses.

11. The apparatus of claim 1, wherein:

the stationary electromagnetic cores of the stationary electromagnet coil pairs have relatively lower resistive losses compared to the energy stored in a magnetic field of the stationary electromagnet coil pairs when in use.

12. The apparatus of claim 1, wherein:

demagnetization of the stationary electromagnetic cores of the stationary electromagnet coil pairs of the rotatable electric machines occurs with no electrical input power from a DC input source at a point where the stationary electromagnetic cores and the permanent magnets of the disk assemblies are radially in alignment and coaxially offset from each other.

13. The apparatus of claim 1, wherein:

a remnant magnetic flux in the stationary electromagnetic cores of the stationary electromagnet coil pairs of the rotatable electric machines is used to maximize a magnetic attraction force on the permanent magnets of the disk assemblies as the permanent magnets of the disk assemblies rotate towards the stationary electromagnet coil pairs.

14. The apparatus of claim 1, wherein:

a current is permitted to flow in the stationary electromagnet coil pairs to maximize a magnetic repulsive force on the permanent magnets of the disk assemblies as the permanent magnets of the disk assemblies rotate away from between the stationary electromagnet coil pairs.

15. The apparatus of claim 1, wherein:

the energy stored in a magnetic field of the stationary electromagnet coil pairs is converted to electrical energy and is reused to aid in a magnetic repulsion of the permanent magnets of the disk assemblies away from the stationary electromagnet coil pairs.

16. The apparatus of claim 1, further comprising:

a DC/DC converter module being configured to be interfaced with the stationary electromagnet coil pairs; and the DC/DC converter module being configured to regulate the energy injected into the stationary electromagnet coil pairs to control any one of:

a starting torque; and an operating torque; and a rotational speed of the rotatable electric machines.

17. The apparatus of claim 1, wherein:

a center axis, which is parallel to the longitudinal shaft axis, extends through each of the stationary electromagnet coil pairs; and a central axis, which is parallel to the longitudinal shaft axis, extends through each of the permanent magnets of the disk assemblies; and the coaxial offset is a radial distance between the center axis of the stationary electromagnet coil pairs and the central axis of the permanent magnets of the disk assemblies with respect to the longitudinal shaft axis.

18. The apparatus of claim 1, wherein:

an angular shift exists between the disk assemblies of the rotatable electric machines; and the angular shift is computed in accordance with a formula in which the angular shift=absolute value (Am−Ac)/N; and N is a number of the rotatable electric machines that are supported by the rotatable common shaft; and Ac is an equiangular displacement existing between the stationary electromagnet coil pairs about the longitudinal shaft axis; and Am is an equiangular displacement between the permanent magnets of the disk assemblies about the longitudinal shaft axis.

19. The apparatus of claim 18, wherein:

the angular shift includes a relative circumferential phase shift between any one of:

the disk assemblies of the rotatable electric machines; and stationary electromagnet coil pair collections of the rotatable electric machines.

* * * * *